US010747226B2

(12) United States Patent
Johnson et al.

(10) Patent No.: US 10,747,226 B2
(45) Date of Patent: Aug. 18, 2020

(54) ADAPTIVE AUTOPILOT CONTROL SYSTEMS AND METHODS

(71) Applicant: FLIR Systems, Inc., Wilsonville, OR (US)

(72) Inventors: Mark Johnson, Vannes (FR); Ian Matt, Fareham (GB); Christopher Yeomans, Fareham (GB); Gytis Sabaliauskas, Fareham (GB); Gordon Pope, Kowloon (HK)

(73) Assignee: FLIR Systems, Inc., Wilsonville, OR (US)

( * ) Notice: Subject to any disclaimer, the term of this patent is extended or adjusted under 35 U.S.C. 154(b) by 364 days.

(21) Appl. No.: 15/620,675

(22) Filed: Jun. 12, 2017

(65) Prior Publication Data

US 2017/0277189 A1     Sep. 28, 2017

Related U.S. Application Data

(63) Continuation of application No. PCT/US2015/068342, filed on Dec. 31, 2015, and a
(Continued)

(51) Int. Cl.
*B63H 25/06* (2006.01)
*B63H 25/04* (2006.01)
(Continued)

(52) U.S. Cl.
CPC ........... *G05D 1/0206* (2013.01); *B63H 25/04* (2013.01); *B63H 25/06* (2013.01); *G01S 15/86* (2020.01);
(Continued)

(58) Field of Classification Search
CPC ..... G05D 1/0206; G01S 15/89; G01S 15/025; G01S 15/96; G01S 19/42; B63H 25/06; B63H 25/04; B63B 2035/009
See application file for complete search history.

(56) References Cited

U.S. PATENT DOCUMENTS

| 2,968,957 A | 1/1961 | Condie et al. |
| 3,140,436 A * | 7/1964 | Hatch ................ G05D 1/0206 114/144 R |

(Continued)

FOREIGN PATENT DOCUMENTS

| CN | 102692225 | 9/2012 |
| CN | 103149948 | 6/2013 |

(Continued)

OTHER PUBLICATIONS

Gorovyi et al., "A Novel Trajectory Restoration Algorithm for High-Resolution SAR Imaging", 2014 15$^{th}$ International Radar Symposium, Jun. 16, 2014, 4 pages, IEEE, Piscataway, NJ.
(Continued)

*Primary Examiner* — Genna M Mott
(74) *Attorney, Agent, or Firm* — Haynes and Boone, LLP

(57) ABSTRACT

Autopilot systems and related techniques are provided to improve the ability of mobile structures to maintain a desired reference path (e.g., to keep a desired track and/or to follow a desired contour). In various embodiments, a high quality turn rate signal and GPS based signals are used to generate high bandwidth cross track/contour errors and other associated signals. An adaptive controller uses the generated cross track/contour signals to provide robust track keeping and/or contour following in the directional control of a mobile structure. Techniques are also provided for systems and methods to provide directional control for mobile structures.

20 Claims, 41 Drawing Sheets

Related U.S. Application Data continuation-in-part of application No. 14/749,007, filed on Jun. 24, 2015, now Pat. No. 9,947,309, which is a continuation-in-part of application No. PCT/US2015/015279, filed on Feb. 10, 2015, said application No. PCT/US2015/068342 is a continuation-in-part of application No. PCT/US2015/015281, filed on Feb. 10, 2015, said application No. PCT/US2015/068342 is a continuation-in-part of application No. PCT/US2015/013141, filed on Jan. 27, 2015, said application No. PCT/US2015/068342 is a continuation-in-part of application No. PCT/US2015/067959, filed on Dec. 29, 2015, said application No. PCT/US2015/068342 is a continuation-in-part of application No. 14/321,646, filed on Jul. 1, 2014, now Pat. No. 9,676,464, which is a continuation of application No. PCT/US2014/013441, filed on Jan. 28, 2014.

(60) Provisional application No. 62/273,402, filed on Dec. 30, 2015, provisional application No. 62/099,016, filed on Dec. 31, 2014, provisional application No. 62/099,103, filed on Dec. 31, 2014, provisional application No. 62/099,022, filed on Dec. 31, 2014, provisional application No. 61/943,170, filed on Feb. 21, 2014, provisional application No. 61/942,517, filed on Feb. 20, 2014, provisional application No. 61/934,678, filed on Jan. 31, 2014, provisional application No. 62/099,032, filed on Dec. 31, 2014, provisional application No. 61/759,238, filed on Jan. 31, 2013.

(51) Int. Cl.
*G05D 1/02* (2020.01)
*G01S 15/89* (2006.01)
*G01S 15/86* (2020.01)
*G01S 19/42* (2010.01)
*B63B 35/00* (2020.01)
*G01S 15/96* (2006.01)

(52) U.S. Cl.
CPC ......... *G01S 15/89* (2013.01); *B63B 2035/009* (2013.01); *B63H 2025/045* (2013.01); *G01S 15/96* (2013.01); *G01S 19/42* (2013.01)

(56) References Cited

U.S. PATENT DOCUMENTS

| | | | |
|---|---|---|---|
| 3,301,510 A | 1/1967 | Cook | |
| 3,436,531 A | 4/1969 | Throckmorton | |
| 3,488,954 A | 1/1970 | Thomas et al. | |
| 3,741,474 A * | 6/1973 | Kawada | G05D 1/0206 701/530 |
| 4,129,087 A * | 12/1978 | Dimmick | G05D 1/0206 114/144 E |
| 5,362,263 A | 11/1994 | Petty | |
| 5,523,951 A | 6/1996 | Kriesgman et al. | |
| 5,525,081 A * | 6/1996 | Mardesich | B63H 20/007 114/144 E |
| 6,450,112 B1 | 9/2002 | Deghuee | |
| 6,571,176 B1 * | 5/2003 | Shinmura | B60T 7/22 180/421 |
| 7,469,168 B1 | 12/2008 | Richey | |
| 8,275,544 B1 | 9/2012 | Wells et al. | |
| 2003/0149528 A1 | 8/2003 | Lin | |
| 2009/0076717 A1 * | 3/2009 | Goutelard | G01C 21/00 701/122 |
| 2009/0171520 A1 | 7/2009 | Kaji | |
| 2010/0228420 A1 | 9/2010 | Lee | |
| 2011/0046843 A1 | 2/2011 | Caveney | |
| 2011/0307128 A1 | 12/2011 | Igarashi et al. | |
| 2012/0130570 A1 | 5/2012 | Pease | |
| 2012/0132120 A1 | 5/2012 | Gai et al. | |
| 2013/0173096 A1 | 7/2013 | Chalhoub et al. | |
| 2014/0316657 A1 | 10/2014 | Johnson et al. | |
| 2014/0330480 A1 * | 11/2014 | Kopper | G01P 21/00 701/33.1 |

FOREIGN PATENT DOCUMENTS

| | | |
|---|---|---|
| DE | 19803078 | 7/1999 |
| DE | 19807525 | 9/1999 |
| EP | 2096018 | 9/2009 |
| GB | 1223986 | 3/1971 |
| GB | 1419244 | 12/1975 |
| GB | 2429541 | 2/2007 |
| JP | 2013086745 | 5/2013 |
| WO | WO 2007/002391 | 1/2007 |
| WO | WO 2010/051629 | 5/2010 |
| WO | WO2014168674 | 10/2014 |

OTHER PUBLICATIONS

Gierusz et al., "Multivariable Robust Steering of the Ship with Feedforward Controller", IFAC Proceedings Volumes, 2007, pp. 310-314, vol. 40, Issue 17, Elsevier, Amsterdam, Netherlands.

* cited by examiner

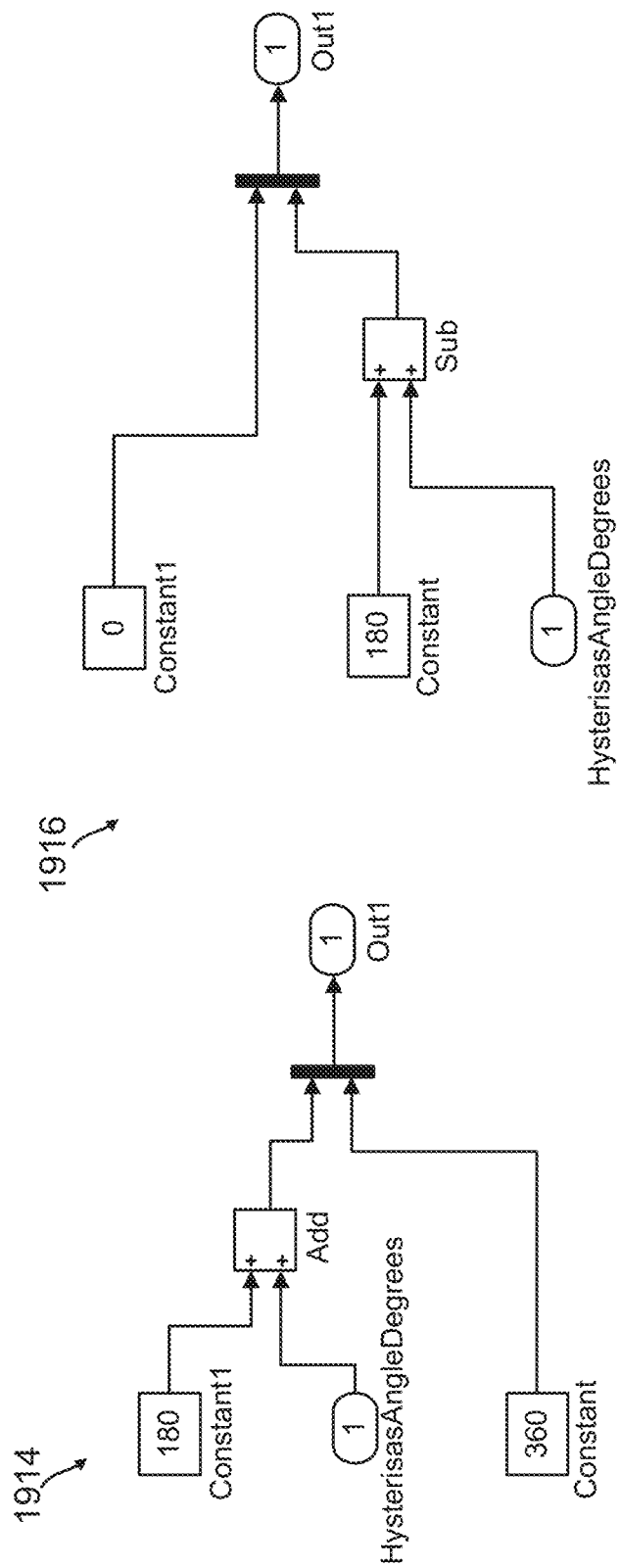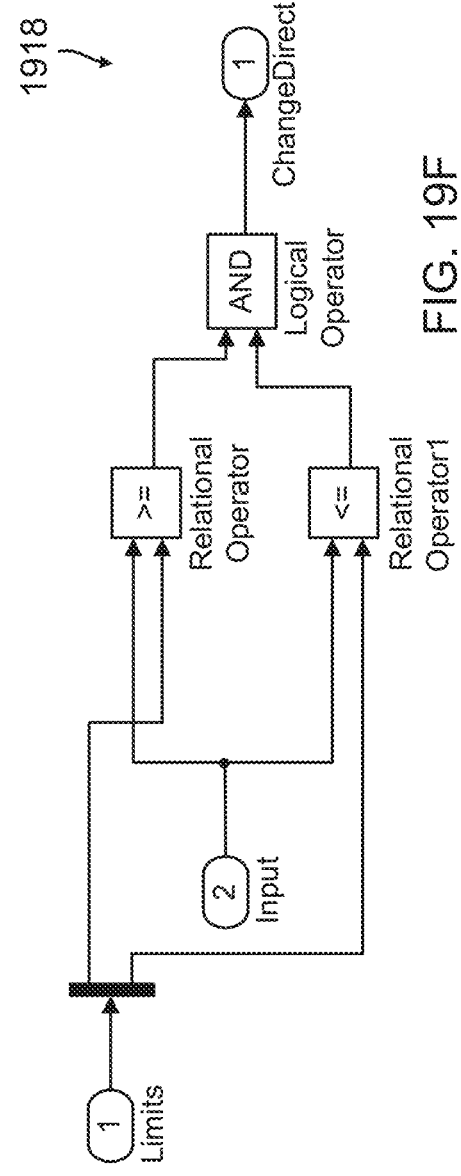
FIG. 19D
FIG. 19E
FIG. 19F

```
function TATAOut = tataDirection(BTW_True, LimitTurnDirection, tataIn, COG_True)
%#codegen
TATAOut = single(tataIn);
% limit TATA to +-180
if TATAOut < single(-180)
    TATAOut = TATAOut + single(360);
elseif TATAOut > single(180)
    TATAOut = TATAOut - single(360);
end %Calculate the Heading difference between the COG and BTW
BTWCOG_Diff = mod(single(BTW_True) - single(COG_True) + single(180), single(360)) - single(180);

% if the forced direction is contradicting the TATA then force TATA to show
% the right way only if we are pointing away from the waypoint
if (abs(BTWCOG_Diff) >= 90)
    if ((LimitTurnDirection > single(0)) && (TATAOut < single(0)))
        TATAOut = TATAOut + single(360);
    elseif ((LimitTurnDirection < single(0)) && (TATAOut > single(0)))
        TATAOut = TATAOut - single(360);
    end
end % TATA is only +-180 so limit it.
if TATAOut < single(-180)
    TATAOut = single(-180);
elseif TATAOut > single(180)
    TATAOut = single(180);
end
end
```

FIG. 19G

ADAPTIVE AUTOPILOT CONTROL SYSTEMS AND METHODS

CROSS-REFERENCE TO RELATED APPLICATIONS

This application is a continuation of International Patent Application No. PCT/US2015/068342 filed Dec. 31, 2015 and entitled "ADAPTIVE AUTOPILOT CONTROL SYSTEMS AND METHODS", which is hereby incorporated by reference in its entirety.

International Patent Application No. PCT/US2015/068342 claims priority to and the benefit of U.S. Provisional Patent Application No. 62/273,402 filed Dec. 30, 2015 and entitled "ADAPTIVE TRACK KEEPING WITH ENHANCED VELOCITY ESTIMATION SYSTEMS AND METHODS", U.S. Provisional Patent Application No. 62/099,016 filed Dec. 31, 2014 and entitled "ADAPTIVE TRACK KEEPING SYSTEMS AND METHODS", U.S. Provisional Patent Application No. 62/099,103 filed Dec. 31, 2014 and entitled "ADAPTIVE CONTOUR FOLLOWING SYSTEMS AND METHODS", and U.S. Provisional Patent Application No. 62/099,022 filed Dec. 31, 2014 and entitled "STABILIZED DIRECTIONAL CONTROL SYSTEMS AND METHODS", all of which are hereby incorporated by reference in their entirety.

International Patent Application No. PCT/US2015/068342 is a continuation-in-part of International Patent Application No. PCT/US2015/015279 filed Feb. 10, 2015 and entitled "MODULAR SONAR TRANSDUCER ASSEMBLY SYSTEMS AND METHODS" which claims priority to and the benefit of U.S. Provisional Patent Application No. 61/943,170 filed Feb. 21, 2014 and entitled "MODULAR SONAR TRANSDUCER ASSEMBLY SYSTEMS AND METHODS."

International Patent Application No. PCT/US2015/068342 is also a continuation-in-part of U.S. patent application Ser. No. 14/749,007 filed Jun. 24, 2015 and entitled "SONAR TRANSDUCER SUPPORT ASSEMBLY SYSTEMS AND METHODS" which is a continuation-in-part of International Patent Application No. PCT/US2015/015279 filed Feb. 10, 2015 and entitled "MODULAR SONAR TRANSDUCER ASSEMBLY SYSTEMS AND METHODS" which claims priority to and the benefit of U.S. Provisional Patent Application No. 61/943,170 filed Feb. 21, 2014 and entitled "MODULAR SONAR TRANSDUCER ASSEMBLY SYSTEMS AND METHODS", all of which are hereby incorporated herein by reference in their entirety.

International Patent Application No. PCT/US2015/068342 is also a continuation-in-part of International Patent Application No. PCT/US2015/015281 filed Feb. 10, 2015 and entitled "ACCELERATION CORRECTED ATTITUDE ESTIMATION SYSTEMS AND METHODS" which claims priority to and the benefit of U.S. Provisional Patent Application No. 61/942,517 filed Feb. 20, 2014 and entitled "ACCELERATION CORRECTED ATTITUDE ESTIMATION SYSTEMS AND METHODS", all of which are hereby incorporated herein by reference in their entirety.

International Patent Application No. PCT/US2015/068342 is also a continuation-in-part of International Patent Application No. PCT/US2015/013141 filed Jan. 27, 2015 and entitled "HYDRAULIC SLIP COMPENSATION SYSTEMS AND METHODS" which claims priority to and the benefit of U.S. Provisional Patent Application No. 61/934,678 filed Jan. 31, 2014 and entitled "HYDRAULIC SLIP COMPENSATION SYSTEMS AND METHODS", all of which are hereby incorporated herein by reference in their entirety.

International Patent Application No. PCT/US2015/068342 also claims priority to and the benefit of U.S. Provisional Patent Application No. 62/099,032 filed Dec. 31, 2014 and entitled "PROACTIVE DIRECTIONAL CONTROL SYSTEMS AND METHODS."

International Patent Application No. PCT/US2015/068342 is also a continuation-in-part of International Patent Application No. PCT/US2015/067959 filed Dec. 29, 2015 and entitled "PROACTIVE DIRECTIONAL CONTROL SYSTEMS AND METHODS" which claims priority to and the benefit of U.S. Provisional Patent Application No. 62/099,032 filed Dec. 31, 2014 and entitled "PROACTIVE DIRECTIONAL CONTROL SYSTEMS AND METHODS", all of which are hereby incorporated herein by reference in their entirety.

International Patent Application No. PCT/US2015/068342 is also related to International Patent Application No. PCT/US2014/013441 filed Jan. 28, 2014 and entitled "STABILIZED DIRECTIONAL CONTROL SYSTEMS AND METHODS" which claims priority to and the benefit of U.S. Provisional Patent Application No. 61/759,238 filed Jan. 31, 2013 and entitled "STABILIZED DIRECTIONAL CONTROL SYSTEMS AND METHODS."

This application is also a continuation-in-part of U.S. patent application Ser. No. 14/321,646 filed Jul. 1, 2014 and entitled "STABILIZED DIRECTIONAL CONTROL SYSTEMS AND METHODS" (now U.S. Pat. No. 9,676,464 issued Jun. 13, 2017), which is a continuation of International Patent Application No. PCT/US2014/013441 filed Jan. 28, 2014 and entitled "STABILIZED DIRECTIONAL CONTROL SYSTEMS AND METHODS" which claims priority to and the benefit of U.S. Provisional Patent Application No. 61/759,238 filed Jan. 31, 2013 and entitled "STABILIZED DIRECTIONAL CONTROL SYSTEMS AND METHODS", all of which are hereby incorporated herein by reference in their entirety.

International Patent Application No. PCT/US2015/068342 is related to International Patent Application No. PCT/US2015/032304 filed May 22, 2015 and entitled "MULTICHANNEL SONAR SYSTEMS AND METHODS" which claims priority to and the benefit of U.S. Provisional Patent Application No. 62/005,838 filed May 30, 2014 and entitled "MULTICHANNEL SONAR SYSTEMS AND METHODS", all of which are hereby incorporated herein by reference in their entirety.

This application is also a continuation-in-part of U.S. patent application Ser. No. 15/239,770 filed Aug. 17, 2016 and entitled "MODULAR SONAR TRANSDUCER ASSEMBLY SYSTEMS AND METHODS" which is a continuation of International Patent Application No. PCT/US2015/015279 filed Feb. 10, 2015 and entitled "MODULAR SONAR TRANSDUCER ASSEMBLY SYSTEMS AND METHODS" which claims priority to and the benefit of U.S. Provisional Patent Application No. 61/943,170 filed Feb. 21, 2014 and entitled "MODULAR SONAR TRANSDUCER ASSEMBLY SYSTEMS AND METHODS."

This application is also a continuation-in-part of U.S. patent application Ser. No. 15/239,760 filed Aug. 17, 2016 and entitled "ACCELERATION CORRECTED ATTITUDE ESTIMATION SYSTEMS AND METHODS" which is a continuation of International Patent Application No. PCT/US2015/015281 filed Feb. 10, 2015 and entitled "ACCELERATION CORRECTED ATTITUDE ESTIMATION SYSTEMS AND METHODS" which claims priority to and the benefit of U.S. Provisional Patent Application No. 61/942,517 filed Feb. 20, 2014 and entitled "ACCELERATION CORRECTED ATTITUDE ESTIMATION SYSTEMS AND METHODS."

This application is also a continuation-in-part of U.S. patent application Ser. No. 15/222,905 filed Jul. 28, 2016 and entitled "HYDRAULIC SLIP COMPENSATION SYSTEMS AND METHODS" which is a continuation of International Patent Application No. PCT/US2015/013141 filed Jan. 27, 2015 and entitled "HYDRAULIC SLIP COMPENSATION SYSTEMS AND METHODS" which claims priority to and the benefit of U.S. Provisional Patent Application No. 61/934,678 filed Jan. 31, 2014 and entitled "HYDRAULIC SLIP COMPENSATION SYSTEMS AND METHODS."

TECHNICAL FIELD

The present invention relates generally to autopilot techniques and, more particularly, to maintaining vessels and other mobile structures along desired reference paths and providing stabilized directional control.

BACKGROUND

Watercraft autopilot systems (e.g., controllers) typically rely on various primary components: a position sensor, a navigation aid device (NavAid), an autopilot device, and/or a sonar device (e.g., all of which may be provided as separate devices in communication and/or integrated with each other). The position sensor provides latitude and longitude with limited accuracy and bandwidth (e.g., through global positioning system (GPS) signals conventionally having approximately three meter accuracy and providing updates approximately once per second). The navigation aid device permits a user to define a desired reference path such as a track (e.g., a path between waypoints) and/or a contour (e.g., a sea bed depth along which to follow, possibly between waypoints). The sonar device permits a user to actively probe the sea bed rather than rely on chart data, which may not exist for the present geographical area. Conventional autopilot devices operate to minimize the deviation from the desired reference path.

Conventional reference path tracking/following algorithms that adjust heading simply as a function of cross track error (e.g., Heading=K∫CrossTrackErrordt; "when off track/contour to the right, turn to the left") are inherently unstable because of a double integration occurring in the feedback loop. In this regard, a first integration occurs in the controller and a second integration occurs naturally (e.g., because cross track error builds/falls for a constant off-track angle). Each integration causes 90° of phase lag, so two integrations cause 180° of phase lag. As a result, the autopilot control signal is completely out of phase with the error and the phase margin is zero.

The inherently poor phase margin makes such conventional systems particularly susceptible to error due to noise and/or delay in the cross track signals. Yet, GPS data typically comes with high noise levels (e.g., 3 meter accuracy or worse), and the cross track error (XTE) signal can be delayed by 5 seconds or more when taking into account GPS receiver filtering, NavAid response times, and network delays. Furthermore, some watercraft do not respond immediately to the application of rudder or steering, and every conveyance has a different delay and a different rate of turn per unit of rudder applied, so the overall loop delays are variable and can be substantially worse than 5 seconds, making track keeping robustness and stability extremely challenging. Thus, conventional track keeping techniques are generally sluggish, mildly oscillatory, and unpredictable, particularly when large turns are required.

Directional control systems and methods are used to provide automated and/or supplemented control for planes, watercraft, and, more recently, automobiles. A significant drawback to conventional directional control systems is that they typically need to be designed and/or configured for a particular vehicle, and once configured, cannot easily be used to provide directional control for a different vehicle. Thus, manufacturing directional control systems and methods for a number of different vehicles, even if they are of the same type, such as different makes of ships, can be expensive due to extensive testing and adjustment procedures performed for each individual vehicle.

Adaptive control techniques have been developed to address manually performing the adjustment and testing procedures, but conventional adaptive techniques typically take too long to train to a particular vehicle dynamic under normal operating conditions. Furthermore, conventional adaptive techniques typically train to a very limited set of vehicle states and or dynamics, and directional controllers based on these techniques are known to drastically lose their accuracy and/or stability as conditions vary even subtly outside previous training conditions. Thus, there is a need for improved directional control methodologies.

SUMMARY

Autopilot reference path tracking/following systems and related techniques are provided to improve piloting of mobile structures. In some embodiments, a high quality turn rate signal and GPS based signals are used to generate high bandwidth cross track/contour signals. An adaptive controller uses the generated cross track signals to provide robust track/contour keeping/following.

One or more embodiments of the described track keeping/contour following systems may advantageously include a controller in conjunction with an orientation sensor, a gyroscope, an accelerometer, a position sensor, a sonar system, and/or a speed sensor providing measurements of an orientation, position, acceleration, local depth, and/or speed of a coupled mobile structure. For example, the sensors may be mounted to or within the mobile structure (e.g., a watercraft, aircraft, motor vehicle, and/or other mobile structure), or may be integrated with the controller.

In one embodiment, a method includes receiving a yaw rate, position, and/or velocity of a mobile structure; determining a cross track error relative to a specified track for the mobile structure based, at least in part, on the yaw rate, position, and/or velocity; and determining a steering demand for the mobile structure based, at least in part, on the cross track error.

In another embodiment, a system includes a logic device configured to receive one or more sensor signals and generate one or more control signals to provide directional control for a mobile structure along a specified track. The logic device may be configured to receive a yaw rate and/or a position of the mobile structure, determine a cross track error relative to the specified track for the mobile structure based, at least in part, on the yaw rate and/or position, and determine a steering demand for the mobile structure based, at least in part, on the cross track error.

In another embodiment, a method includes receiving a yaw rate signal identifying a yaw rate of a mobile structure; determining a cross track error signal for the mobile structure using the yaw rate signal; determining an angle adjustment signal for the mobile structure using the cross track error signal; and steering the mobile structure toward a target waypoint in response to the angle adjustment signal.

In another embodiment, a system includes a steering actuator; and a logic device adapted to communicate with the steering actuator, wherein the logic device is configured to: receive a yaw rate signal identifying a yaw rate of a mobile structure, determine a cross track error signal for the mobile structure using the yaw rate signal, determine an angle adjustment signal for the mobile structure using the cross track error signal, and provide the angle adjustment signal to the steering actuator to steer the mobile structure toward a target waypoint.

In another embodiment, a method includes receiving a yaw rate, position, and/or velocity of a mobile structure; determining an effective cross track error relative to a specified contour for the mobile structure based, at least in part, on the yaw rate, position, and/or velocity; and determining a steering demand for the mobile structure based, at least in part, on the effective cross track error; wherein the effective cross track error is based on a depth error divided by a cross slope associated with the specified contour.

In another embodiment, a system includes a logic device configured to receive one or more sensor signals and generate one or more control signals to provide directional control for a mobile structure along a specified contour. In some embodiments, the logic device may be configured to receive a yaw rate and/or a position of the mobile structure, determine an effective cross track error relative to the specified contour for the mobile structure based, at least in part, on the yaw rate and/or position, and determine a steering demand for the mobile structure based, at least in part, on the effective cross track error, wherein the effective cross track error is based on a depth error divided by a cross slope associated with the specified contour.

Techniques are disclosed for systems and methods to provide stabilized directional control for a mobile structure. In accordance with one or more embodiments, a directional control system may include a logic device, a memory, one or more sensors, one or more actuators/controllers, and modules to interface with users, sensors, actuators, and/or other modules of a mobile structure. The logic device may be adapted to receive directional data about a mobile structure and determine nominal vehicle feedback from the directional data. The nominal vehicle feedback may be used to adjust a directional control signal provided to an actuator of the mobile structure. The directional control signal may be limited to a value below an actuator rate limit before a directional control signal is adjusted by the nominal vehicle feedback. Various types of control signals may be displayed to a user and/or used to adjust a steering actuator, a propulsion system thrust, and/or other operational systems of the mobile structure.

In another embodiment, a method may include receiving a steering angle and a steering rate of a mobile structure, wherein the steering angle is based, at least in part, on a steering demand; determining a nominal vehicle steering angle based, at least in part, on the steering rate; and determining a nominal vehicle feedback signal based, at least in part, on a combination of the steering angle and the nominal vehicle steering angle, wherein the nominal vehicle feedback signal is provided to adjust the steering demand.

In another embodiment, a directional control system may include a logic device configured to receive one or more sensor signals and generate one or more control signals to provide directional control for a mobile structure. The logic device may be configured to receive a steering angle and a steering rate of the mobile structure, wherein the steering angle is based, at least in part, on a steering demand; determine a nominal vehicle steering angle based, at least in part, on the steering rate; and determine a nominal vehicle feedback signal based, at least in part, on a combination of the steering angle and the nominal vehicle steering angle, wherein the nominal vehicle feedback signal is provided to adjust the steering demand.

In another embodiment, a method includes receiving a yaw rate, position, and/or velocity of a mobile structure; determining a cross track error relative to a reference path for the mobile structure based, at least in part, on the yaw rate, position, and/or velocity; and determining a steering demand for the mobile structure based, at least in part, on the cross track error.

In another embodiment, a system includes a logic device configured to receive one or more sensor signals and generate one or more control signals to provide directional control for a mobile structure along a reference path, wherein the logic device is configured to perform a method comprising: receiving a yaw rate, position, and/or velocity of the mobile structure; determining a cross track error relative to the reference path for the mobile structure based, at least in part, on the yaw rate, position, and/or velocity; and determining a steering demand for the mobile structure based, at least in part, on the cross track error.

In another embodiment, a method includes receiving a steering angle and a steering rate of a mobile structure, wherein the steering angle is based, at least in part, on a steering demand; determining a nominal steering angle based, at least in part, on the steering rate; determining a nominal feedback signal based, at least in part, on a combination of the steering angle and the nominal steering angle; and adjusting the steering demand by the nominal feedback signal.

In another embodiment, a system includes a logic device configured to receive one or more sensor signals and generate one or more control signals to provide directional control for a mobile structure along a reference path, wherein the logic device is configured to perform a method comprising: receiving a steering angle and a steering rate of the mobile structure, wherein the steering angle is based, at least in part, on a steering demand; determining a nominal steering angle based, at least in part, on the steering rate; determining a nominal feedback signal based, at least in part, on a combination of the steering angle and the nominal steering angle; and adjusting the steering demand by the nominal feedback signal.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 19A-G illustrate various diagrams of a track leg bearing block in accordance with an embodiment of the disclosure.

Embodiments of the present invention and their advantages are best understood by referring to the detailed description that follows. It should be appreciated that like reference numerals are used to identify like elements illustrated in one or more of the figures.

DETAILED DESCRIPTION

Figure 1A:
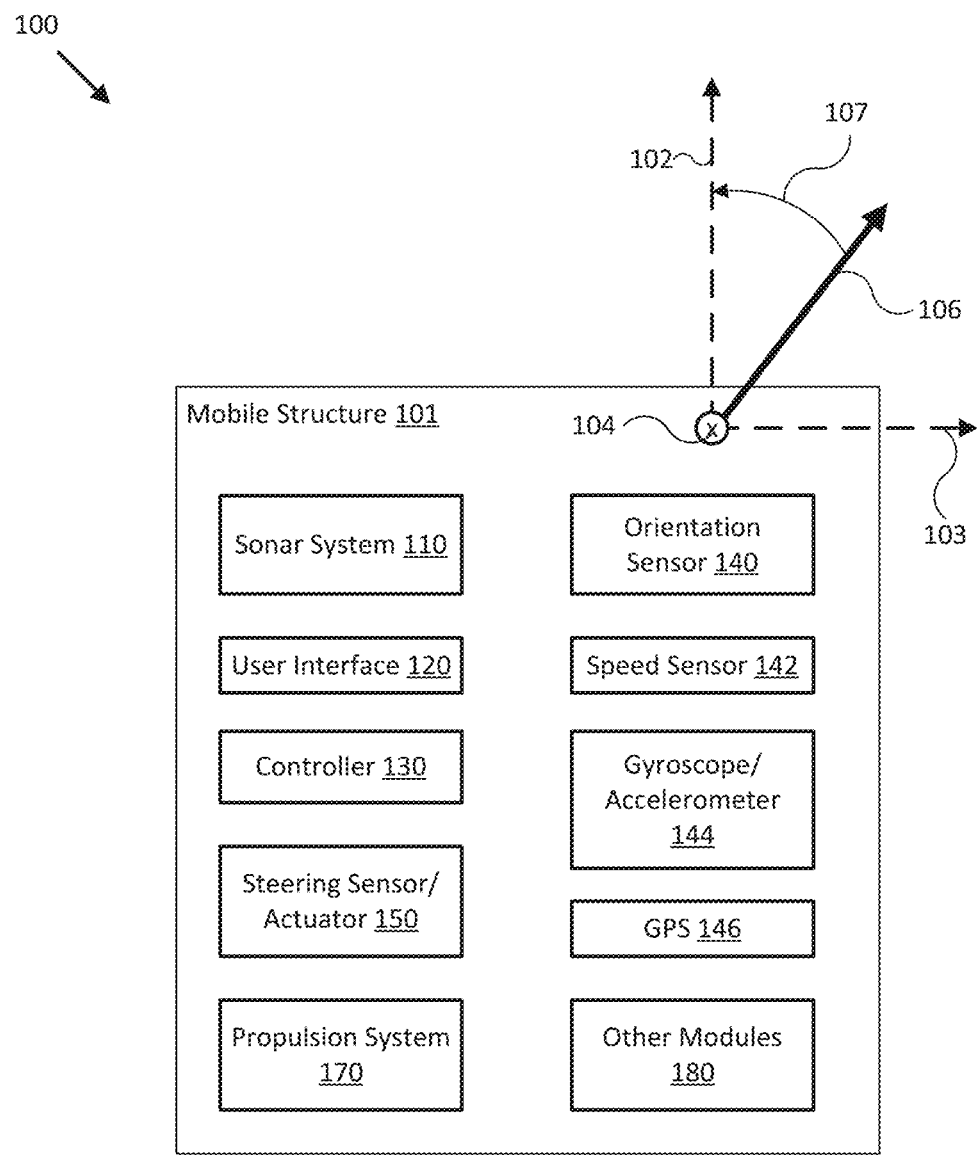
FIG. 1A illustrates a diagram of a mobile structure in accordance with an embodiment of the disclosure.

Autopilot systems and related techniques are provided to improve the ability of mobile structures to maintain a desired reference path (e.g., to keep a specified track and/or to follow a specified contour). In some embodiments, a high quality turn rate signal and GPS based signals may be used to generate high bandwidth effective cross track errors and/or related signals, as described herein. An adaptive controller may be configured to use the generated cross track signals to provide tight track keeping and/or contour following even during autopilot assisted operation/turns.

In accordance with various embodiments of the present disclosure, adaptive nominal vehicle model-based autopilot systems and methods may provide directional control for mobile structures that is substantially more reliable and accurate than conventional systems across a wide variety of types of structures and environmental conditions. For example, the most common type of conventional directional controller is a proportional-derivative-integral (PID) controller. The integral portion of the PID controller attempts to correct for steady state disturbances, but it is typically insufficient for a number of common environmental conditions.

For example, on a sailboat that is heeled over while sailing upwind, the sails drive the boat into the wind, and the skipper typically needs to hold around five degrees of weather helm (e.g., additional steering angle counteracting the force of the wind/slip angle of the boat) to keep the boat from luffing up. One problem with integral action is that it lags the actual conditions measured with respect to the boat, and this lag destabilizes the PID control loop enough to make the resulting autopilot control oscillatory and at least uncomfortable for a user, particularly under conditions where holding a weather helm is necessary. Another problem is that integral action generates overshoot to a step input (e.g., such as when changing from waypoint to waypoint in a route), and so a conventional PID controller attempting to autopilot through a tacking maneuver will overshoot the new heading due to the error in the PID controller that arises when the steering demand suddenly changes by approximately ninety degrees, and that overshoot can destabilize the entire tacking maneuver. Even under the most common environmental conditions, the parameters/gains for the PID controller typically need to be carefully adjusted for each individual boat and, in some instances, for each environmental condition experienced by the boat, before the PID controller can be used to autopilot that boat comfortably and/or safely.

One or more embodiments of the described directional control system may advantageously include a controller and one or more of an orientation sensor, a gyroscope, an accelerometer, a position sensor, a speed sensor, and/or a steering sensor/actuator providing measurements of an orientation, position, acceleration, speed, and/or steering angle of the mobile structure. In some embodiments, the controller may be adapted to execute one or more control loops including a nominal vehicle feedback system. The nominal vehicle feedback system may be configured to receive measured or modeled sensor signals, such as a steering angle and a steering rate for a mobile structure, and provide a nominal vehicle feedback signal, as described herein. For example, the sensors may be mounted to or within the mobile structure (e.g., a watercraft, aircraft, motor vehicle, and/or other mobile structure), or may be integrated with the controller. Various embodiments of the present disclosure may be configured to automatically coordinate steering actuator operations with various orientation and/or position measurements to provide relatively high quality and low noise directional control.

FIG. 1A illustrates a block diagram of adaptive track keeping system 100 in accordance with an embodiment of the disclosure. In various embodiments, system 100 may be adapted to provide directional control for a particular mobile structure 101. Directional control of a mobile structure may refer to control of any one or combination of yaw, pitch, or roll of mobile structure 101. In some embodiments, system 100 may be adapted to measure an orientation, a position, an acceleration, and/or a speed of mobile structure 101. In some embodiments, system 100 may display available user selections, sonar data, imagery, and/or other information to a user through user interface 120 (e.g., one or more dedicated displays such as a multi-function display (MFD), a portable electronic device such as a tablet, laptop, or smart phone, or other appropriate interface), and/or to control operation of mobile structure 101 (e.g., using the previously noted measurements), such as controlling steering actuator 150 and/or propulsion system 170 to steer mobile structure 101 according to a desired heading, such as heading angle 107, for example.

In the embodiment shown in FIG. 1A, system 100 may be implemented to perform track keeping, contour following, and/or directional control for a particular type of mobile structure 101, such as a drone, a watercraft, an aircraft, a robot, a vehicle, and/or other types of mobile structures. In one embodiment, system 100 may include one or more of a sonar system 110, a user interface 120, a controller 130, an orientation sensor 140, a speed sensor 142, a gyroscope/accelerometer 144, a global positioning system (GPS) 146, a steering sensor/actuator 150, a propulsion system 170, and one or more other sensors and/or actuators used to sense and/or control a state of mobile structure 101, such as other modules 180. In some embodiments, one or more of the elements of system 100 may be implemented in a combined housing or structure that can be coupled to mobile structure 101, towed behind mobile structure 101, separately piloted/autopiloted near mobile structure 101, and/or held or carried/supported by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope/accelerometer 144). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein.

For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation).

In some embodiments, directional measurements may initially be referenced to a coordinate frame of a particular sensor (e.g., a sonar transducer assembly or module of sonar system 110) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 referenced to a local gravitational vector but with an unreferenced and/or undefined yaw reference (e.g., no reference to Magnetic North).

Sonar system 110 may be implemented with one or more electrically and/or mechanically coupled controllers, transmitters, receivers, transceivers, signal processing logic devices, autonomous power systems, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein. Sonar system 110 may be configured to emit one, multiple, or a series of acoustic beams, receive corresponding acoustic returns, and convert the acoustic returns into sonar data and/or imagery, such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

For example, in various embodiments, sonar system 110 may be implemented and/or operated according to any one or combination of the systems and methods described in U.S. Provisional Patent Application 62/005,838 filed May 30, 2014 and entitled "MULTICHANNEL SONAR SYSTEMS AND METHODS", U.S. Provisional Patent Application 61/943,170 filed Feb. 21, 2014 and entitled "MODULAR SONAR TRANSDUCER ASSEMBLY SYSTEMS AND METHODS", and/or U.S. Provisional Patent Application 62/087,189 filed Dec. 3, 2014 and entitled "AUTONOMOUS SONAR SYSTEMS AND METHODS", each of which are hereby incorporated by reference in their entirety. In other embodiments, sonar system 110 may be implemented according to other sonar system arrangements that can be used to detect objects within a water column and/or a floor of a body of water.

User interface 120 may be implemented as one or more of a display, a touch screen, a keyboard, a mouse, a joystick, a knob, a steering wheel, a ship's wheel or helm, a yoke, and/or any other device capable of accepting user input and/or providing feedback to a user. For example, in some embodiments, user interface 120 may be implemented and/or operated according to any one or combination of the systems and methods described in U.S. Provisional Patent Application 62/069,961 filed Oct. 29, 2014 and entitled "PILOT DISPLAY SYSTEMS AND METHODS", which is hereby incorporated by reference in its entirety.

In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods described herein.

In some embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated/movable sensor, and/or to otherwise facilitate operation of system 100 and devices within system 100. Once user interface 120 receives a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101 and/or other elements of system 100. In such embodiments, user interface 120 may be adapted to process the sensor signals to determine sensor information indicating an estimated and/or absolute roll, pitch, and/or yaw (attitude and/or rate), and/or a position or series of positions of mobile structure 101 and/or other elements of system 100, for example, and display the sensor information as feedback to a user. In one embodiment, user interface 120 may be adapted to display a time series of various sensor information and/or other parameters as part of or overlaid on a graph, map, or other background, which may be referenced to a position and/or orientation of mobile structure 101 and/or other elements of system 100. For example, user interface 120 may be adapted to display a time series of positions, headings, and/or orientations of mobile structure 101 and/or other elements of system 100 overlaid on a geographical map and/or other background, which may include one or more graphs indicating a corresponding time series of actuator control signals, sensor information, and/or other sensor and/or control signals.

In some embodiments, user interface 120 may be adapted to accept user input including a user-defined target heading, waypoint, route, and/or orientation for an element of system 100, for example, and to generate control signals for steering sensor/actuator 150 and/or propulsion system 170 to cause mobile structure 101 to move according to the target heading, route, and/or orientation. In other embodiments, user interface 120 may be adapted to accept user input modifying a control loop parameter of controller 130, for example, or selecting a responsiveness of controller 130 in controlling a direction (e.g., through application of a particular steering angle) of mobile structure 101.

For example, a responsiveness setting may include selections of Performance (e.g., fast response), Cruising (medium response), Economy (slow response), or other predetermined responsiveness setting, where the different settings are used to choose between a more pronounced and immediate steering response (e.g., a faster control loop response) or reduced steering actuator activity (e.g., a slower control loop response). In some embodiments, a responsiveness setting may correspond to a maximum desired lateral acceleration during a turn. In such embodiments, the responsiveness setting may modify a gain, a deadband, a limit on an output, a bandwidth of a filter, and/or other control loop parameters of controller 130, as described herein.

In further embodiments, user interface 120 may be adapted to accept user input including a user-defined target attitude, orientation, and/or position for an actuated device (e.g., sonar system 110) associated with mobile structure 101, for example, and to generate control signals for adjusting an orientation and/or position of the actuated device according to the target attitude, orientation, and/or position. More generally, user interface 120 may be adapted to display sensor information to a user, for example, and/or to transmit sensor information and/or user input to other user interfaces, sensors, or controllers of system 100, for instance, for display and/or further processing.

For example, in some embodiments, user interface 120 may be implemented as a navigation aid device (NavAid) as described herein. In such embodiments, user interface 120 may be configured to facilitate a user defining a desired track (e.g., a path between waypoints). In related embodiments, user interface 120 may be configured to receive a position of mobile structure 101 (e.g., from GPS 146) and provide various signals derived from the position of mobile structure 101, the desired track, and/or the associated waypoints, including a cross track error (XTE), a bearing to waypoint (BTW), and a distance to waypoint (DTW), to another device of system 100, such as controller 130.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of steering sensor/actuator 150, propulsion system 170, mobile structure 101, and/or other elements of system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120), and/or may share a communication module or modules.

As noted herein, controller 130 may be adapted to execute one or more control loops for actuated device control, steering control (e.g., using steering sensor/actuator 150 and/or propulsion system 170) and/or performing other various operations of mobile structure 101 and/or system 100. In some embodiments, a control loop may include processing sensor signals and/or sensor information in order to control one or more operations of mobile structure 101 and/or system 100.

For example, controller 130 may be adapted to receive a measured heading 107 of mobile structure 101 from orientation sensor 140, a measured steering rate (e.g., a measured yaw rate, in some embodiments) from gyroscope/accelerometer 144, a measured speed from speed sensor 142, a measured position or series of absolute and/or relative positions from GPS 146, a measured steering angle from steering sensor/actuator 150, and/or a user input from user interface 120. In some embodiments, a user input may include a target heading 106, for example, an absolute position and/or waypoint (e.g., from which target heading 106 may be derived), and/or one or more other control loop parameters. In further embodiments, controller 130 may be adapted to determine a steering demand based on one or more of the received sensor signals, including the user input, and provide the steering demand to steering sensor/actuator 150 and/or propulsion system 170.

In some embodiments, a control loop may include a nominal vehicle predictor used to produce a feedback signal corresponding to an average or nominal vehicle/mobile structure rather than one specific to mobile structure 101. Such feedback signal may be used to adjust or correct control signals, such as control signals from a proportional, proportional-derivative, and/or proportional-derivative-integral controller module (e.g., implemented as a portion of controller 130) also forming a portion of the control loop, as described herein. In some embodiments, a control loop may include one or more vehicle dynamics modules corresponding to actual vehicles, for example, that may be used to implement an adaptive algorithm for training various control loop parameters, such as parameters for a nominal vehicle predictor, without necessitating real-time control of an actual mobile structure.

Orientation sensor 140 may be implemented as one or more of a compass, float, accelerometer, and/or other device capable of measuring an orientation of mobile structure 101 (e.g., magnitude and direction of roll, pitch, and/or yaw, relative to one or more reference orientations such as gravitationally defined "down", Magnetic North, and/or other reference orientations) and providing such measurements as sensor signals that may be communicated to various devices of system 100. In some embodiments, orientation sensor 140 may be adapted to provide heading measurements for mobile structure 101. For example, orientation sensor 140 and/or system 100 may be implemented and/or operated according to any one or combination of the systems and methods described in U.S. Provisional Patent Application No. 61/942,517 filed Feb. 20, 2014 and entitled "ACCELERATION CORRECTED ATTITUDE ESTIMATION SYSTEMS AND METHODS", which is hereby incorporated by reference in its entirety.

In other embodiments, orientation sensor 140 may be adapted to provide a pitch, pitch rate, roll, roll rate, yaw, and/or yaw rate for mobile structure 101 (e.g., using a time series of orientation measurements). In such embodiments, controller 130 may be configured to determine a compensated yaw rate based on the provided sensor signals. In various embodiments, a yaw rate and/or compensated yaw rate may be approximately equal to a steering rate of mobile structure 101. Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). In some embodiments, gyroscope/accelerometer 144 may be adapted to determine pitch, pitch rate, roll, roll rate, yaw, yaw rate, compensated yaw rate, an absolute speed, and/or a linear acceleration rate of mobile structure 101. Thus, gyroscope/accelerometer 144 may be adapted to provide a measured heading, a measured steering rate, and/or a measured speed for mobile structure 101. In some embodiments, gyroscope/accelerometer 144 may provide pitch rate, roll rate, yaw rate, and/or a linear acceleration of mobile structure 101 to controller 130, and controller 130 may be adapted to determine a compensated yaw rate based on provided sensor signals. Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module (e.g., optionally including other components of system 100) to ensure a common reference frame or a known transformation between reference frames.

GPS 146 may be implemented as a global positioning satellite receiver, a global navigation satellite system (GNSS) receiver, and/or other device capable of determining an absolute and/or relative position of mobile structure 101 based on wireless signals received from space-born and/or terrestrial sources, for example, and capable of providing such measurements as sensor signals that may be communicated to various devices of system 100. In some embodiments, GPS 146 may be adapted to determine and/or estimate a velocity, speed, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information.

Steering sensor/actuator 150 may be adapted to physically adjust a heading of mobile structure 101 according to one or more control signals, user inputs, and/or stabilized attitude estimates provided by one or more logic devices of system 100, such as controller 130. Steering sensor/actuator 150 may include one or more actuators and control surfaces (e.g., a rudder or other type of steering mechanism) of mobile structure 101, and may be adapted to sense and/or physically adjust the control surfaces to a variety of positive and/or negative steering angles/positions. For example, in some embodiments, steering sensor/actuator 150 may be implemented and/or operated according to any one or combination of the systems and methods described in U.S. Provisional Patent Application No. 61/934,678 filed Jan. 31, 2014 and entitled "HYDRAULIC SLIP COMPENSATION SYSTEMS AND METHODS", which is hereby incorporated by reference in its entirety.

Figure 1B:
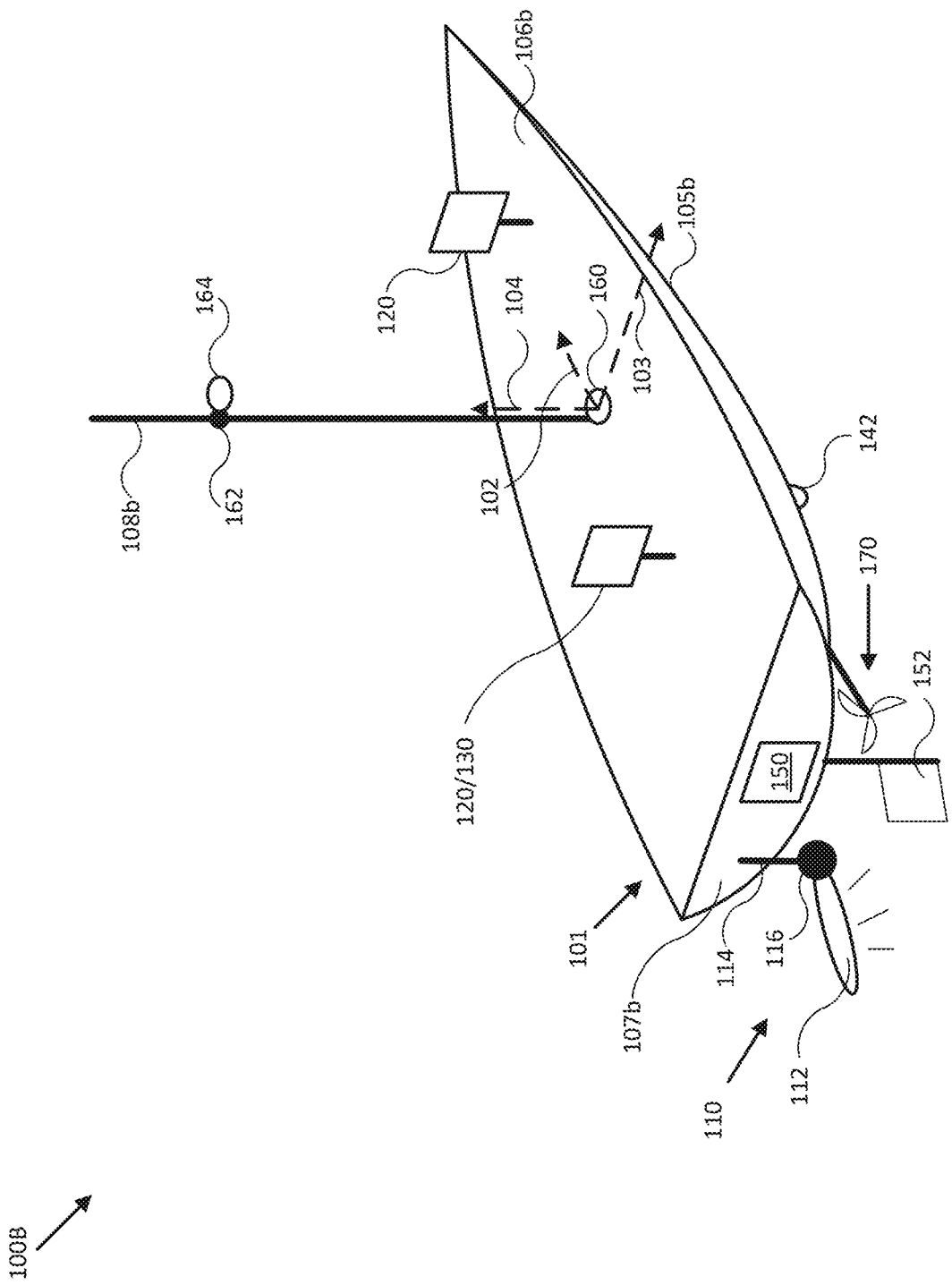
FIG. 1B illustrates a diagram of a watercraft in accordance with an embodiment of the disclosure.
Figure 1C:
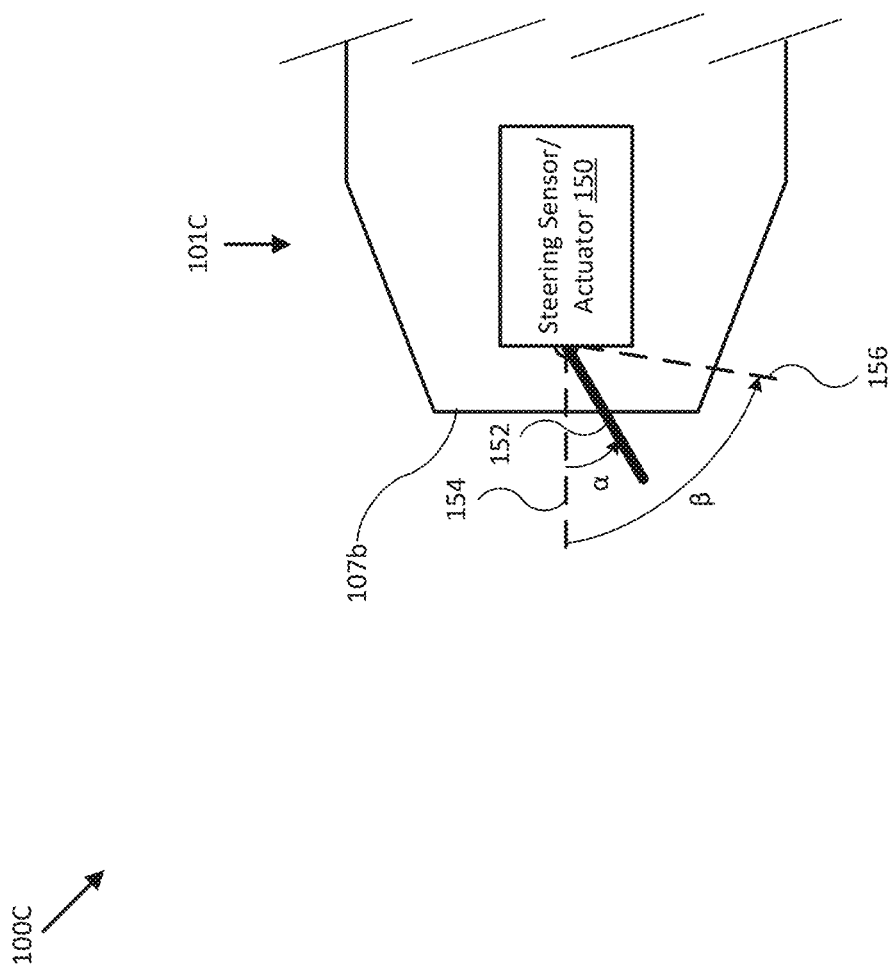
FIG. 1C illustrates a diagram of a rear portion of a watercraft in accordance with an embodiment of the disclosure.

As a further example, FIG. 1C illustrates a diagram of a rear portion of a watercraft including a directional control system in accordance with an embodiment of the disclosure. As shown in FIG. 1C, rear portion 101C of mobile structure 101 includes steering sensor/actuator 150 configured to sense a steering angle of rudder 152 and/or to physically adjust rudder 152 to a variety of positive and/or negative steering angles, such as a positive steering angle α measured relative to a zero steering angle direction (e.g., designated by a dashed line 154). In various embodiments, steering sensor/actuator 150 may be implemented with one or more steering actuator angle limits (e.g., a positive limit is designated by an angle θ and a dashed line 156 in FIG. 1C), and/or a steering actuator rate limit "R".

For example, a steering actuator rate limit may be a limit of how quickly steering sensor/actuator 150 can change a steering angle of a steering mechanism (e.g., rudder 152), and, in some embodiments, such steering actuator rate limit may vary depending on a speed of mobile structure 101 along heading 104 (e.g., a speed of a ship relative to surrounding water, or of a plane relative to a surrounding air mass). In further embodiments, a steering actuator rate limit may vary depending on whether steering sensor/actuator 150 is turning with (e.g., an increased steering actuator rate limit) or turning against (e.g., a decreased steering actuator rate limit) a prevailing counteracting force, such as a prevailing current (e.g., a water and/or air current). A prevailing current may be determined from sensor signals provided by orientation sensor 120, gyroscope/accelerometer 122, speed sensor 124, and/or GPS 126, for example.

In various embodiments, steering sensor/actuator 150 may be implemented as a number of separate sensors and/or actuators, for example, to sense and/or control one or more steering mechanisms substantially simultaneously, such as one or more rudders, elevators, automobile steering mechanisms, and/or other mechanisms suitable for steering a mobile structure, for example. In some embodiments, steering sensor/actuator 150 may include one or more sensors and/or actuators adapted to sense and/or adjust a propulsion force (e.g., a propeller speed and/or an engine rpm) of mobile structure 101, for example, to effect a particular directional control maneuver (e.g., to meet a particular steering demand within a particular period of time), for instance, or to provide a safety measure (e.g., an engine cut-off and/or reduction in mobile structure speed).

In some embodiments, rudder 152 (e.g., a steering mechanism) may be implemented as one or more control surfaces and/or conventional rudders, one or more directional propellers and/or vector thrusters (e.g., directional water jets), a system of fixed propellers and/or thrusters that can be powered at different levels and/or reversed to effect a steering rate of mobile structure 101, and/or other types or combination of types of steering mechanisms appropriate for mobile structure 101. In embodiments where rudder 152 is implemented, at least in part, as a system of fixed propellers and/or thrusters, steering angle α may represent an effective and/or expected steering angle based on, for example, characteristics of mobile structure 101, the system of fixed propellers and/or thrusters (e.g., their position on mobile structure 101), and/or control signals provided to steering sensor/actuator 150. An effective and/or expected steering angle α may be determined by controller 130 according to a pre-determined algorithm, for example, or through use of an adaptive algorithm for training various control loop parameters characterizing the relationship of steering angle α to, for instance, power levels provided to the system of fixed propellers and/or thrusters and/or control signals provided by controller 130, as described herein.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and/or may be coupled to and/or integrated with steering sensor/actuator 150, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example. As such, in some embodiments, propulsion system 170 may be integrated with steering sensor/actuator 150.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example. In some embodiments, other modules 180 may include one or more actuated and/or articulated devices (e.g., spotlights, visible and/or IR cameras, radars, sonars, and/or other actuated devices) coupled to mobile structure 101, where each actuated device includes one or more actuators adapted to adjust an orientation of the device, relative to mobile structure 101, in response to one or more control signals (e.g., provided by controller 130).

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100. In one embodiment, such method may include instructions to receive an orientation, acceleration, position, and/or speed of mobile structure 101 from various sensors, to determine a steering error or demand related to the sensor signals, and/or to control steering sensor/actuator 150 and/or other actuators or elements of system 100 to adjust operation of system 100 accordingly, for example, as described herein. In various embodiments, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein.

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements. For example, gyroscope/accelerometer 144 and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries, capacitors, or other electrical power storage devices, for example, and may include one or more solar cell modules or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of other elements of system 100 to/from a coordinate frame of mobile structure 101, at-rest and/or in-motion, and/or other coordinate frames, as described herein. One or more logic devices of system 100 may be adapted to use such parameters to transform a coordinate frame of the other elements of system 100 to/from a coordinate frame of orientation sensor 140 and/or mobile structure 101, for example. Furthermore, such parameters may be used to determine and/or calculate one or more adjustments to an orientation of an element of system 100 that would be necessary to physically align a coordinate frame of the element with a coordinate frame of orientation sensor 140 and/or mobile structure 101, for example, or an absolute coordinate frame and/or other desired positions and/or orientations. Adjustments determined from such parameters may be used to selectively power adjustment servos/actuators (e.g., of various elements of system 100), for example, or may be communicated to a user through user interface 120, as described herein.

FIG. 1B illustrates a diagram of system 100B in accordance with an embodiment of the disclosure. In the embodiment shown in FIG. 1B, system 100B may be implemented to provide directional control and/or other operational control of mobile structure 101, similar to system 100 of FIG. 1A. For example, system 100B may include integrated user interface/controller 120/130, secondary user interface 120, steering sensor/actuator 150, sensor cluster 160 (e.g., orientation sensor 140, gyroscope/accelerometer 144, and/or GPS 146), and various other sensors and/or actuators. In the embodiment illustrated by FIG. 1B, mobile structure 101 is implemented as a motorized boat including a hull 105b, a deck 106b, a transom 107b, a mast/sensor mount 108b, a rudder 152, an inboard motor 170, an actuated sonar system 110 coupled to transom 107b, and an actuated device 164 (e.g., a camera, spotlight, or other actuated device or sensor) coupled to mast/sensor mount 108b though roll, pitch, and/or yaw actuator 162. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1B, mobile structure 101 includes actuated sonar system 110, which in turn includes transducer assembly 112 coupled to transom 107b of mobile structure 101 through assembly bracket/actuator 116 and transom bracket/electrical conduit 114. In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of mobile structure 101 provided by user interface/controller 120/130. Similarly, actuator 162 may be adapted to adjust an orientation of actuated device 164 according to control signals and/or an orientation or position of mobile structure 101 provided by user interface/controller 120/130. For example, user interface/controller 120/130 may be adapted to receive an orientation of transducer assembly 112 and/or actuated device 164 (e.g., from sensors embedded within the assembly or device), and to adjust an orientation of either to maintain sensing/illuminating a position and/or absolute direction in response to motion of mobile structure 101, using one or more orientations and/or positions of mobile structure 101 and/or other sensor information derived by executing various methods described herein.

In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 stays substantially level with respect to a horizon and/or a "down" vector (e.g., to mimic typical user head motion/orientation). In another embodiment, at least one of user interfaces 120 may be located in proximity to mobile structure 101 and be mobile throughout a user level (e.g., deck 106b) of mobile structure 101. For example, secondary user interface 120 may be implemented with a lanyard and/or other type of strap and/or attachment device and be supported by a user of mobile structure 101 so as to be in proximity to mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 1B, in some embodiments, speed sensor 142 may be mounted to a portion of mobile structure 101, such as to hull 105b, and be adapted to measure a relative water speed. In some embodiments, speed sensor 142 may be adapted to provide a thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105b. In alternative embodiments, speed sensor 142 may be implemented as a wind velocity sensor, for example, and may be mounted to mast/sensor mount 108b to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108b (e.g., near a center of gravity of mobile structure 101). In one embodiment, the various axes may define a coordinate frame of mobile structure 101 and/or sensor cluster 160. Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cell modules or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

Figure 2:
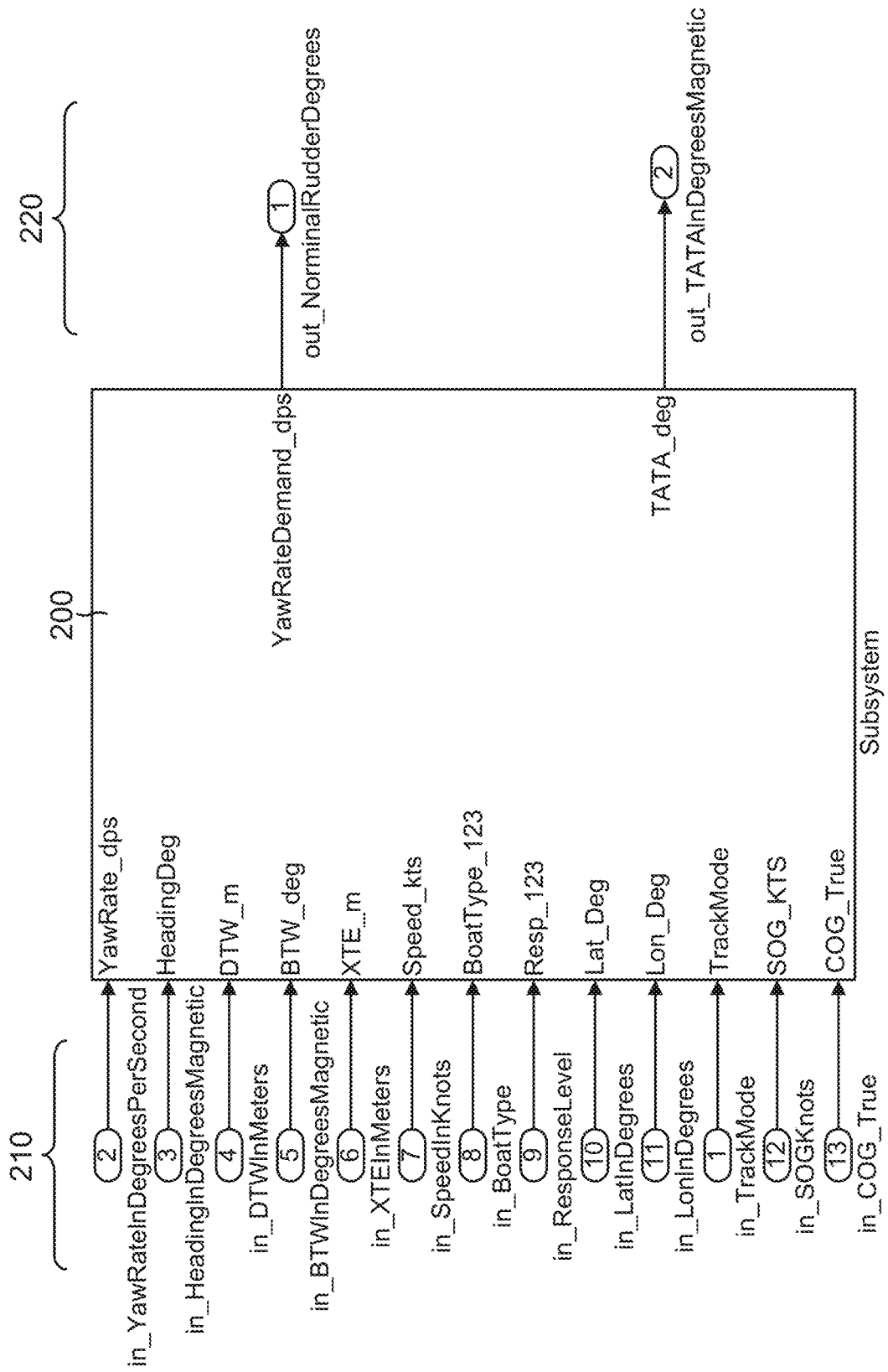
FIG. 2 illustrates input and output signals for an autopilot track keeping system in accordance with an embodiment of the disclosure.

FIG. 2 illustrates a top level view of input and output signals for an autopilot track keeping system 200 in accordance with an embodiment of the disclosure. In some embodiments, system 200 may be implemented as one or more control loops including a plurality of instructions running on one or more processors provided by, for example, controller 130 of system 100. For example, the operations of system 200 may be performed by controller 130 processing and/or operating on signals received from one or more of sensors 140-146, steering sensor/actuator 150, propulsion system 170, user interface 120, and/or other modules 180. For example, in various embodiments, system 200 (e.g., and various subsystems, blocks, control loops, and/or other processes of FIGS. 3 through 21) may be implemented and/or operated according to any one or combination of the systems and methods described in International Patent Application No. PCT/US2014/13441 filed Jan. 28, 2014 and entitled "STABILIZED DIRECTIONAL CONTROL SYSTEMS AND METHODS", U.S. patent application Ser. No. 14/321,646 filed Jul. 1, 2014 and entitled "STABILIZED DIRECTIONAL CONTROL SYSTEMS AND METHODS", and/or U.S. Provisional Patent Application No. 62/099,022 filed Dec. 31, 2014 and entitled "STABILIZED DIRECTIONAL CONTROL SYSTEMS AND METHODS", which are hereby incorporated by reference in their entirety.

In accordance with an embodiment, each subsystem, block, control loop, and/or other process corresponding to system 200 and/or FIGS. 2 through 12 may be implemented entirely as instructions executed by controller 130, for example, or may be implemented in a combination of executable instructions and hardware, such as one or more inductors, capacitors, resistors, digital signal processors, and other analog and/or digital electronic devices. It should be appreciated that any step, sub-step, sub-process, block, or module of system 200 may be performed in an order or arrangement different from the embodiment illustrated by FIG. 2. For example, although the expanded view of system 200 in FIG. 3 includes block 350, in other embodiments, block 350 may not be present, for example, and/or may be replaced with one or more sensors providing corresponding measured data.

As shown in FIG. 2, system 200 receives a plurality of input signals 210 and provides a plurality of output signals 220 in response thereto. In various embodiments, input signals 210 may be provided and/or determined by appropriate components of FIGS. 1A and 1B (e.g., based on signals from local sensors of mobile structure 101, GPS 146, and/or other communications).

The following Table 1 summarizes input signals 210 and output signals 220:

TABLE 1

| | |
|---|---|
| YawRate_dps | Yaw rate (degrees per second) |
| HeadingDeg | Heading (degrees) |
| DTW_m | Distance to waypoint (meters) |
| BTW_deg | Bearing to waypoint (degrees) |
| XTE_m | Cross track error (meters) |
| Speed_kts | Speed (knots) |
| BoatType_123 | User selectable type of watercraft/boat (slow turn/heavy, typical turn/moderate, fast turn/light) |
| Resp_123 | User selectable type of track keeping (low rudder activity/less accuracy, moderate rudder activity/moderate accuracy, high rudder activity/high accuracy) |
| Lat_Deg | Latitude (degrees) |
| Lon_Deg | Longitude (degrees) |
| TrackMode | Initialization signal |
| SOG_KTS | Speed over ground (knots) |
| COG_TRUE | Course over ground (degrees) |
| YawRateDemand_dps | Rudder/steering angle adjustment (degrees per second) |
| TATA_deg | Turn angle to track acquisition (degrees) |

As further discussed herein, various sets of input signals 210 are selectively processed to provide output signals 220. Regarding output signals 220, YawRateDemand_dps is a control signal provided to steering actuator 150 and/or propulsion system 170 to steer mobile structure 101 to perform autopilot track keeping. TATA_deg is a data signal provided to user interface 120 to display to the user the turn angle (e.g., steering angle) to be executed by system 200 (e.g., to inform the user of upcoming maneuvers before they are executed).

Figure 3:
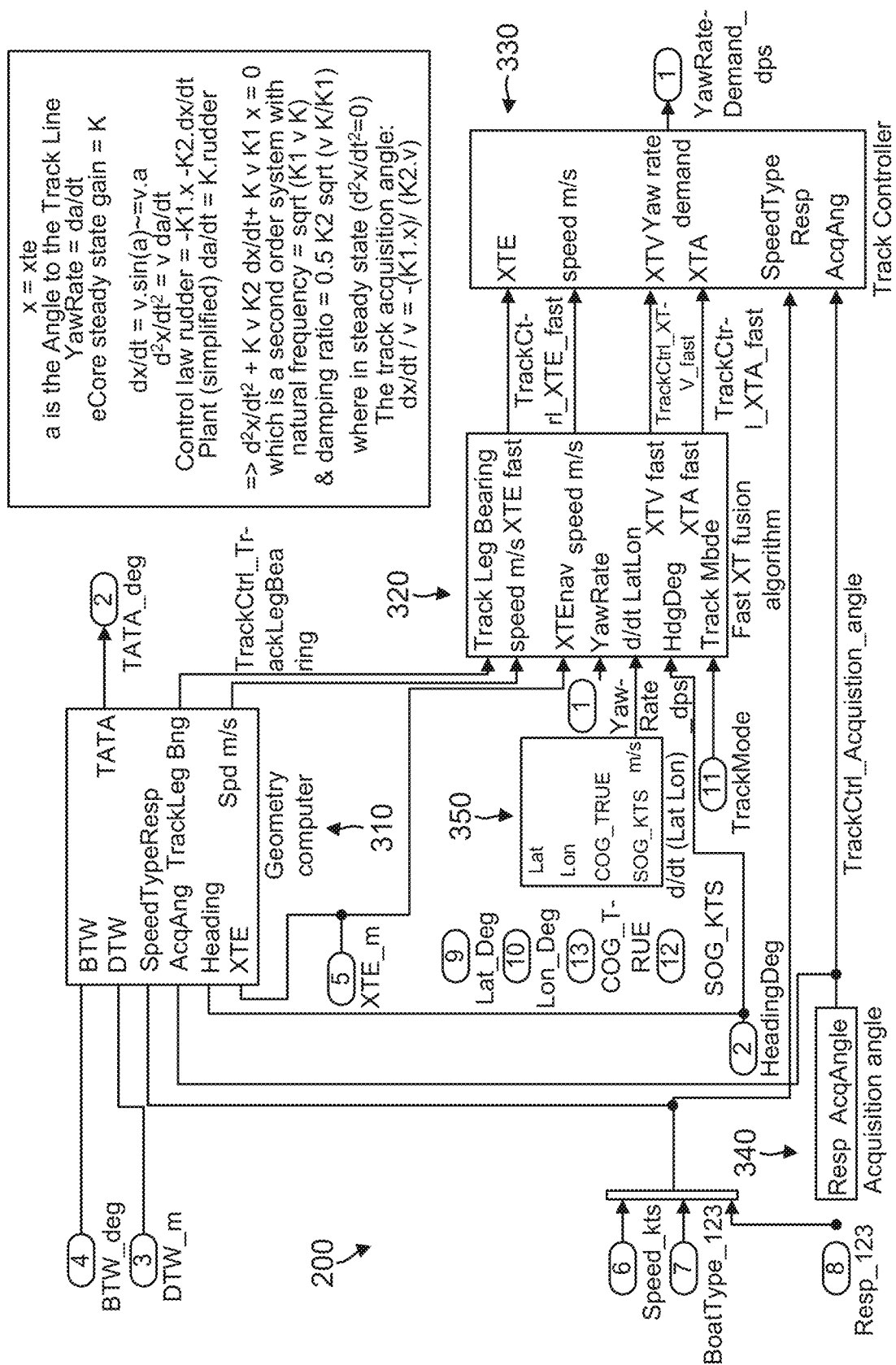
FIG. 3 illustrates a diagram of an autopilot track keeping system in accordance with an embodiment of the disclosure.

FIG. 3 illustrates a diagram of autopilot track keeping system 200 in accordance with an embodiment of the disclosure. As shown, system 200 includes a track leg bearing block 310, a cross track block 320, a track controller block 330, an acquisition angle block 340, and a conversion block 350.

Track leg bearing block 310 determines a bearing from a previous waypoint to the next waypoint, and also converts mobile structure speed from knots to meters/second. Cross track block 320 provides cross track acceleration XTA, cross track velocity XTV, and cross track error XTE signals. Track controller block 330 adjusts the rudder/steering angle as discussed herein. Acquisition angle block 340 provides track leg bearing block 310 and track controller block 330 with a maximum angle of track line approach based on the user selected type of track keeping. For example, acquisition angle block 340 may provide such information based on a lookup table data value in response to input signal Resp_123, which may correspond to a selected system responsiveness, as described herein. Conversion block 350 converts latitude, longitude, course over ground, and speed over ground input signals to meters/second.

Figure 4:
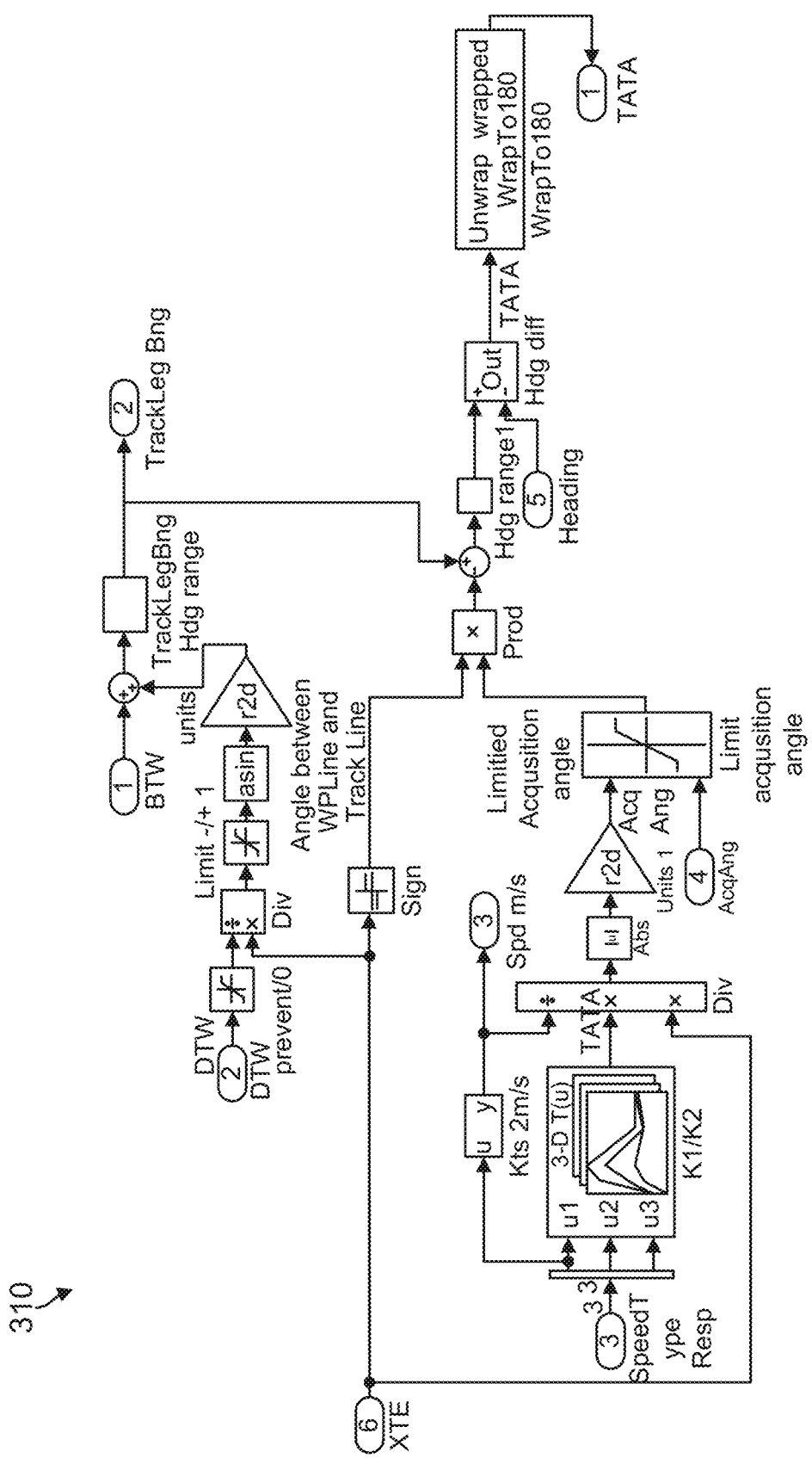
FIG. 4 illustrates a diagram of a track leg bearing block in accordance with an embodiment of the disclosure.

FIG. 4 illustrates a diagram of track leg bearing block 310 in accordance with an embodiment of the disclosure. Track leg bearing block 310 receives various input signals 210 including cross track error signal XTE, distance to waypoint signal DTW, and bearing to waypoint signal BTW (e.g., any of which may be based on and/or determined from signals from local sensors of mobile structure 101, GPS 146, user interface 120, and/or other communications).

In response to these signals, track leg bearing block 310 determines (e.g., calculates) the track leg bearing (e.g., the bearing from a previous waypoint to a target waypoint) and provides this bearing to cross track block 320 (e.g., as signal TrackLegBng). For example, in some embodiments, the track leg bearing can be determined in accordance with the following Equation 1 (e.g., using a triangle formed by the target waypoint, mobile structure 101, and the track between the previous and target waypoints):

TrackLegBng=BTW_deg+a sin(XTE_m/DTW_m)　　(Equation 1)

Track leg bearing block 310 also converts speed (e.g., provided as signal Speed_knts, also labeled SpeedTypeResp) from knots to meters/second and provides this speed to cross track block 320 (e.g., as signal Spd m/s). Track leg bearing block 310 also determines the turn angle to track acquisition and provides this angle as part of output signals 220 (e.g., as output signal TATA_deg).

Figure 5:
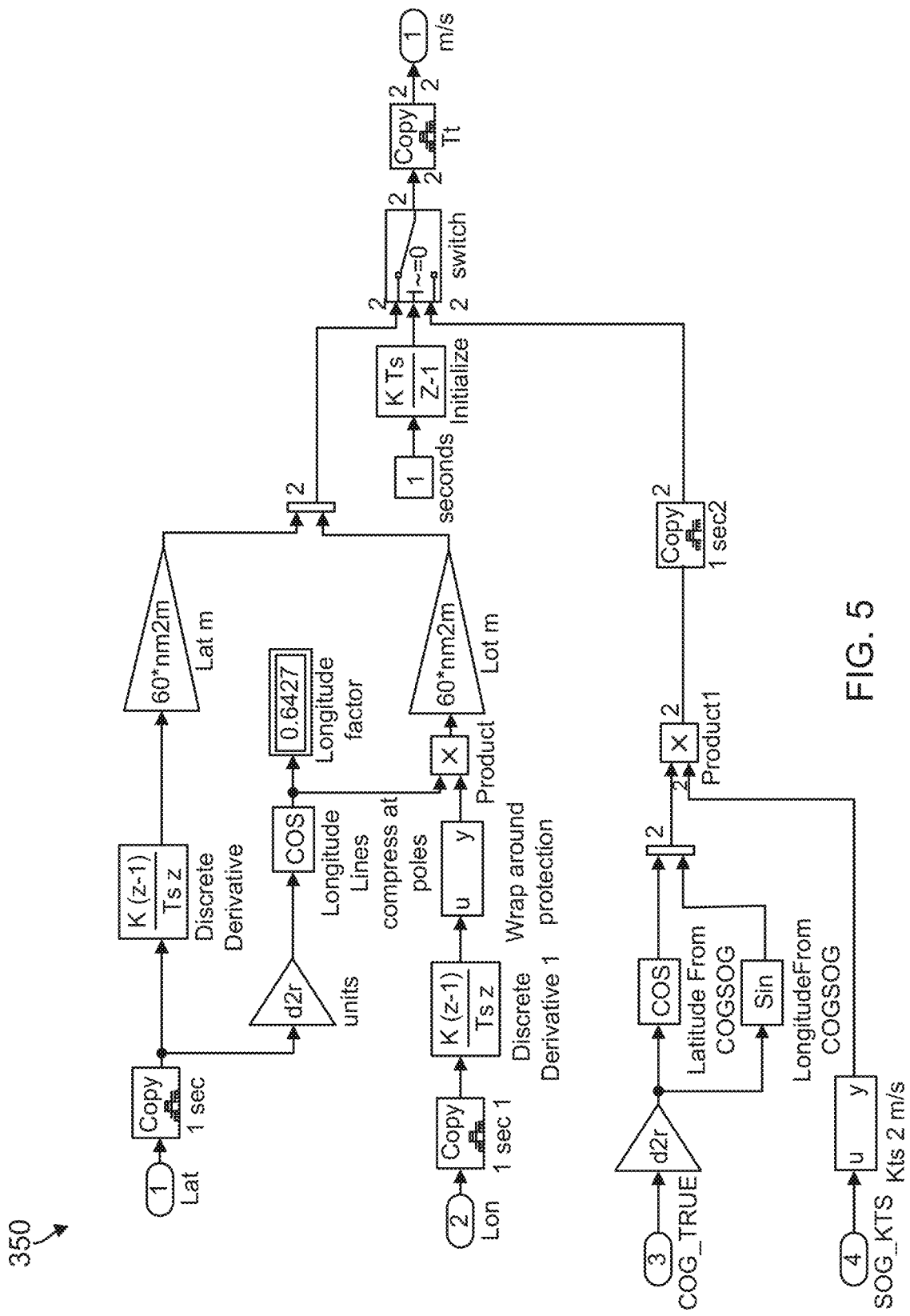
FIG. 5 illustrates a diagram of a conversion block in accordance with an embodiment of the disclosure.

FIG. 5 illustrates a diagram of conversion block 350 in accordance with an embodiment of the disclosure. Conversion block 350 receives various input signals 210 including latitude signal Lat_Deg, longitude signal Lon_Deg, course over ground signal COG_TRUE, and speed over ground signal SOG_KTS. In response to these signals, conversion block 350 selectively determines the speed of mobile structure 101 in meters/second based on Lat_Deg and Lon_Deg, or COG_TRUE and SOG_KTS, and provides this speed information to cross track block 320 as signal m/s.

Figure 6:
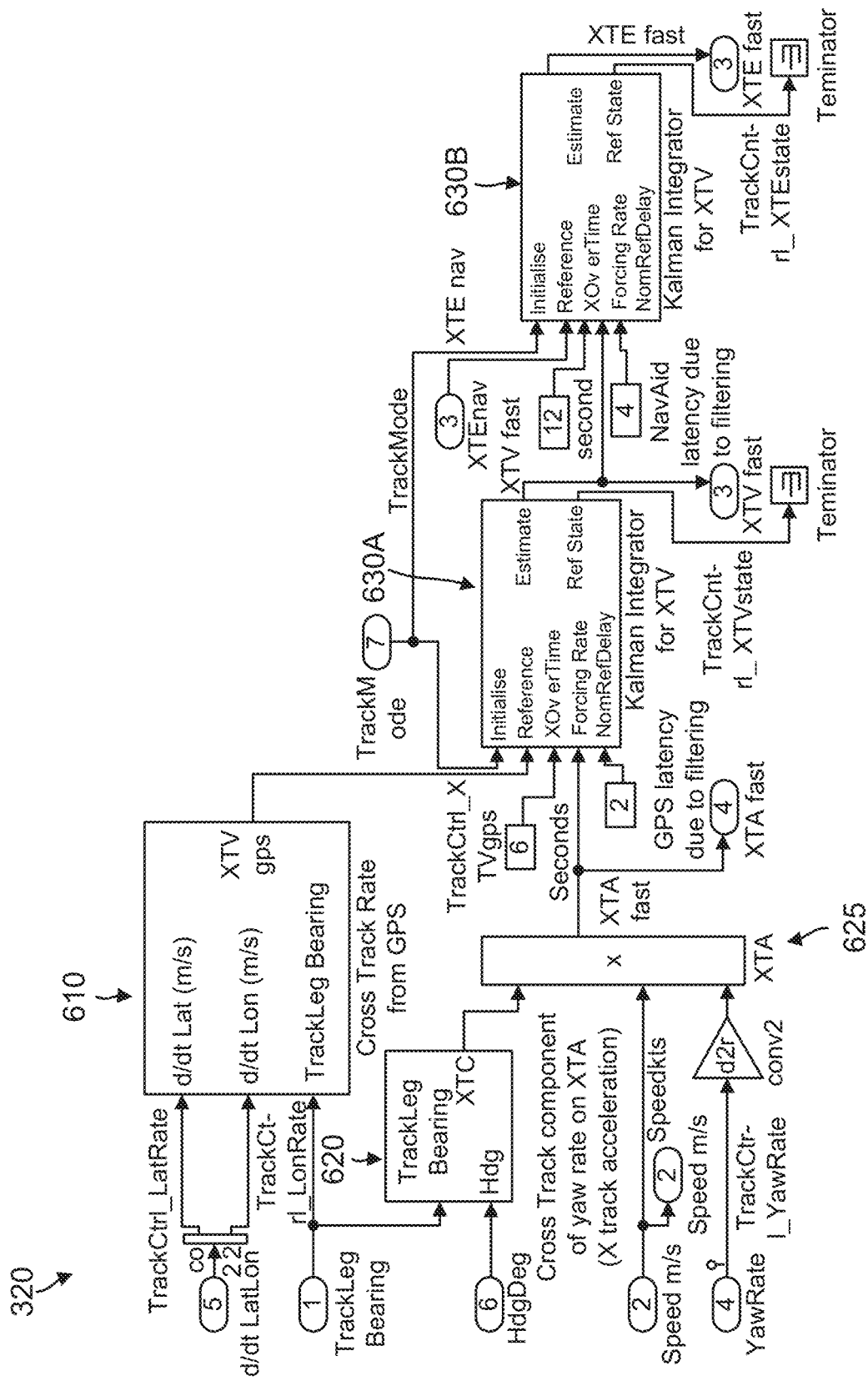
FIG. 6 illustrates a diagram of a cross track block in accordance with an embodiment of the disclosure.
Figure 7:
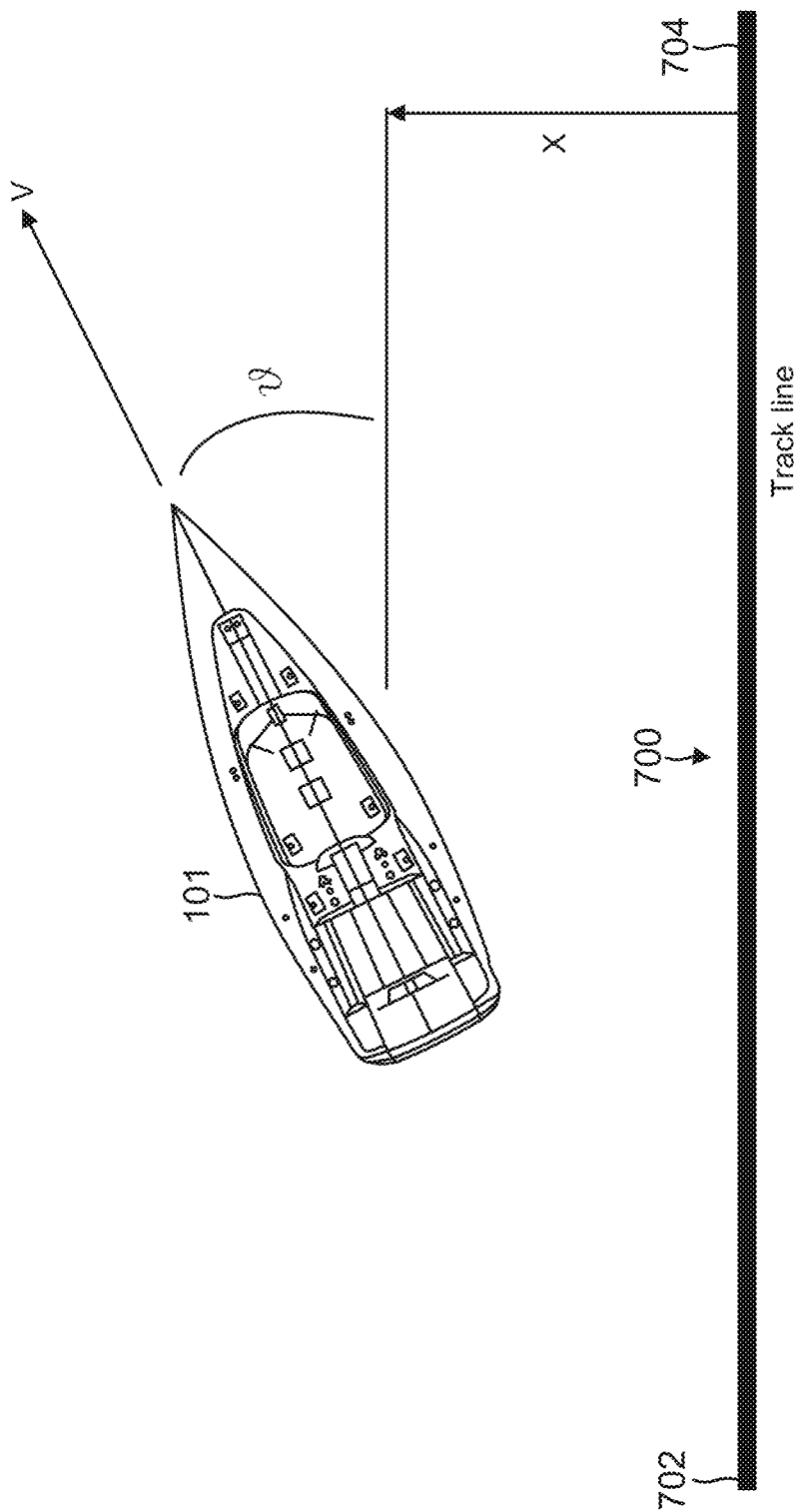
FIG. 7 illustrates a track line and orientation of a watercraft in accordance with an embodiment of the disclosure.

FIG. 6 illustrates a diagram of cross track block 320 in accordance with an embodiment of the disclosure. Cross track block 320 operates to determine cross track acceleration in accordance with the principles further illustrated in FIG. 7. In this regard, FIG. 7 illustrates a track line 700 and the orientation of watercraft 101 in accordance with an embodiment of the disclosure. Track line 700 identifies the desired (e.g., specified) track between a previous waypoint 702 and a target waypoint 704. Watercraft 101 exhibits a cross track error x, an off track angle and a velocity v.

The cross track velocity XTV (e.g., the rate of change of cross track error x) is given by the following Equation 2:

$$XTV = \frac{dx}{dt} = v\sin\vartheta \qquad \text{(Equation 2)}$$

For small angles and constant watercraft speeds, the cross track acceleration XTA is given by the following Equation 3, where $$\frac{d\vartheta}{dt}$$

is the yaw rate provided by input signals 210:

$$XTA = \frac{d^2x}{dt^2} = v\frac{d\vartheta}{dt} \quad \text{(Equation 3)}$$

Cross track acceleration XTA may be integrated to provide cross track velocity XTV, and cross track velocity XTV may be integrated to provide cross track error XTE. Thus, by using a high quality yaw rate signal to initially determine cross track acceleration XTA, noise and delay can be eliminated from the XTV and XTE determinations.

Referring again to FIG. 6, cross track block 320 includes cross track velocity calculation block 610, cross track component calculation block 620, cross track acceleration block 625, integrator block 630A, and integrator block 630B.

Figure 8:
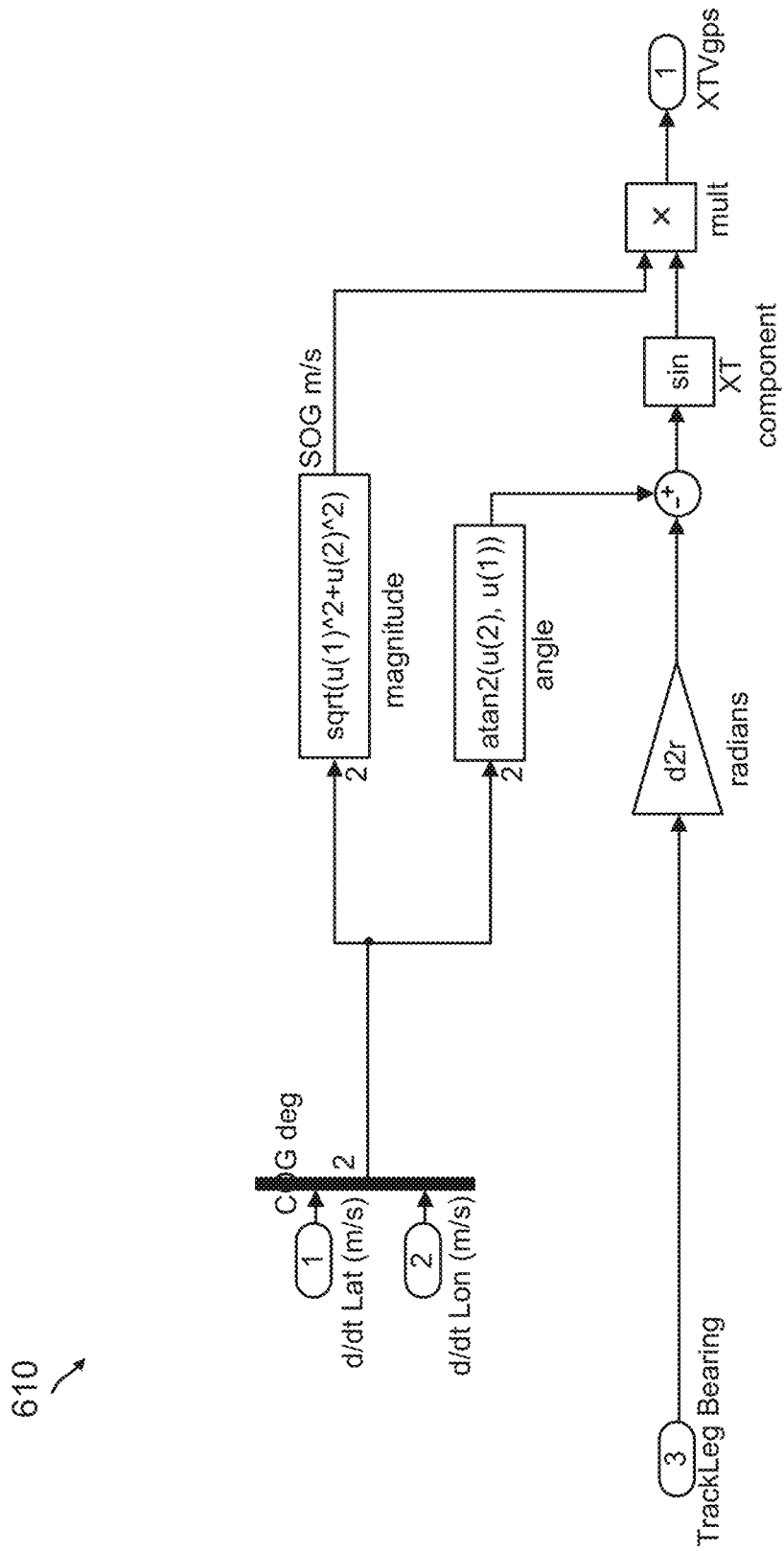
FIG. 8 illustrates a diagram of cross track velocity calculation block in accordance with an embodiment of the disclosure.

As further shown in FIG. 8, cross track velocity calculation block 610 provides a cross track velocity reference (e.g., as determined by GPS signals in the embodiment shown in FIG. 8) as signal XTVgps in response to the track leg bearing determined by track leg bearing block 310 and the speed determined by conversion block 350. In some embodiments, an estimate of this GPS-based cross track velocity can be determined by a projection of the Cartesian-based (e.g., North/East and/or linear coordinates) velocity onto the track leg bearing perpendicular (e.g., direction x in FIG. 7). More generally, this cross track velocity, which is used as a reference for integrator block 630A in FIG. 6, may be supplied using a variety of different types of measurements that can provide a damping cross track velocity reference for integrator block 630A.

Figure 9:
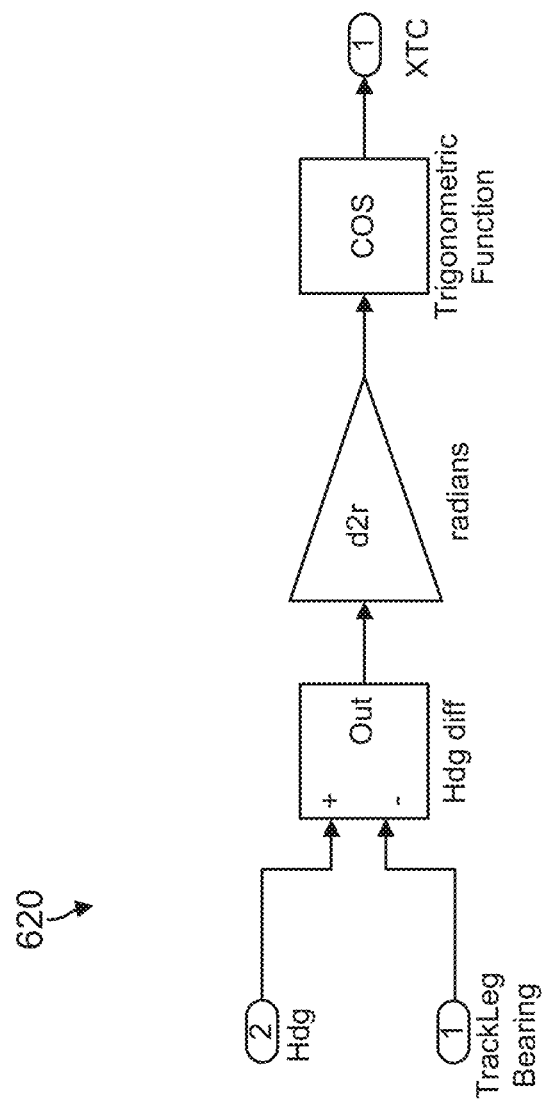
FIG. 9 illustrates a diagram of cross track component calculation block in accordance with an embodiment of the disclosure.

As further shown in FIG. 9, cross track component calculation block 620 determines the cross track component of the heading of mobile structure 101 (e.g., angle $\vartheta$ in FIG. 7) as signal XTC in response to the heading provided by input signals 210 and the track leg bearing determined by track leg bearing block 310. As shown in FIG. 6, signal XTC may be used in conjunction with the speed of mobile structure 101 provided by component block 310, the yaw rate provided by input signals 210, and cross track acceleration block 625 (e.g., a multiplier). In some embodiments, where angle $\vartheta$ is large, a cosine correction and/or other trigonometric or other functions may be performed as part of cross track component calculation block 620, as shown in FIG. 9.

Referring again to FIG. 6, cross track acceleration block 625 provides the cross track acceleration as signal XTAfast in response to signal XTC provided by component block 620, the speed provided by track leg bearing block 310, and the yaw rate provided by input signal YawRate_dps. Integrator block 630A integrates the cross track acceleration signal XTAfast to provide the cross track velocity as signal XTVfast. Integrator block 630B integrates the cross track velocity signal XTVfast to provide the cross track error as signal XTEfast.

Figure 10:
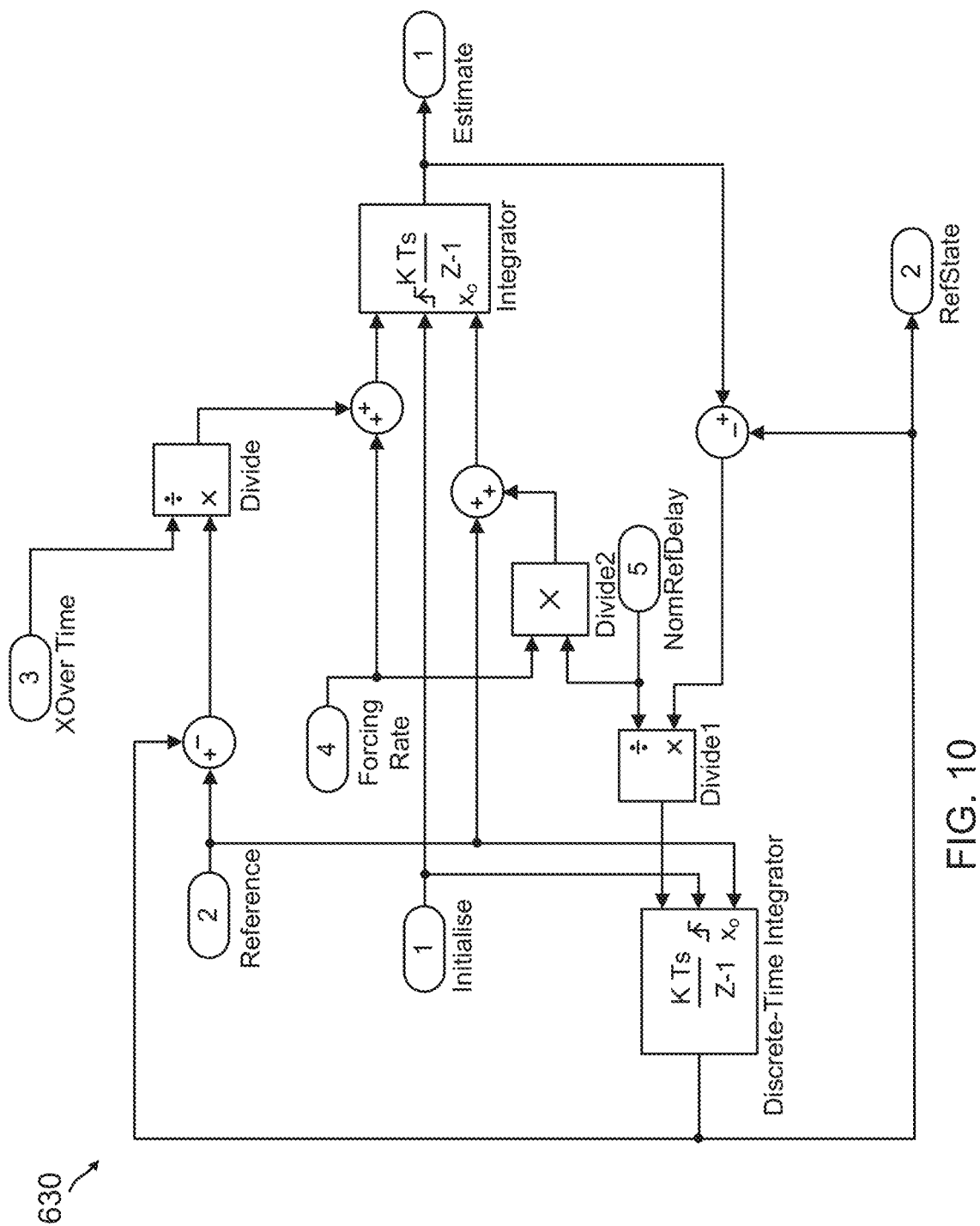
FIG. 10 illustrates a diagram of an integrator block in accordance with an embodiment of the disclosure.

FIG. 10 provides an example implementation that may be used for each of integrator blocks 630A and 630B. In this embodiment, an example integrator block 630 is implemented as a Kalman integrator that integrates the cross track acceleration signal XTAfast provided at the ForcingRate input to produce a cross track velocity XTV estimate, or that integrates the cross track velocity signal XTVfast provided at the ForcingRate input to produce a cross track error XTE estimate.

In some embodiments, any difference between the estimate calculated by integrator block 630 and the Reference signal (e.g., based on calculations performed on GPS signals) is used to slowly pull or damp the estimate towards the Reference signal, with a time constant set by signal XOverTime. In some embodiments, the Reference signal exhibits a lag of approximately 2 seconds to 4 seconds. In this regard, the estimate may be matched temporally to the Reference signal (e.g., by delaying the estimate by the lag time of the Reference signal) to improve filtering accuracy. In addition, initialization of integrator block 630 may be improved by advancing the Reference signal by the ForcingRate signal multiplied by the NomRefDelay signal, as shown.

Figure 11:
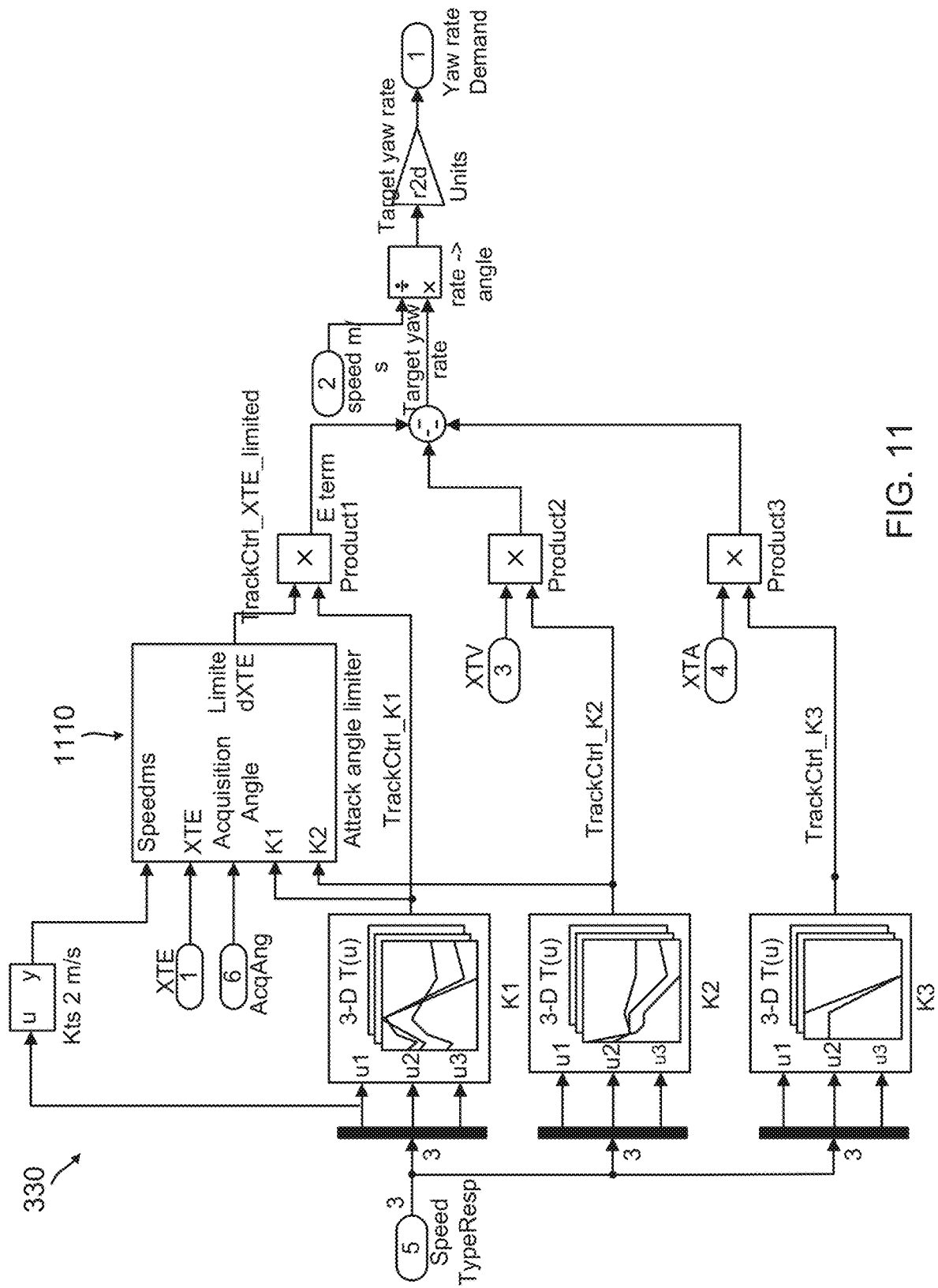
FIG. 11 illustrates a diagram of track controller block in accordance with an embodiment of the disclosure.

FIG. 11 illustrates a diagram of track controller block 330 in accordance with an embodiment of the disclosure. Track controller block 330 adjusts the rudder/steering angle (e.g., provided as output control signal YawRateDemand_dps) based on cross track acceleration XTA, cross track velocity XTV, cross track error XTE, and speed signals received from cross track block 320, the type of vessel selected (e.g., BoatType_123 input signal), and the maximum angle provided by acquisition angle block 340.

For example, each of the cross track acceleration XTA, cross track velocity XTV, and cross track error XTE signals may be multiplied by associated gains (e.g., dependent on the selected type of watercraft, speed, and/or system responsiveness) and summed. In some embodiments, one or more of the gains may be set to zero, so that YawRateDemand_dps may depend on only one or two of the cross track acceleration XTA, cross track velocity XTV, and cross track error XTE signals. In in one embodiment, the gain for the cross track acceleration XTA may be set to zero.

Because track controller block 330 relies on high quality cross track information determined in the manner discussed herein, the rudder/steering angle adjustment provided by track controller block 330 can be more accurate and less noise prone than conventional track keeping techniques.

Figure 12:
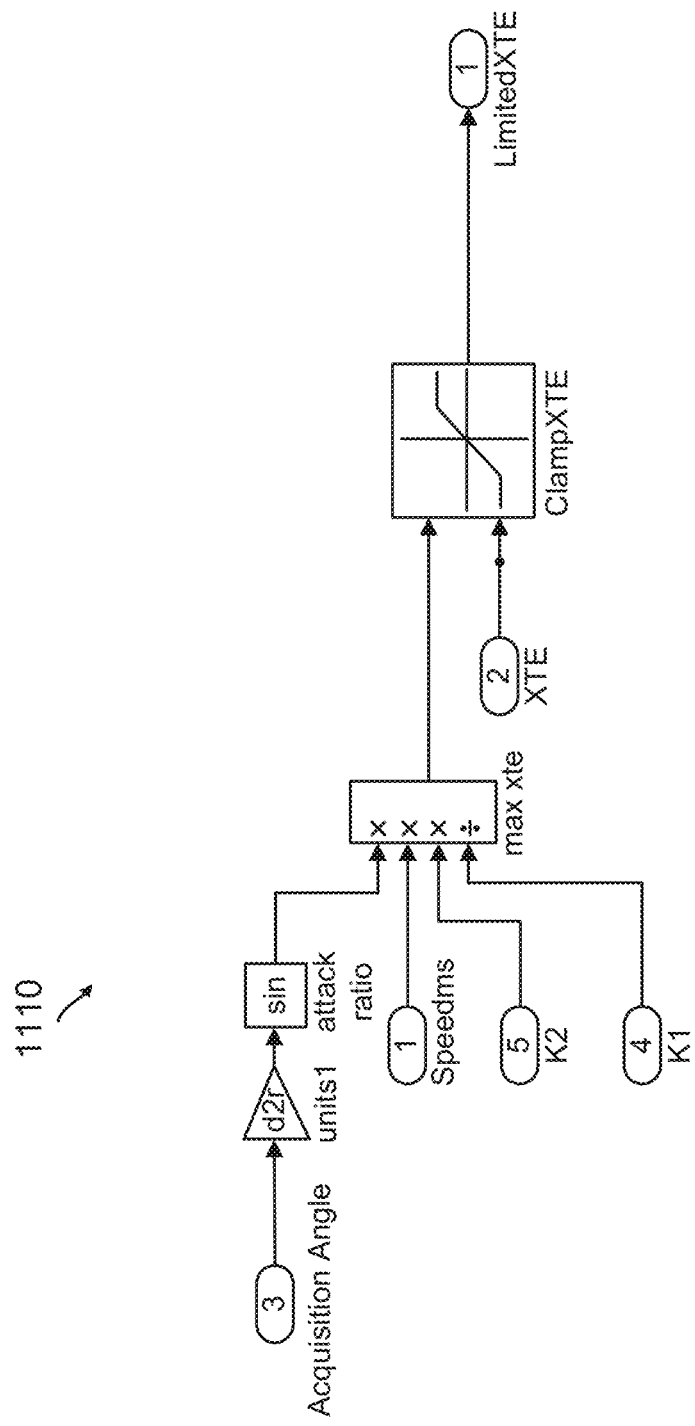
FIG. 12 illustrates a diagram of an attack angle limiter block in accordance with an embodiment of the disclosure.

Track controller block 330 includes an attack angle limiter block 1110 which is further illustrated in FIG. 12. Attack angle limiter block 1110 operates to limit the rudder/steering angle applied by track controller block 330 to prevent unduly sharp acquisition angles, as may be desired by a user as expressed through a particular system responsiveness setting or input, for example, and/or the selected type of watercraft and/or the present speed.

According to embodiments of the present disclosure, an autopilot track keeping system (e.g., similar to autopilot track keeping system 200) may be divided into one or more different control loops to help facilitate operation of the autopilot track keeping system and/or various other systems of mobile structure 101. For example, in some embodiments, a preprocessor control loop may be implemented to help extend data logging, reduce and/or eliminate track keeping initialization issues for a track controller control loop, and/or to provide certain parameters to other subsystems of mobile structure 101.

Figure 13:
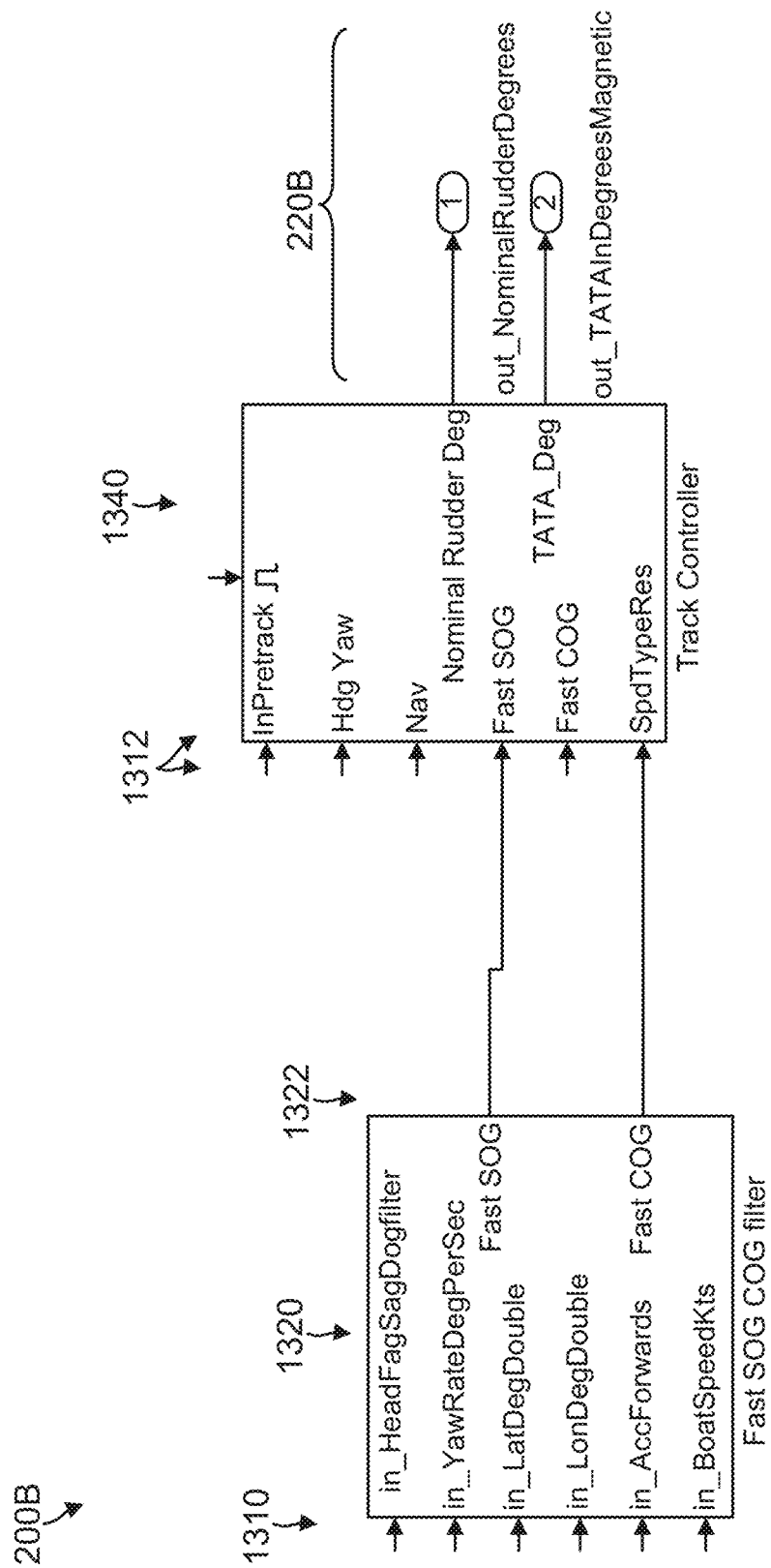
FIG. 13 illustrates input and output signals for an autopilot track keeping system in accordance with an embodiment of the disclosure.

FIG. 13 illustrates a top level view of input and output signals for an autopilot track keeping system 200B implemented with a preprocessor (e.g., fast SOG COG filter 1320) in accordance with an embodiment of the disclosure. As shown in FIG. 13, system 200B allows fast SOG COG filter/preprocessor 1320 and track controller 1340 to operate independently and/or simultaneously with respect to each other. As such, output signals 1322 of fast SOG COG filter 1320 may be generated and used by other control loops different from track controller 1340. Additionally, independent operation of fast SOG COG filter 1320 can provide shorter and/or less error prone initialization times when engaging autopilot track keeping system 200B. The term "fast" in "fast SOG COG filter 1320" is indicative of the general bandwidth of fast SOG COG filter 1320, such that the output signals 1322 change substantially simultaneously as actual measured motion of mobile structure 101 changes and substantially without artificial delay, such as delay associated with allowing track controller 1340 to complete a loop operation. In addition, output signals 1322 may be implemented to be substantially noise free.

As shown in the embodiment presented by FIG. 13, system 200B includes fast SOG COG filter 1320 and track controller 1340. Fast SOG COG filter 1320 generally produces a ground referenced velocity as SOG (magnitude) and COG (direction) signals 1322, and track controller 1340 generally uses the SOG and COG signals 1322, along with other sensor signals 1312, to generate a steering demand (e.g., NominalRudderDegrees) to keep mobile structure 101 travelling along a selected track with minimal excursions from that track. Embodiments of track controller 1340 generally produce rudder/steering angle adjustments that are more accurate and less prone to noise than those produced by conventional autopilots.

In various embodiments, system 200B may be implemented as one or more control loops including a plurality of instructions running on one or more processors provided by, for example, controller 130 of system 100. For example, the operations of system 200B may be performed by controller 130 processing and/or operating on signals received from one or more of sensors 140-146, steering sensor/actuator 150, propulsion system 170, user interface 120, and/or other modules 180. In various embodiments, system 200B (e.g., and various subsystems, blocks, control loops, and/or other processes of FIGS. 13 through 21) may be implemented and/or operated according to any one or combination of the systems and methods described with respect to FIGS. 2-12.

In accordance with an embodiment, each subsystem, block, control loop, and/or other process corresponding to system 200B and/or FIGS. 13 through 21 may be implemented entirely as instructions executed by controller 130, for example, or may be implemented in a combination of executable instructions and hardware, such as one or more inductors, capacitors, resistors, digital signal processors, and other analog and/or digital electronic devices. It should be appreciated that any step, sub-step, sub-process, block, or module of system 200B may be performed in an order or arrangement different from the embodiment illustrated by FIG. 13.

As shown in FIG. 13, fast SOG COG filter 1320 may be configured to receive a plurality of input signals 1310 and provide a plurality of output signals 1322 in response thereto. Track controller 1340 may be configured to receive a plurality of input signals 1312 (e.g., including output signals 1322) and provide a plurality of output signals 220B in response thereto. In various embodiments, input signals 1310 and 1312 may be provided and/or determined by appropriate components of FIGS. 1A and 1B (e.g., based on signals from local sensors of mobile structure 101, GPS 146, and/or other communications).

As further discussed herein, various sets of input signals 1310 and 1312 may be selectively processed to provide output signals 1322 and 220B. Regarding output signals 220B, NominalRudderDegrees may be implemented as a control signal (e.g., analogous to YawRateDemand_dps in FIG. 2) provided to steering actuator 150 and/or propulsion system 170 to steer mobile structure 101 to perform autopilot track keeping, for example. TATA_deg may be implemented as a data signal provided to user interface 120 to display to the user the turn angle (e.g., steering angle) to be executed by system 200B (e.g., to inform the user of upcoming maneuvers before they are executed), and/or other turn angle data.

Figure 14:
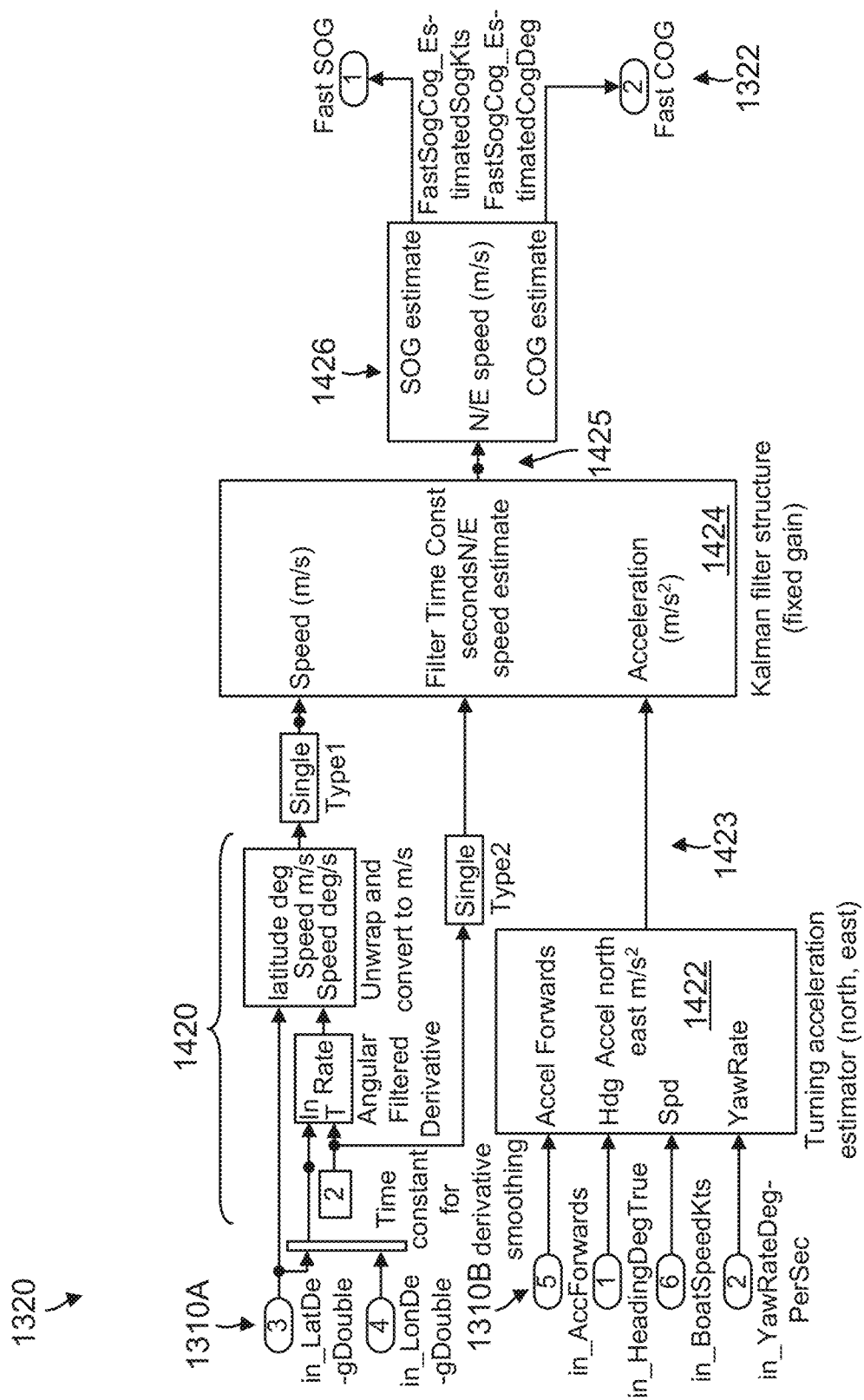
FIG. 14 illustrates a diagram of a ground velocity block in accordance with an embodiment of the disclosure.

FIG. 14 illustrates a diagram of a ground velocity block in accordance with an embodiment of the disclosure. In various embodiments, FIG. 14 may illustrate a more detailed diagram of fast SOG COG filter/preprocessor 1320 of FIG. 13. As shown in FIG. 14, fast SOG COG filter 1320 may include conversion block 1420, acceleration estimator 1422, filter block 1424, and conversion block 1426.

As shown, conversion block 1420 receives inputs 1310A and provides a ground referenced velocity estimate (e.g., magnitude and direction) of mobile structure 101 to filter block 1424. For example, conversion block 1420 may be configured to receive a series of absolute positions (e.g., latitude and longitude measurements) of mobile structure 101 from GPS 146 and generate an estimated ground velocity of mobile structure 101 by, for example, determining a derivative of the series of absolute positions. In some embodiments the output of conversion block 1420 may be filtered and/or generated according to a preselected time constant for derivative smoothing, as shown in FIG. 14. In some embodiments, such filtering may provide the benefit of selecting an update frequency that is substantially separate from the update frequency of position measurements, which may include system and/or measurement latencies ranging from fractions of a second to a minute between measurement updates.

Also shown in FIG. 14, acceleration estimator 1422 receives inputs 1310B and provides an absolute acceleration (magnitude and direction) of mobile structure 101 to filter block 1424. For example, inputs 1310B may include a longitudinal acceleration, a heading, a longitudinal speed (e.g., in water, air, or another medium), and/or a yaw rate of mobile structure 101, and the output of acceleration estimator 1422 may be referenced to the same absolute coordinate frame as that used to generate the ground referenced velocity provided by conversion block 1420. In various embodiments, the absolute acceleration provided by block 1422 may include centripetal acceleration experienced by mobile structure 101 (e.g., related to a measured yaw rate and/or longitudinal speed of mobile structure 101). In some embodiments, the absolute acceleration may be set to zero if it is not known (e.g., one or more inputs are unavailable) and/or has a magnitude below a preset threshold (e.g., typically a relatively small threshold, such as 0.5 m/s/s).

Filter block 1424 of FIG. 14 receives inputs 1423 and provides an updated ground velocity estimate 1425 (magnitude and direction) that accounts for the absolute acceleration provided by acceleration estimator 1422. Note that while block 1424 in FIG. 14 indicates "speed" in various inputs and outputs, "speed" in FIG. 14 refers to a multiple component speed, otherwise referred to as a velocity (e.g., with two or more components). In various embodiments, filter block 1424 may be configured to use the absolute acceleration of mobile structure 101 to adjust and/or update the ground referenced velocity provided by block 1420 to compensate for accelerations experienced by mobile structure 101 and generate updated speed estimate 1425.

For example, position data provided by GPS 146 may be updated as slowly as one or two seconds to a minute between measurements (e.g., due to system and measurement latencies, or due to a preselected time constant for derivative smoothing, as described herein), and so the ground referenced velocity estimate may be similarly slowly updated by block 1420. In some embodiments, block 1424 may be configured to adjust or update the ground referenced velocity estimate between the filtered position measurements, using the absolute acceleration provided by block 1422, synchronously with the measurements in some embodiments, and/or up to the update frequency of block 1422.

Figure 16:
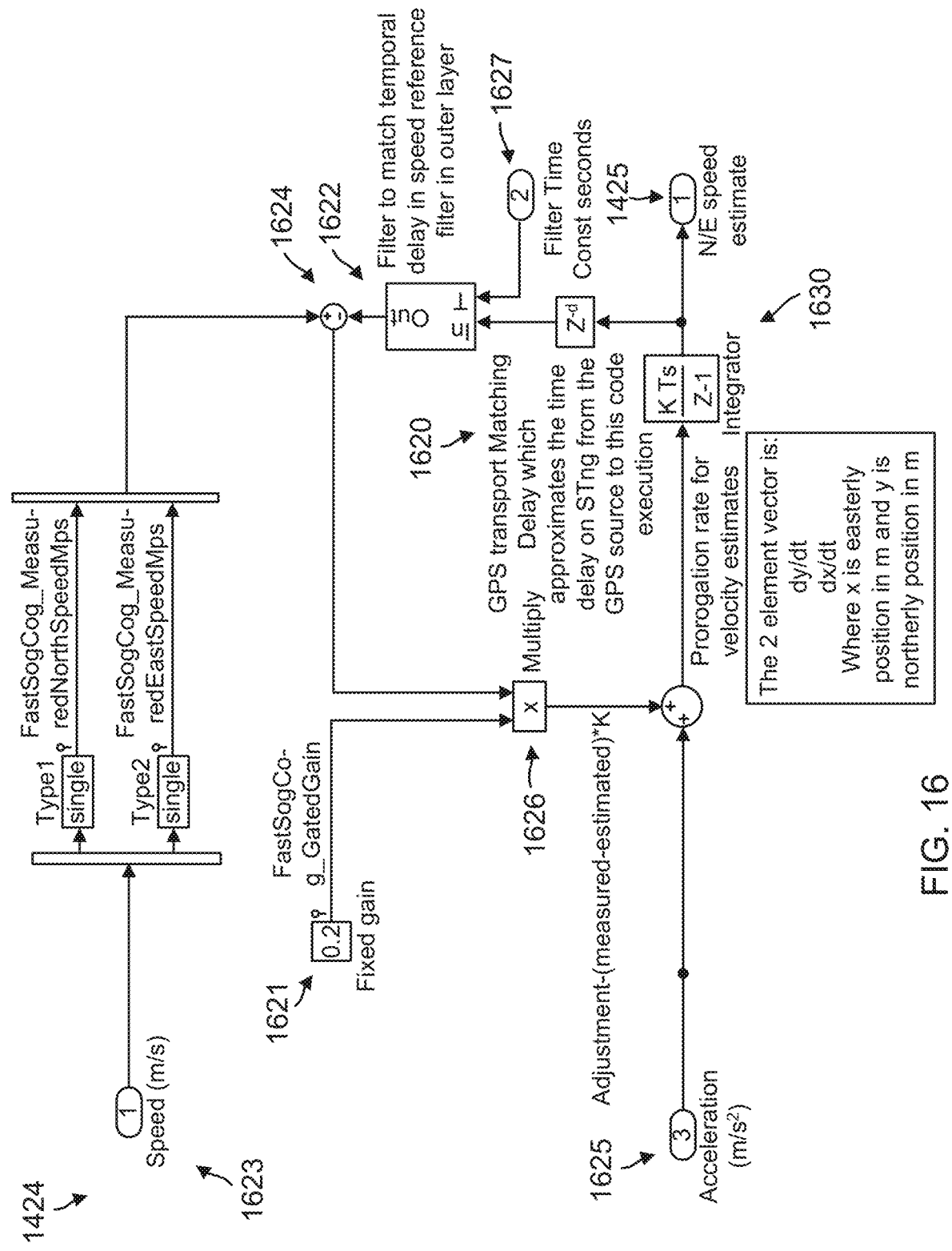
FIG. 16 illustrates a diagram of a filter block in accordance with an embodiment of the disclosure.

In various embodiments, operation of block 1424 may be adjusted according to a preselected time constant, which may in some embodiments be configured to match the preselected time constant used for the derivative smoothing implemented in embodiments of block 1420. For example, in some embodiments, as noted herein, the ground referenced velocity estimate provided by block 1420 may be delayed (e.g., updated slowly), and it can be preferable to provide a similarly delayed output of updated ground velocity estimate 1425 to achieve temporal matching of updated ground velocity estimate 1425. FIG. 16 includes further detail of filter block 1424.

Conversion block 1426 of FIG. 14 receives an updated ground velocity estimate as input 1425 and converts the updated ground velocity estimate into SOG (magnitude) and COG (direction/heading) outputs 1322 (e.g., a ground velocity estimate for mobile structure 101). For example, conversion block 1426 may be configured to convert vector components of updated ground velocity estimate of mobile structure 101 provided by block 1424 into a speed of mobile structure 101 and a heading of mobile structure 101 referenced to an absolute reference frame, such as magnetic or True North. More generally, conversion block 1426 may be configured to updated ground velocity estimate 1425 from one coordinate system to another (e.g., Cartesian to polar). In some embodiments, conversion block 1426 may be configured to convert m/s or other units of input 1425 to knots and degrees or other selected units of outputs 1322.

Figure 15:
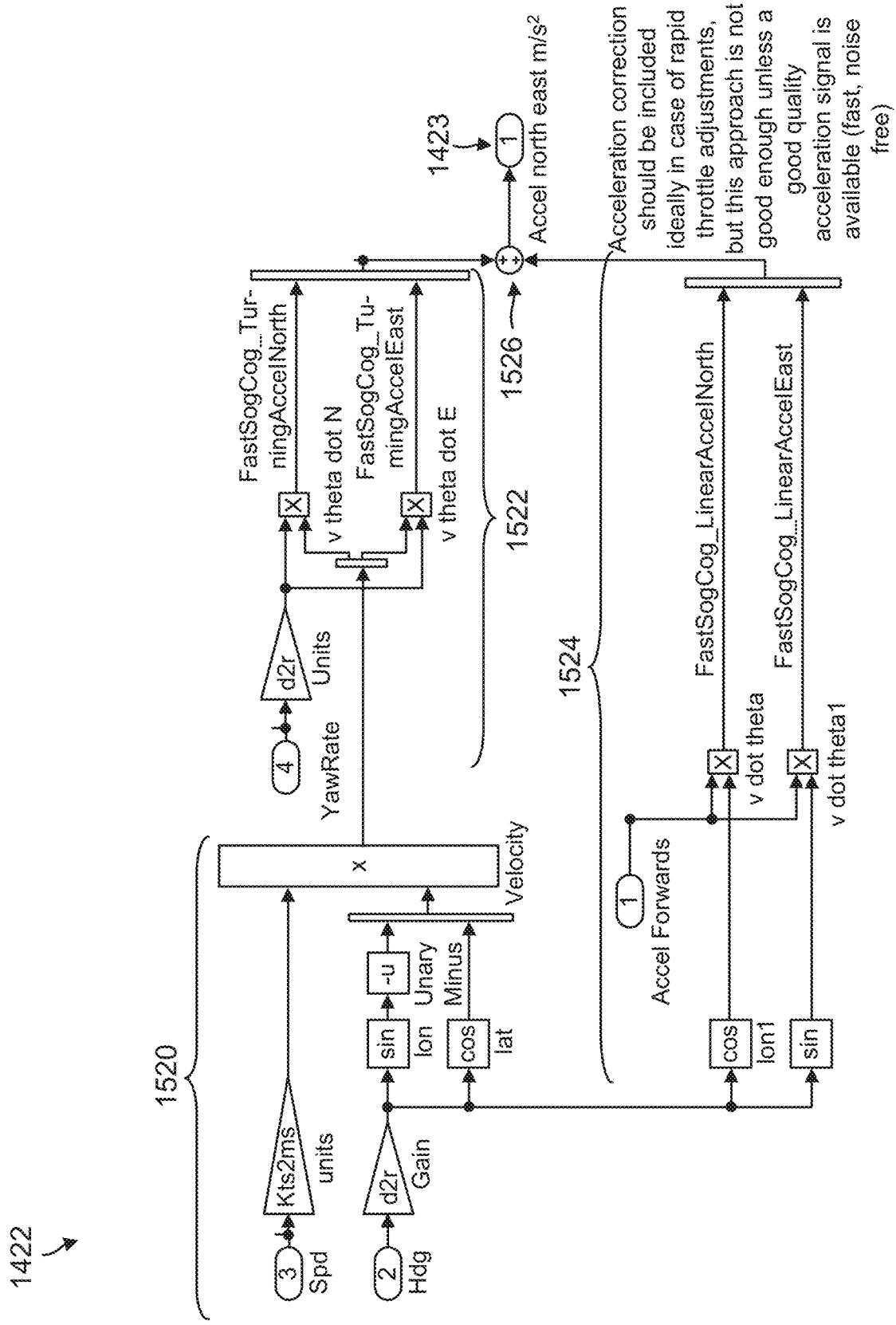
FIG. 15 illustrates a diagram of an acceleration estimator block in accordance with an embodiment of the disclosure.

FIG. 15 illustrates a diagram of acceleration estimator 1422 of fast SOG COG filter 1320, in accordance with an embodiment of the disclosure. As shown in FIG. 15, acceleration estimator 1422 may be configured to receive a speed and a heading of mobile structure 101 at section 1520 and determine an absolute velocity of mobile structure 101 (e.g., referenced to the same absolute coordinate frame as that used to provide the heading of mobile structure 101). At block 1522, acceleration estimator 1422 receives a yaw rate for mobile structure 101 and, using the absolute velocity generated by block 1520, determines components of centripetal any acceleration experienced by mobile structure 101 in the coordinate frame of the absolute velocity. Such components may be two dimensional (e.g., for motion along a two dimensional track as with sea going vessels and land vehicles, as shown in acceleration estimator 1422) or three dimensional (e.g., for moving along a three dimensional track).

At block 1524, acceleration estimator 1422 receives a longitudinal acceleration of mobile structure 101 and decomposes the longitudinal acceleration into components corresponding to the absolute coordinate frame used to provide the heading of mobile structure 101 in section 1520. At block 1526, the centripetal acceleration components provided by section 1522 are combined with the longitudinal acceleration components provided by section 1524 to provide the absolute acceleration of mobile structure 101 at output 1423. In some embodiments, the longitudinal acceleration input to block 1524 may be set to zero using the assumption that mobile structures typically attempt to track at substantially constant speeds.

FIG. 16 illustrates a diagram of filter block 1424 of fast SOG COG filter 1320, in accordance with an embodiment of the disclosure. As shown in FIG. 16, filter block 1424 receives a ground referenced velocity estimate 1623 and an absolute acceleration 1625 of mobile structure 101, from blocks 1420 and 1422 of FIG. 14, respectively, and/or a filter time constant 1627, which may also be supplied by block 1420, and provides an updated ground velocity estimate 1425. In some embodiments, filter block 1424 may be configured to receive and/or include as preset parameters fixed gain 1621 (e.g., which may be configured to adjust the feedback gain in filter block 1424) and position measurement delay 1620 (e.g., which may be configured to match or exactly compensate for temporal delay introduced in block 1420 for derivative smoothing, for example).

As shown in FIG. 16, updated ground velocity estimate 1425 may be determined from the various inputs and/or preset parameters using filter 1622 and integrator 1630. For example, in some embodiments, a gain adjusted ground referenced velocity estimate 1623 may be combined with absolute velocity 1625 and integrated to generate updated ground velocity estimate 1425. Subsequent loops of filter block 1424, which delay and filter the feedback of updated ground velocity estimate 1425 before combining it with ground referenced velocity estimate 1623 at 1624, refine and condition ground referenced velocity estimate 1623 and compensate for absolute acceleration 1625 of mobile structure 101.

Figure 17:
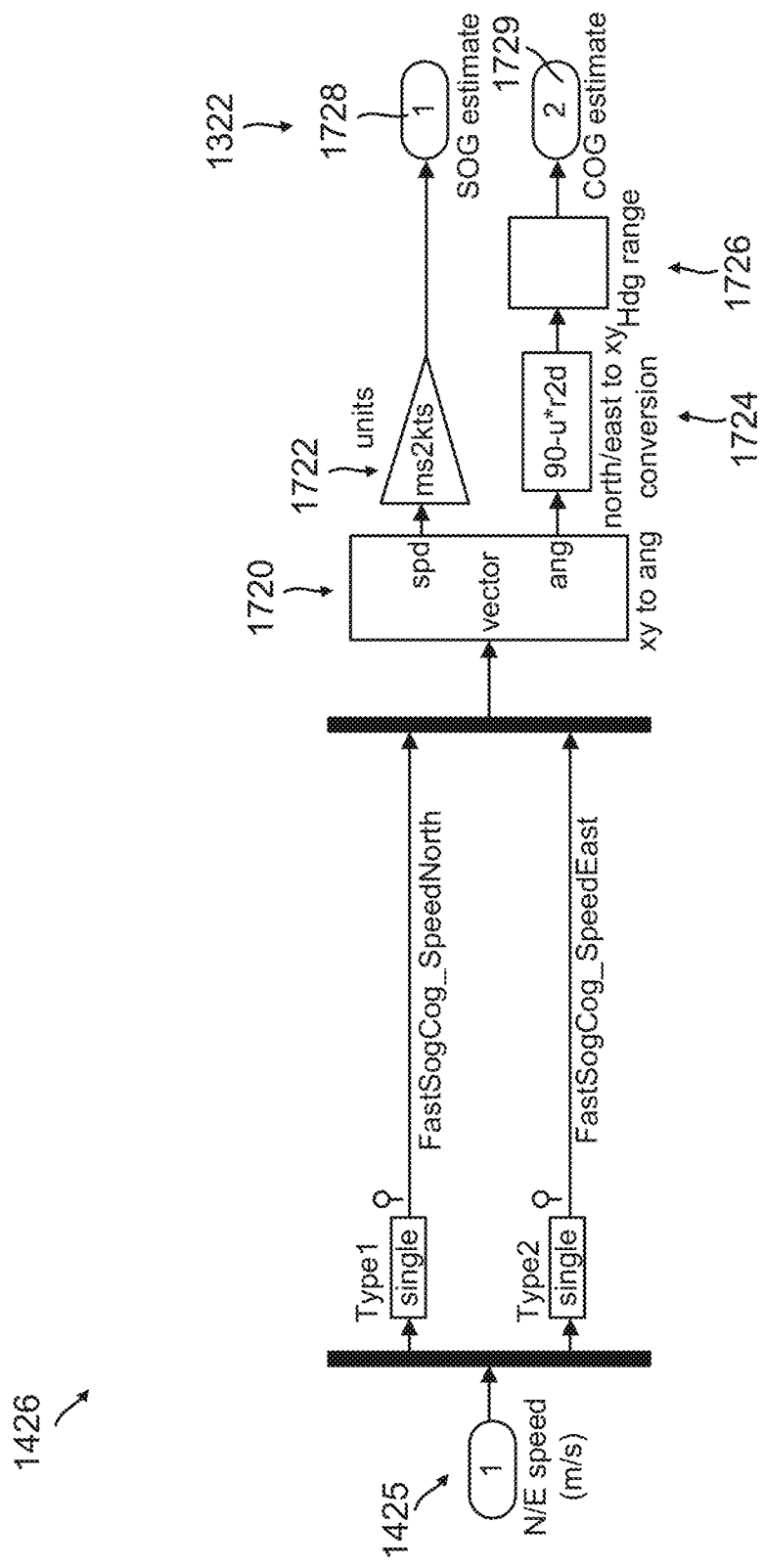
FIG. 17 illustrates a diagram of a velocity conversion block in accordance with an embodiment of the disclosure.

FIG. 17 illustrates a diagram of conversion block 1426 in accordance with an embodiment of the disclosure. In various embodiments, conversion block 1426 may be configured to convert updated ground velocity estimate 1425 from filter block 1424 from one coordinate system to another, such as Cartesian to polar coordinates, and provides SOG estimate 1728 and COG estimate 1729 at output 1322. Block 1720 converts updated ground velocity estimate 1425 into a magnitude component (SOG) for optional units conversion in block 1722 and output as SOG estimate 1728, and into an angle component (COG) referenced to the absolute coordinate frame of updated ground velocity estimate 1425 for optional units conversion in block 1724 and range limitation in block 1726 (e.g., 0-360 degrees converted to −180 to +180, see block 1948 in FIG. 19G).

Figure 18:
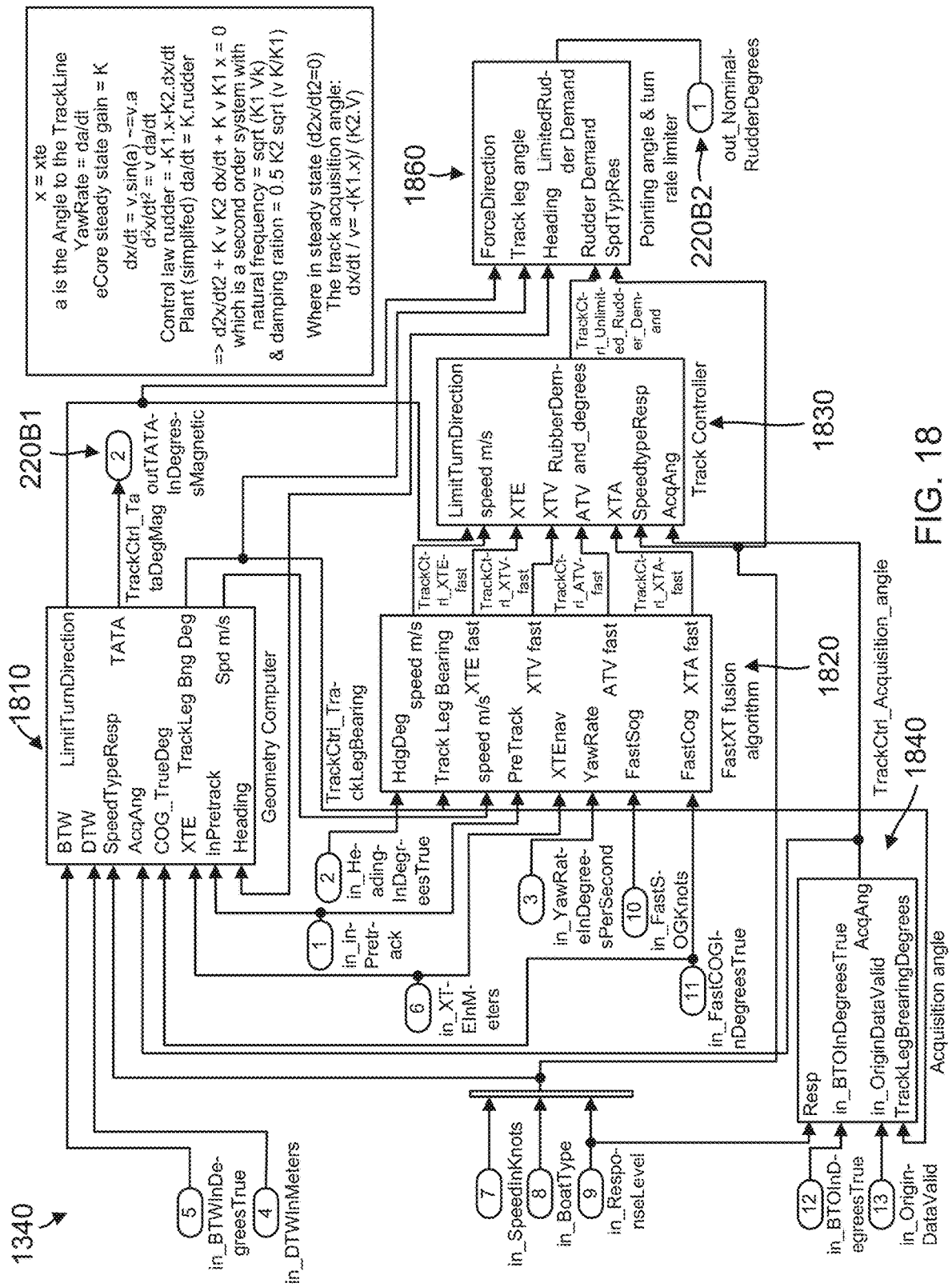
FIG. 18 illustrates a diagram of a track controller in accordance with an embodiment of the disclosure.

FIG. 18 illustrates a diagram of track controller 1340 in accordance with an embodiment of the disclosure. As shown, track controller 1340 includes track leg bearing block 1810, a cross track block 1820, a track controller block 1830, an acquisition angle block 1840, and a limiter block 1860. Track controller 1340 receives preTrack, speed, heading, yaw, SOG, COG, Responsiveness, and/or other signals as described herein. Track controller may be configured to provide TATA_deg 220B1 and/or NominalRudderDegrees 220B2. In general, track leg bearing block 1810, cross track block 1820, track controller block 1830, and acquisition angle block 1840 of system 200B may operate similarly with respect to track leg bearing block 310, cross track block 320, track controller block 330, and acquisition angle block 340 of system 200, respectively. However, as shown in FIG. 18, by making the fast SOG COG filter 1320 modular and external to track controller 1340, the SOG and COG signals provided by fast SOG COG filter 1320 can be used for other and/or additional operations, even within track controller 1340, which can result in increased overall system efficiency.

As shown in FIG. 18, track leg bearing block 1810 determines a bearing from a previous waypoint to the next waypoint and may in some embodiments convert units of a mobile structure speed (e.g., from knots to meters/second) for use with other operations within track controller 1340 and/or system 200B. In some embodiments, track leg bearing block 1810 may also provide a signal that may be used to limit and/or filter the turn direction, as described further herein. Cross track block 1820 provides cross track acceleration XTA, cross track velocity XTV, cross track error XTE, and/or along track velocity ATV signals. Track controller block 1830 provides rudder/steering demand/angle, as discussed herein. Acquisition angle block 1840 may be configured to provide track leg bearing block 1810 and track controller block 1830 with a maximum angle of track line approach (e.g., acquisition angle) based, at least in part, on the user selected type of track keeping (e.g., responsiveness). For example, acquisition angle block 1840 may provide such information based on a lookup table data value in response to input signal ResponseLevel, which may correspond to a selected system responsiveness as described herein. Limiter block 1860 may be configured to limit rudder demand based on heading, rudder demand, responsiveness setting, force direction, and/or other parameters, as discussed herein.

FIGS. 19A-G illustrates various diagrams corresponding to track leg bearing block 1810, in accordance with an embodiment of the disclosure. Track leg bearing block 1810 may be configured to receive various input signals, including cross track error signal XTE, distance to waypoint signal DTW, and bearing to waypoint signal BTW (e.g., any of which may be based on and/or determined from signals from local sensors of mobile structure 101, GPS 146, user interface 120, and/or other communications). In response to these signals, track leg bearing block 1810 may determine (e.g., calculate) the track leg bearing (e.g., the bearing from a previous waypoint to a target waypoint) and provides this bearing to cross track block 1820, acquisition angle block 1840, and/or limiter block 1860 (e.g., as signal TrackLeg-Bng). For example, as illustrated by the embodiment presented in FIG. 19A, track leg bearing block 1810 includes turn direction block 1910, track leg bearing calculation block 1920, turn angle to track acquisition (TATA) calculation block 1930, and TATA conditioning block 1940.

Figure 19A:
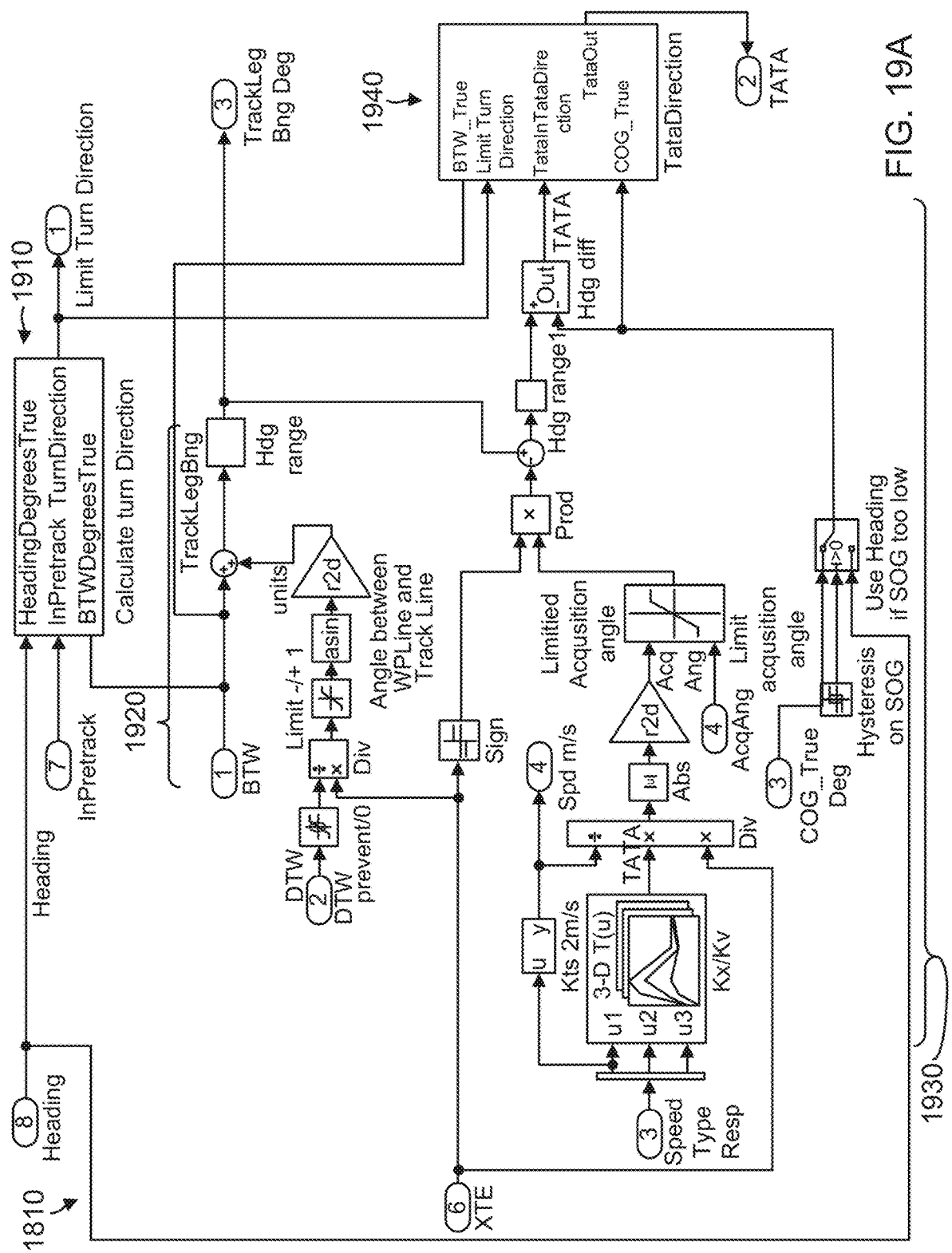
Figure 19B:
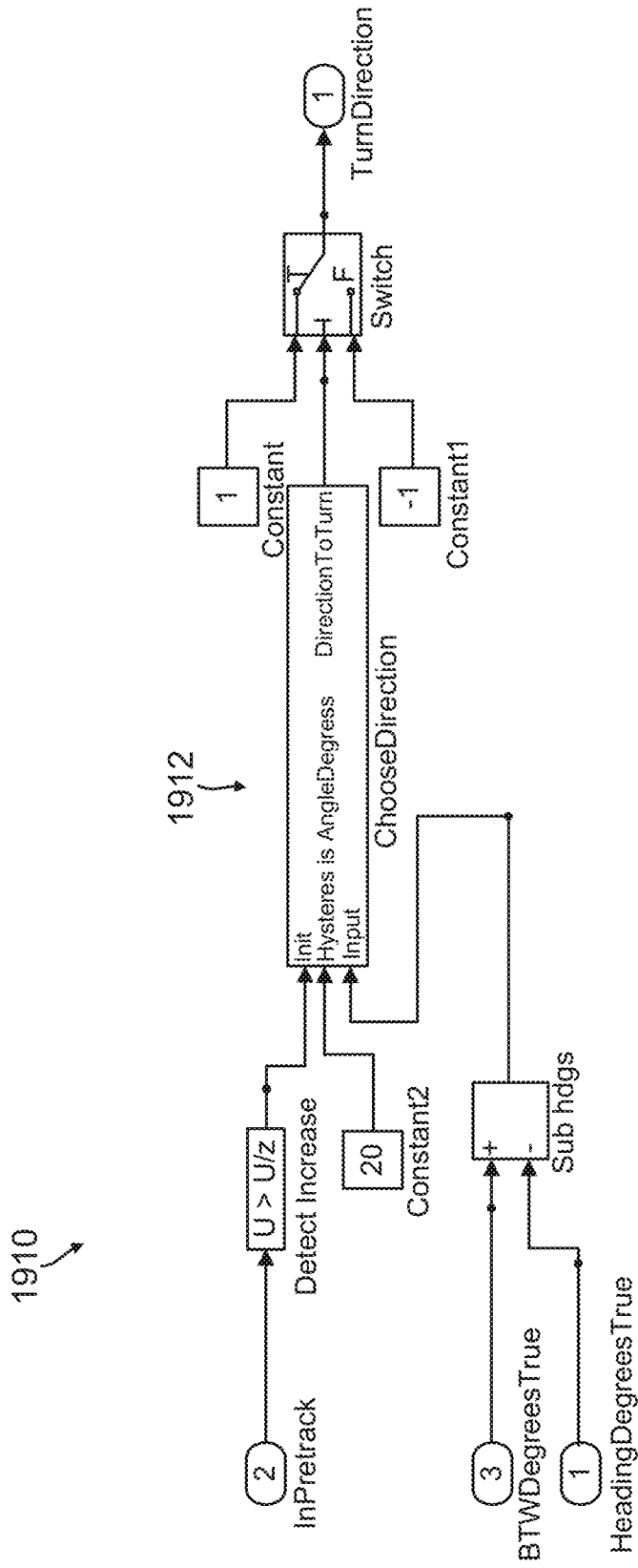

FIG. 19B illustrates a diagram of turn direction block 1910. Turn direction block 1910 may be configured to receive a heading and a bearing to waypoint corresponding to mobile structure 101 and a current track, for example, and provide a turn direction signal indicating a turn direction (e.g., port or starboard) for mobile structure 101 to turn to substantially match its heading to the bearing to waypoint of the current track. For example, in circumstances where the current track changes (e.g., the current waypoint originates, updates and/or otherwise changes, such as when initializing system 200B and/or supplying a track or series of waypoints to system 200B), mobile structure 101 may be oriented such that the smallest heading change to align with the newly updated track to waypoint would result in the rear of mobile structure facing the waypoint (and then an additional 180 degree turn to face the bow of the mobile structure towards the current waypoint/track direction). Turn direction block 1910 may be configured to determine a minimum turn angle (e.g., heading change) to align mobile structure 101 along the current track and/or towards the current waypoint and provide a turn direction corresponding to the determined minimum turn angle/heading change, and thereby help ensure that system 200B provides efficient track keeping for mobile structure 101, such as during waypoint transitions.

Figure 19C:
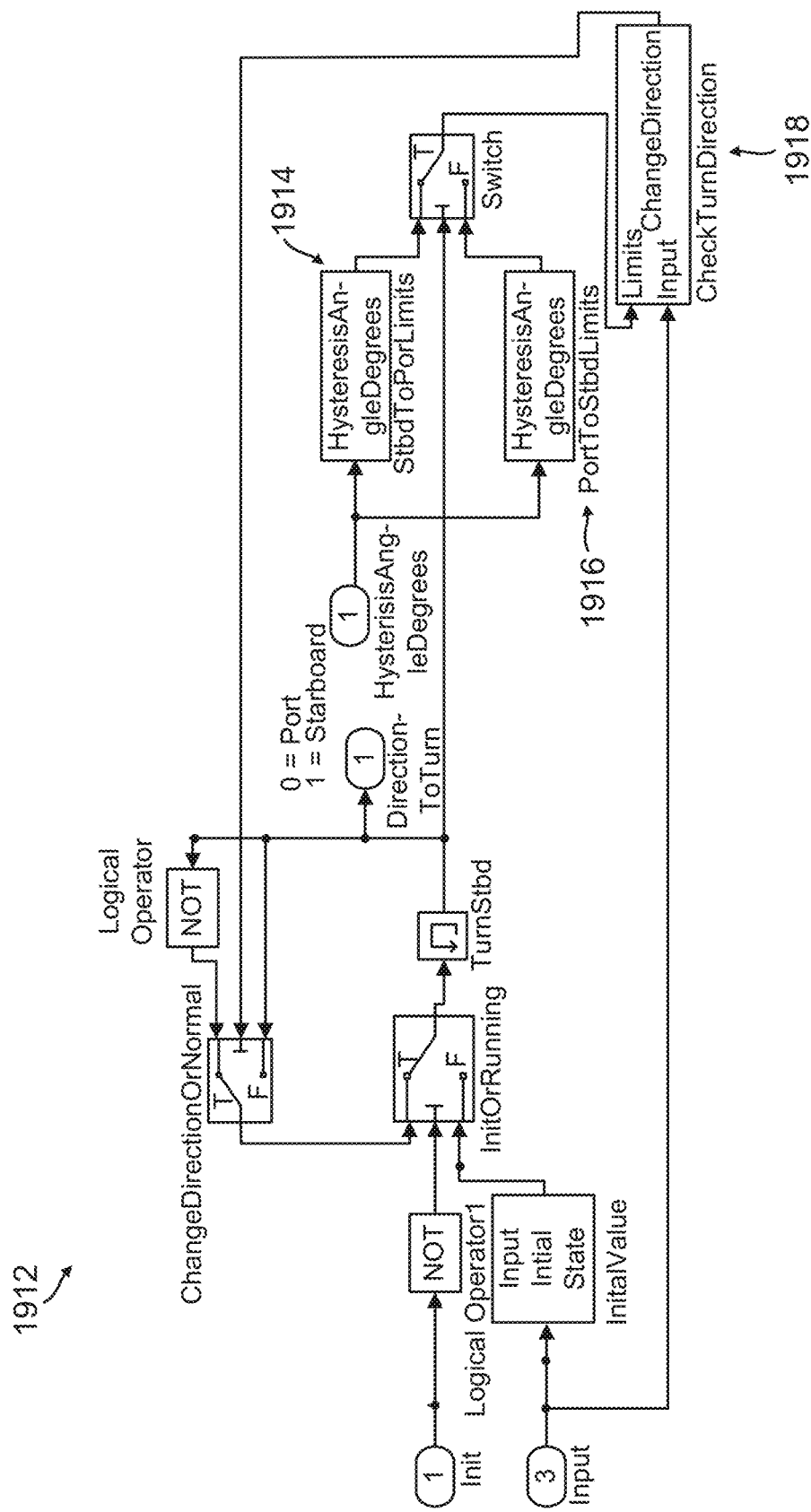

As illustrated by the embodiment presented in FIG. 19B, in some embodiments, turn direction block 1910 may include direction selector block 1912, which may be configured to select a turn direction based on a difference between the current heading of mobile structure 101 and a beating to waypoint. In various embodiments, turn direction block 1910 and/or direction selector block 1912 may be configured to provide the turn direction based on a state of system 200B, such as in an initialization or non-running state, or in a running state (e.g., corresponding to a state of inPretrack signal, which may in some embodiments correspond to the TrackMode signal in FIGS. 2-12). An embodiment of direction selector block 1912 is illustrated in detail in FIGS. 19C-F. For example, as shown in FIG. 19C, direction selector block 1912 may include left and right turning angle limit blocks 1914 and 1916 providing corresponding turning angle limits on a turning angle of mobile structure 101. Such limits and a heading error (e.g., a difference between the current bearing to waypoint and a current heading, a COG, and/or an estimated COG for mobile structure 101) may be provided to turn direction status block 1918 of direction selector block 1912. As shown in FIGS. 19C-E, various hysteresis constants may be provided to left and right turning angle limit blocks 1914 and 1916 to limit a range of heading errors indicating a change in the turning angle of mobile structure 101 is necessary to provide efficient, minimum turning angle track keeping, as describe herein. FIG. 19F illustrates an embodiment of turn direction status block 1918, which may be configured to provide a turn change signal based on whether the heading error is within or outside the turning angle limits corresponding to the current turning state of mobile structure 101.

As shown in FIG. 19A, track leg bearing calculation block 1920 may be configured to receive a bearing to waypoint, a distance to waypoint, and a cross track error and to determine a track leg bearing from those signals. In some embodiments, one or more of the signals and/or combinations of signals may be limited, filtered, conformed (e.g., to a range of values) and/or otherwise conditioned in block 1920. TATA calculation block 1930, also shown in FIG. 19A, may be configured to receive a cross track error, a speed, a mobile structure type and/or responsiveness setting, a COG, an SOG, and/or a track leg bearing (e.g., from rack leg bearing calculation block 1920) and provide a TATA estimate to TATA conditioning block 1940.

FIG. 19G illustrates a diagram of TATA conditioning block 1940. TATA conditioning block 1940 may be configured to receive the TATA estimate from TATA calculation block 1930, the turn direction from turn direction block 1910, a COG (or COG estimate based on a heading of mobile structure 101), and/or a bearing to waypoint and determine a conditioned TATA, as shown in FIGS. 19A and 19G. In FIG. 19G, block 1942 may be configured to limit the TATA estimate from TATA calculation block 1930 to a range of values, such as those corresponding to a typical maritime heading for mobile structure 101. Block 1944 may be configured to determine a difference between a COG or COG estimate of mobile structure 101 and the current bearing to waypoint. Block 1946 may be configured to determine if the turn direction from turn direction block 1910 contradicts the TATA estimate from TATA calculation block 1930, and then to force the TATA estimate to indicate the same direction as the turn direction from turn direction block 1910 if the current COG, estimated COG, and/or heading is pointed away from the current waypoint (e.g., the current heading error is greater than or equal to 90 degrees).

Figure 20A:
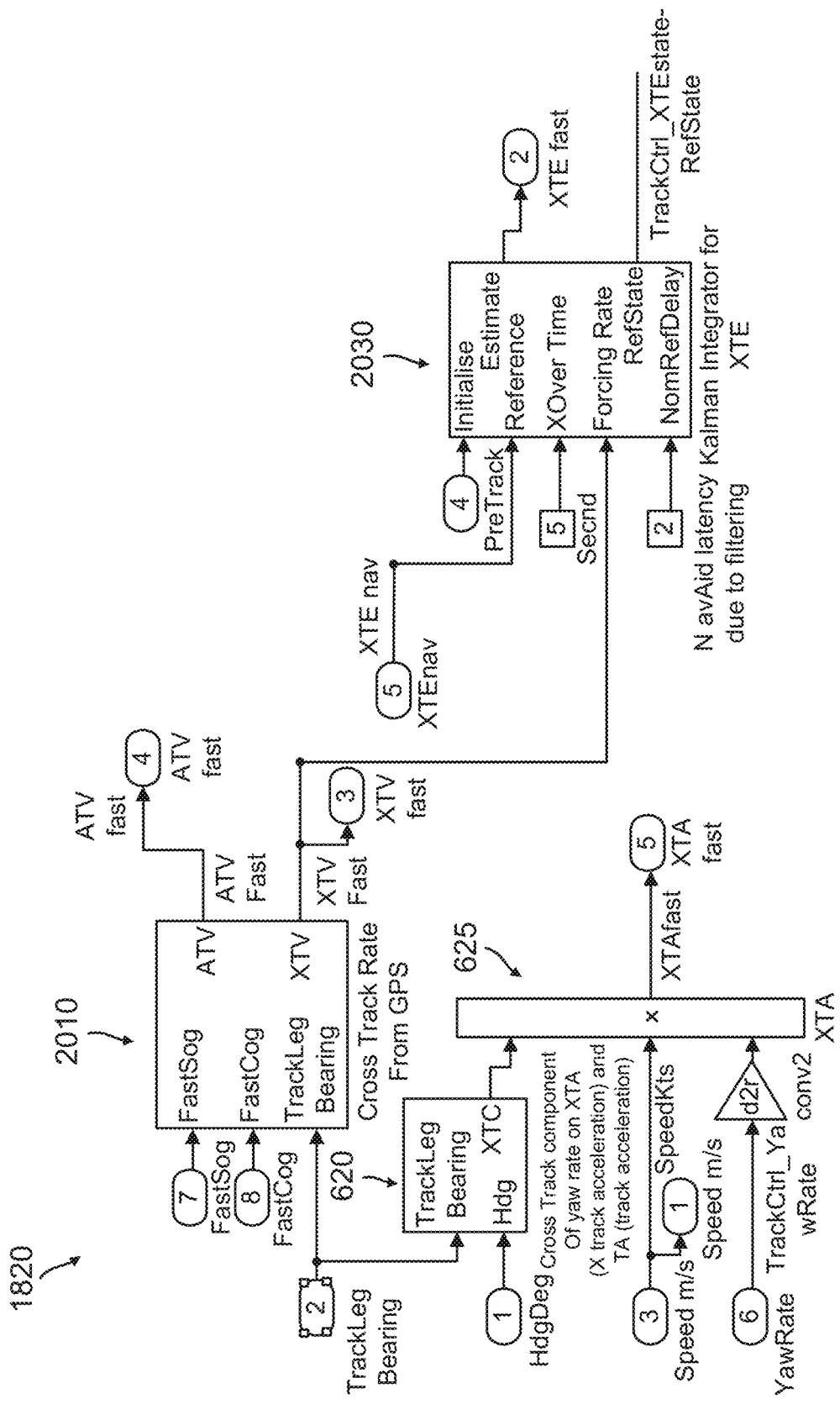
FIGS. 20A-C illustrate various diagrams of a cross track block in accordance with an embodiment of the disclosure.
Figure 20B:
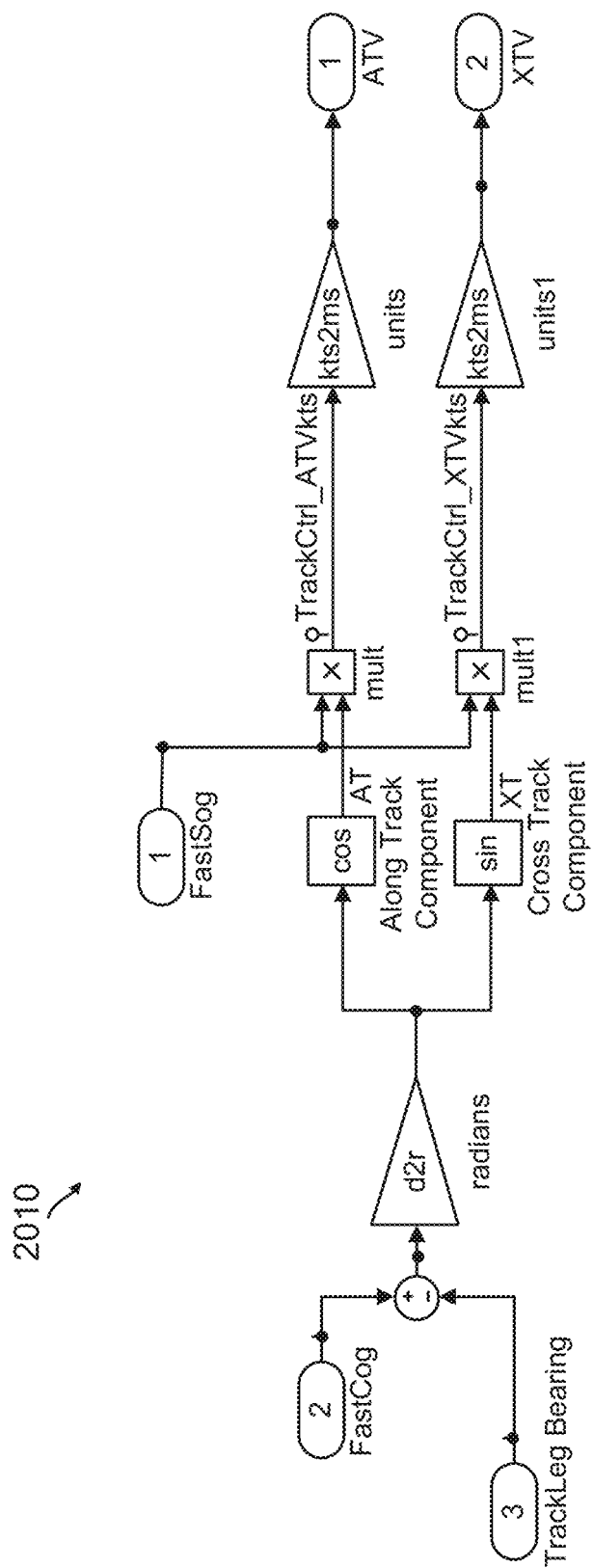
Figure 20C:
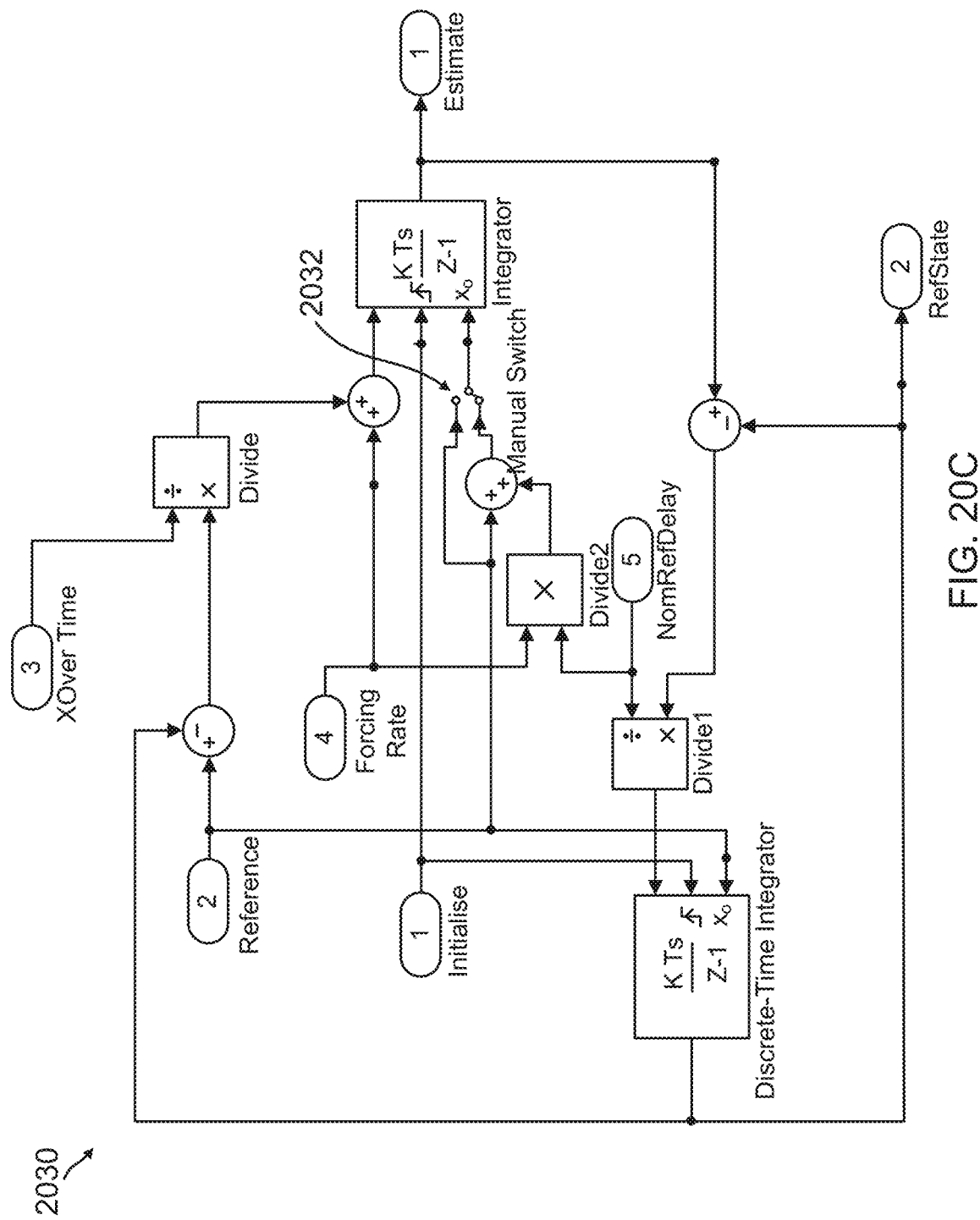

FIGS. 20A-C illustrates diagrams corresponding to cross track block 1820, in accordance with an embodiment of the disclosure. Cross track block 1820 operates to determine cross track and/or along track information in accordance with the principles illustrated in FIG. 7 and discussed herein. As shown in FIG. 20A, cross track block 1820 includes track leg velocity block 2010, cross track component calculation block 620, cross track acceleration block 625, and integrator block 2030. Cross track block 1820 of FIG. 20A may operate similarly to cross track block 320 of FIG. 6, but with a few notable differences as shown in FIG. 20A. One such difference, for example, is track leg velocity block 2010 receives SOG and COG signals from fast SOG COG filter 1320, rather than latitude and longitude signals. Calculating SOG and COG signals prior to executing cross track block 1820 may result in quicker overall execution and reduction of resources when operating system 200B, in addition to other benefits as described herein. In addition, cross track block 1820 includes only a single integrator block 2030, and not the two integrator blocks 630A and B of cross track block 320, because cross track block receives SOG and COG signals directly, as opposed to position measurements, which also help to increase overall system performance.

As further shown in FIG. 20A, cross track component calculation block 620 determines the cross track component of the heading of mobile structure 101 (e.g., angle ϑ in FIG. 7) as signal XTC in response to the heading of mobile structure 101, and the track leg bearing determined by track leg bearing block 1810. As shown in FIG. 20A, cross track acceleration block 625 provides the cross track acceleration as signal XTAfast in response to signal XTC provided by component block 620, and the speed and yaw rate of mobile structure 101. In some embodiments, where angle ϑ is large, a cosine correction and/or other trigonometric or other functions may be performed as part of cross track component calculation block 620, as shown in FIG. 9.

In FIG. 20A, integrator block 2030 integrates the cross track velocity signal XTVfast to provide the cross track error as signal XTEfast. Cross track velocity (XTVfast) and along track velocity (ATVfast) are provided directly by track leg velocity block 2010 operating on SOG, COG, and a track leg bearing provided by track leg bearing block 1810, as shown in detail in FIG. 20B, which illustrates a diagram of track leg velocity block 2010 in accordance with an embodiment of the disclosure. This arrangement of control loops provides for relatively efficient operation of cross track block 1820 compared to cross track block 320 of system 200.

FIG. 20C provides an example implementation that may be used for integrator block 2030. In this embodiment, integrator block 2030 is implemented as a Kalman integrator that integrates the cross track velocity signal XTVfast provided at the ForcingRate input to produce a cross track error XTE estimate. Referring again to FIG. 20A, in some embodiments, the initialization signal in integrator block 2030 may be a preTrack signal, which may indicate a state of system 200B. In some embodiments, integrator block 2030 may be implemented as an alpha beta filter.

Also shown in FIG. 20C, in some embodiments, the difference between the estimate calculated by integrator block 2030 and the Reference signal (e.g., based on calculations performed on GPS signals) is used to slowly pull or damp the estimate towards the Reference signal, with a time constant set by signal XOverTime. In some embodiments, the Reference signal exhibits a lag of approximately 2 seconds to 4 seconds. In this regard, the estimate may be matched temporally to the Reference signal (e.g., by delaying the estimate by the lag time of the Reference signal) to improve filtering accuracy. In addition, initialization of integrator block 2030 may be improved by advancing the Reference signal by the Forcing Rate signal multiplied by the NomRefDelay signal, as shown. As shown in FIG. 20C, in some embodiments, integrator block 2030 may include a user selectable and/or system controlled switch 2032 to selectively enable or disable (e.g., bypass) the advancing the Reference signal, as shown.

Figure 21A:
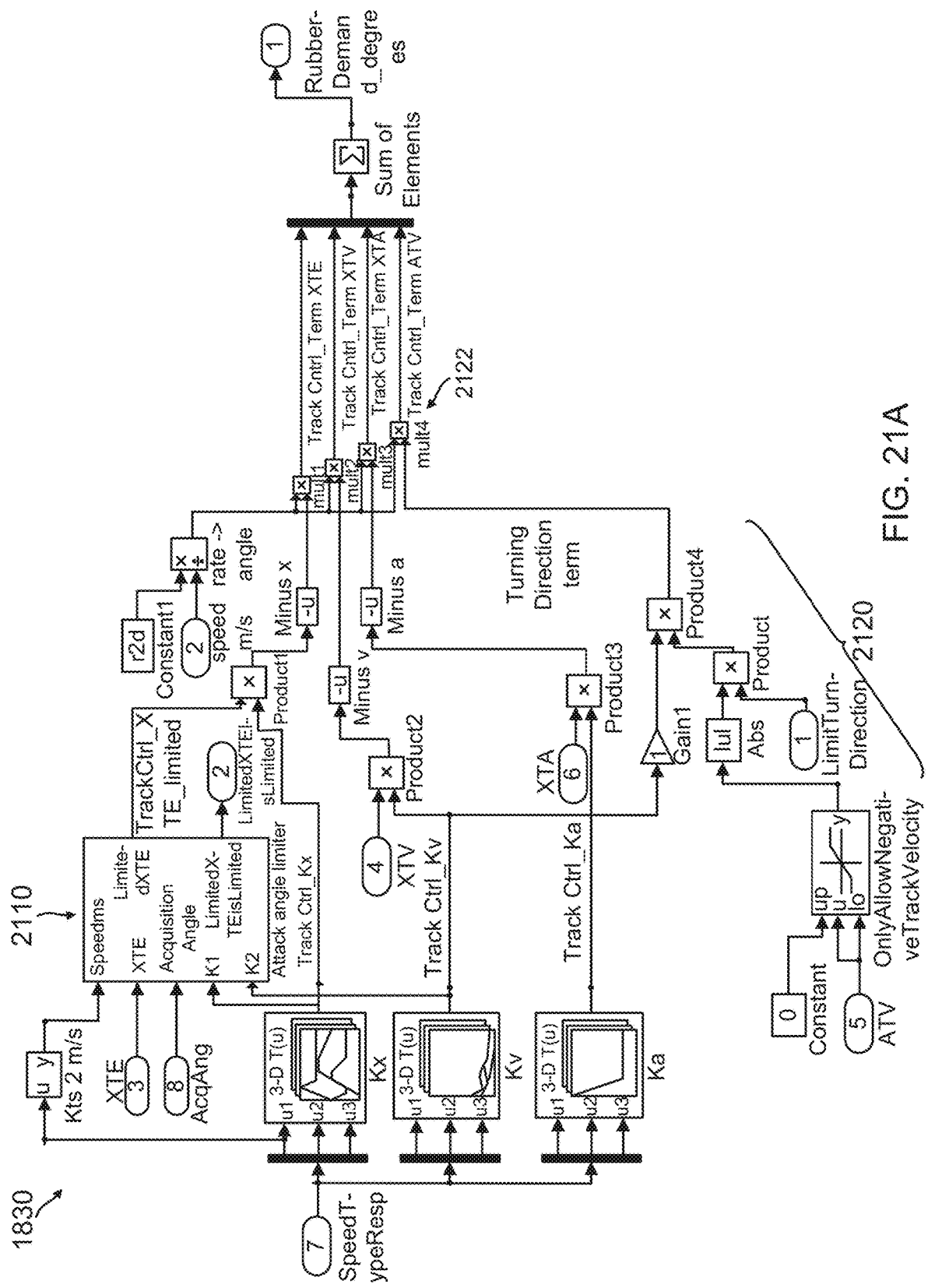
FIG. 21A-B illustrates various diagrams of a track controller block in accordance with an embodiment of the disclosure.
Figure 21B:
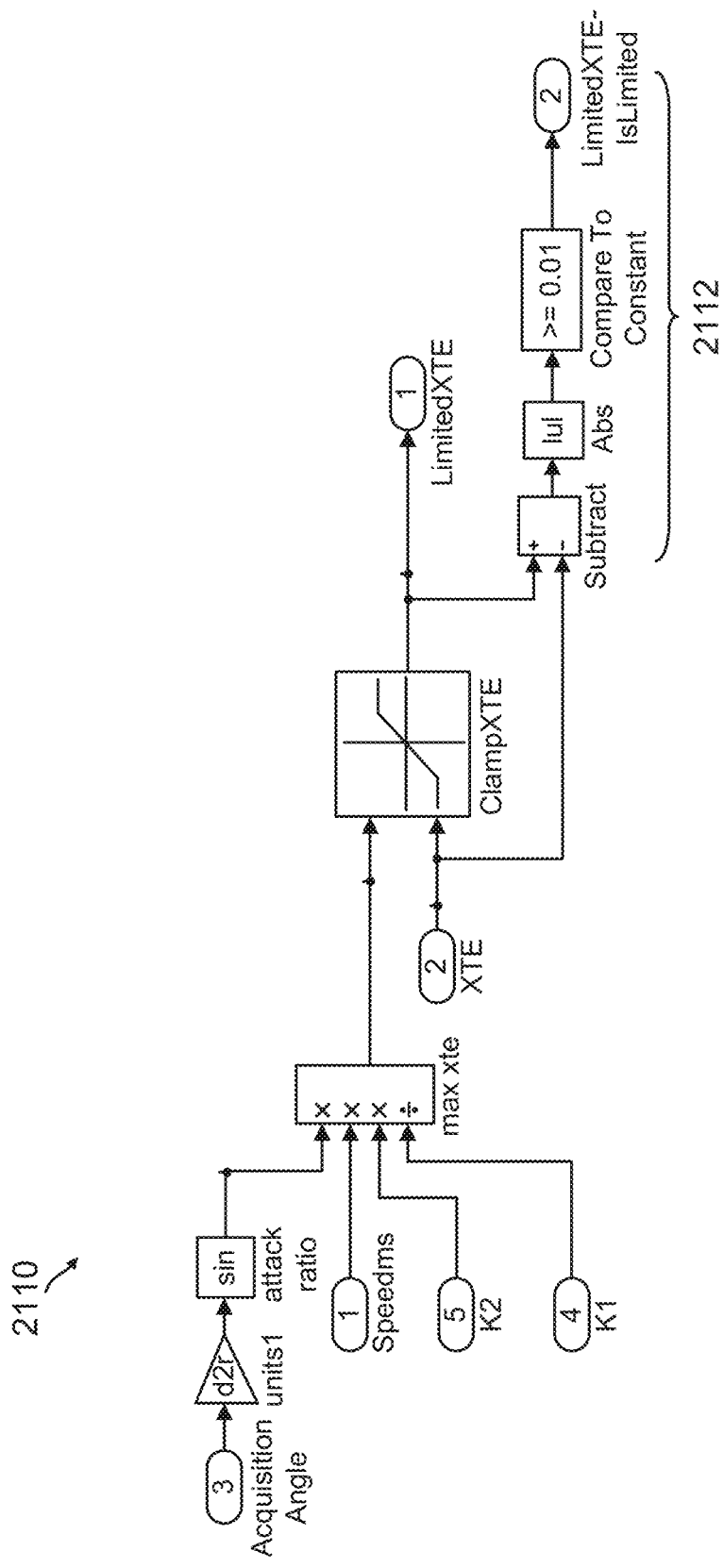

FIGS. 21A-B illustrates various diagrams corresponding to track controller block 1830, in accordance with an embodiment of the disclosure. Track controller block 1830 adjusts the rudder/steering angle (e.g., provided as output control signal RudderDemand) based on cross track acceleration XTA, cross track velocity XTV, cross track error XTE, along track velocity ATV, and speed signals received from cross track block 1820, the type of vessel and/or responsiveness corresponding to system 200B (e.g., SpeedTypeResponse input signal), the maximum angle provided by acquisition angle block 1840, and/or the turn direction provided by track leg bearing block 1810. For example, each of the cross track acceleration XTA, cross track velocity XTV, and cross track error XTE signals may be multiplied by associated gains (e.g., dependent on the selected type of watercraft, speed, and/or system responsiveness) and summed. In some embodiments, one or more of the gains may be set to zero, so that RudderDemand may depend on only one or two of the cross track acceleration XTA, cross track velocity XTV, and cross track error XTE signals.

As shown in FIG. 21A, in some embodiments, track controller block 1830 may also include turn limit block 2120, which may be configured to add an additional along track velocity component 2122 to RudderDemand (e.g., based, at least in part, on the turn direction provided by track leg bearing block 1810) if along track velocity ATV is negative (e.g., indicating that mobile structure 101 is moving away from the current waypoint and not toward the current waypoint). Along track velocity component 2122 may be configured to help adjust RudderDemand to turn mobile structure 101 towards the current waypoint using the minimum turning angle, as described herein.

Because track controller block 1830 relies on high quality cross track information determined in the manner discussed herein, the rudder/steering angle adjustment provided by track controller block 1830 can be more accurate and less noise prone than conventional track keeping techniques. Moreover, because track controller block 1830 receives input signals derived from COG and SOG provided by fast SOG COG filter 1320, the overall operation of track controller block 1830 and/or system 200B may utilize less resources and/or operate with a higher performance than alternative embodiments and/or systems.

Also shown in FIG. 21A, track controller block 1830 includes an attack angle limiter block 2110 which is further illustrated in FIG. 21B. In general, attack angle limiter block 2110 operates to limit the rudder/steering angle applied by track controller block 1830 to prevent unduly sharp acquisition angles, as may be desired by a user as expressed through a particular system responsiveness setting or input, for example, and/or the selected type of mobile structure and/or the present speed. In various embodiments, attack angle limiter block 2110 may be implemented similarly to attack angle limiter block 1110 of FIG. 12, but with the optional addition of XTE limit status block 2112, which may be configured to indicate whether the cross track error XTE provided to attack angle limiter block 2110 is being limited (e.g., clamped to a range of allowable values, which may be set by the maximum angle provided by acquisition angle block 1840 and/or one or more gains selected as shown in FIGS. 21A-B).

Figure 22:
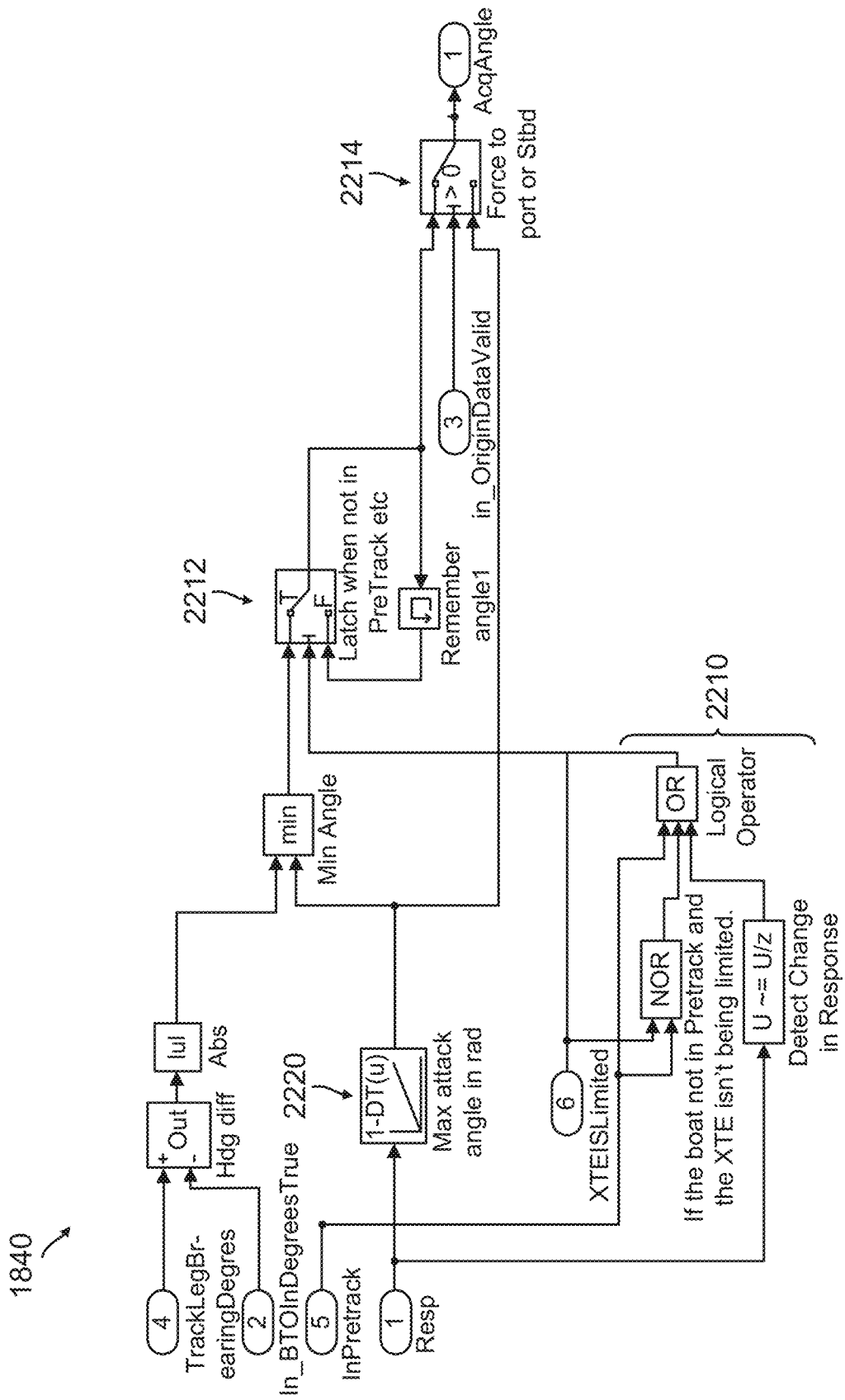
FIG. 22 illustrates a diagram of an acquisition angle block in accordance with an embodiment of the disclosure.

FIG. 22 illustrates a diagram of acquisition angle block 1840, in accordance with an embodiment of the disclosure. Acquisition angle block 1840 provides track leg bearing block 1810 and track controller block 1830 with a maximum angle of track line approach based on the user selected type of track keeping and/or one or more additional parameters, as described herein. For example, acquisition angle block 1840 may provide such information based on a lookup table data value in response to input signal Resp, which may correspond to a selected system responsiveness, as described herein. In some embodiments, acquisition angle block 1840 may be configured to limit the amount of rudder demand (e.g., generated by track controller block 1830) in order to limit the turn rate for mobile structure 101.

For example, as shown in FIG. 22, acquisition angle block 1840 may include logic blocks 2210, 2212, and 2214, which may be configured to provide a maximum attack angle from look up table 2220, referenced by a selected system responsiveness, as the maximum angle of track line approach when origin data (e.g., a position and/or a bearing to origin BTO) for the current track leg is unavailable (e.g., when OriginDataValid is logic low). If origin data is available, logic blocks 2210, 2212, and 2214 may be configured to lock the currently maximum angle of track line approach unless (or until) system 200B is in preTrack mode (e.g., system 200B is not track keeping), system 200B is in track mode (e.g., is track keeping) and the cross track error is not being limited (e.g., as indicated by XTEisLimited, which may be provided by embodiments of track controller 1830, as shown in FIGS. 21A-B), or the system responsiveness setting is changed. In some embodiments, acquisition angle block 1840 may be configured to halt acquisition of the track leg beyond the end of the origin point of the track leg (e.g., if the origin data is available). In various embodiments, acquisition angle block 1840 may be configured to reduce or eliminate oscillations about a track leg, as described herein. As shown in FIGS. 18 and 22, in some embodiments, acquisition angle block 1840 may be configured to receive a track leg bearing from track leg bearing block 1810, which is made possible, at least in part, by implementing fast SOG COG filter 1320 external to track controller 1340, as shown in FIG. 13.

Figure 23A:
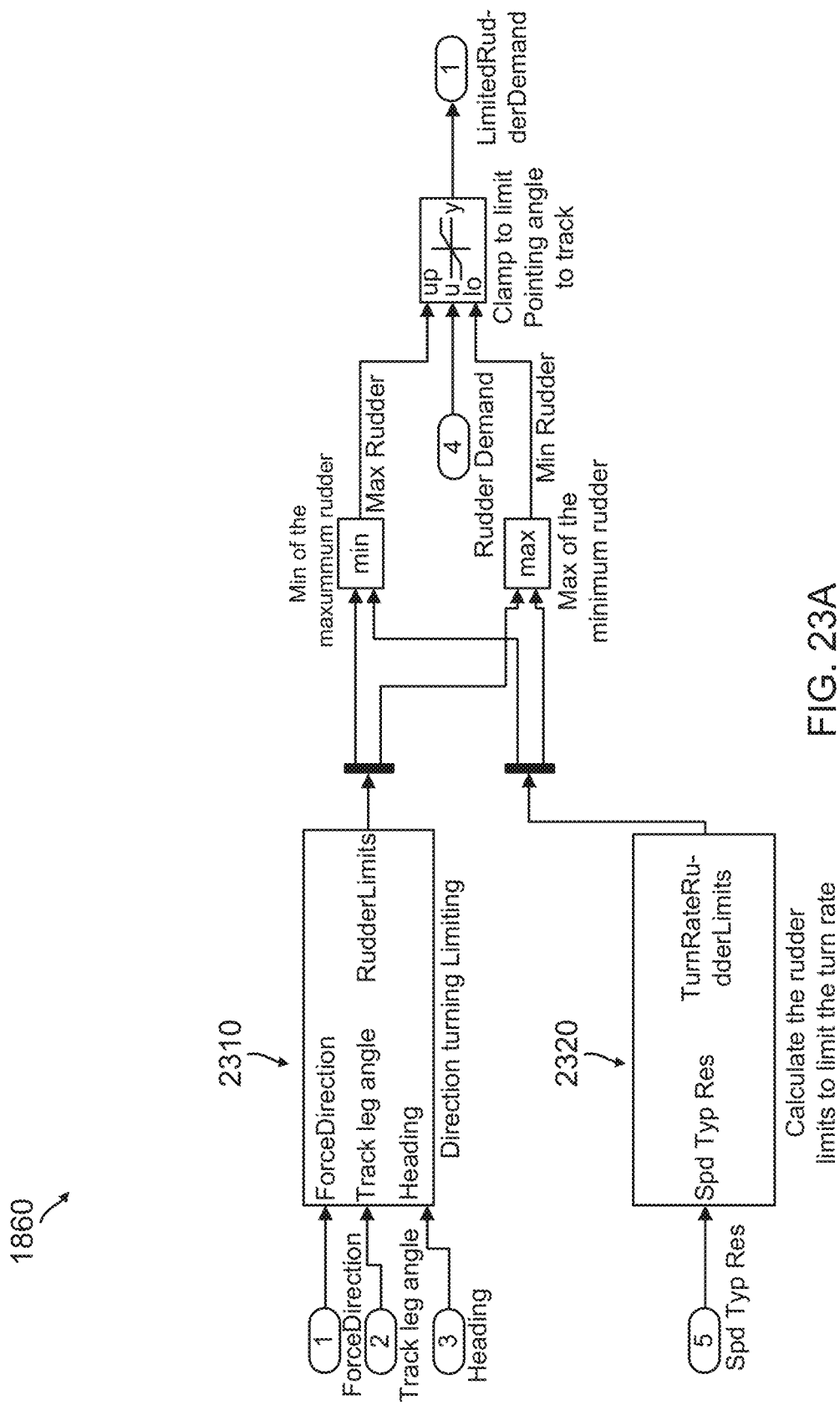
FIGS. 23A-C illustrate various diagrams of a limiter block in accordance with an embodiment of the disclosure.
Figure 23B:
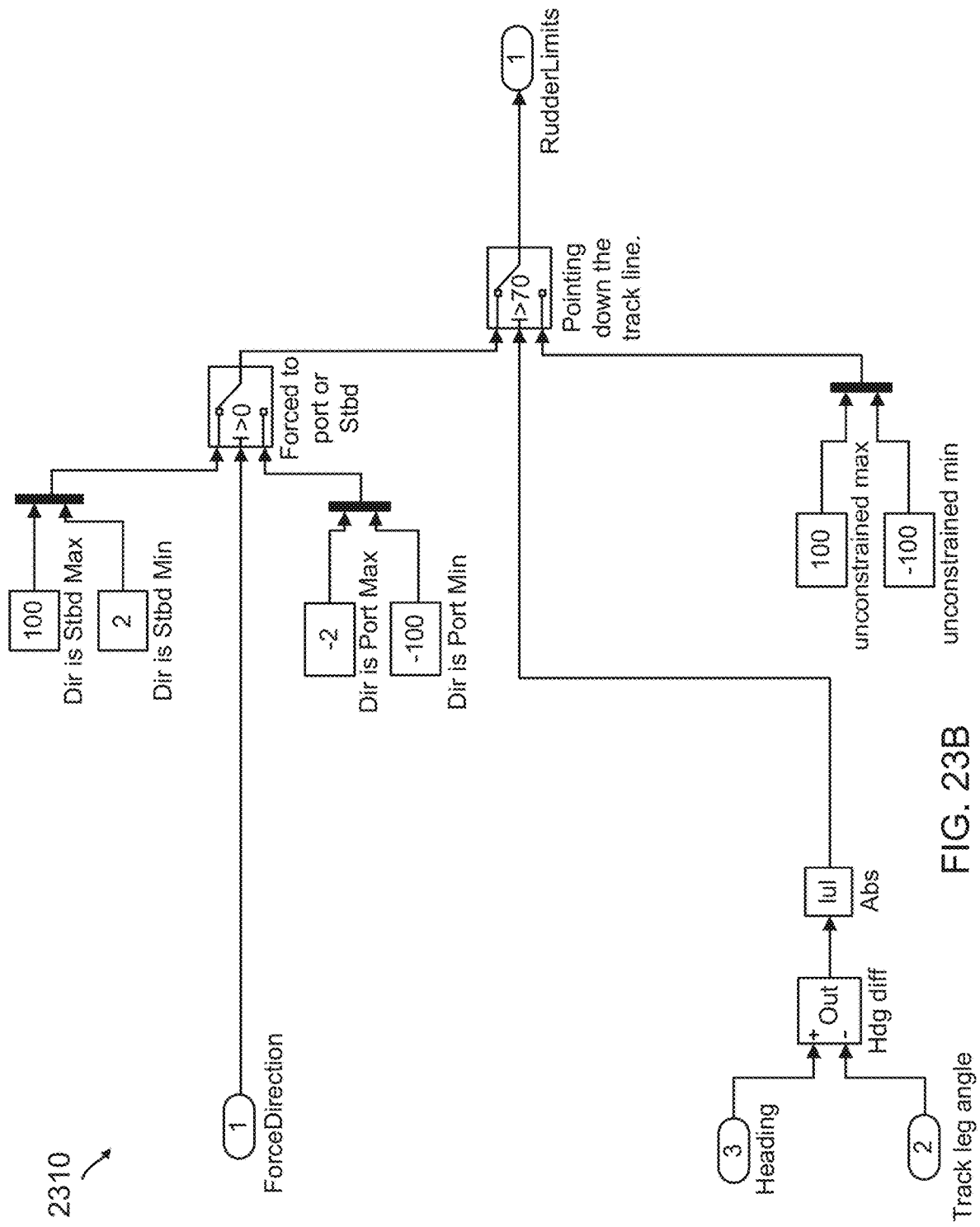
Figure 23C:
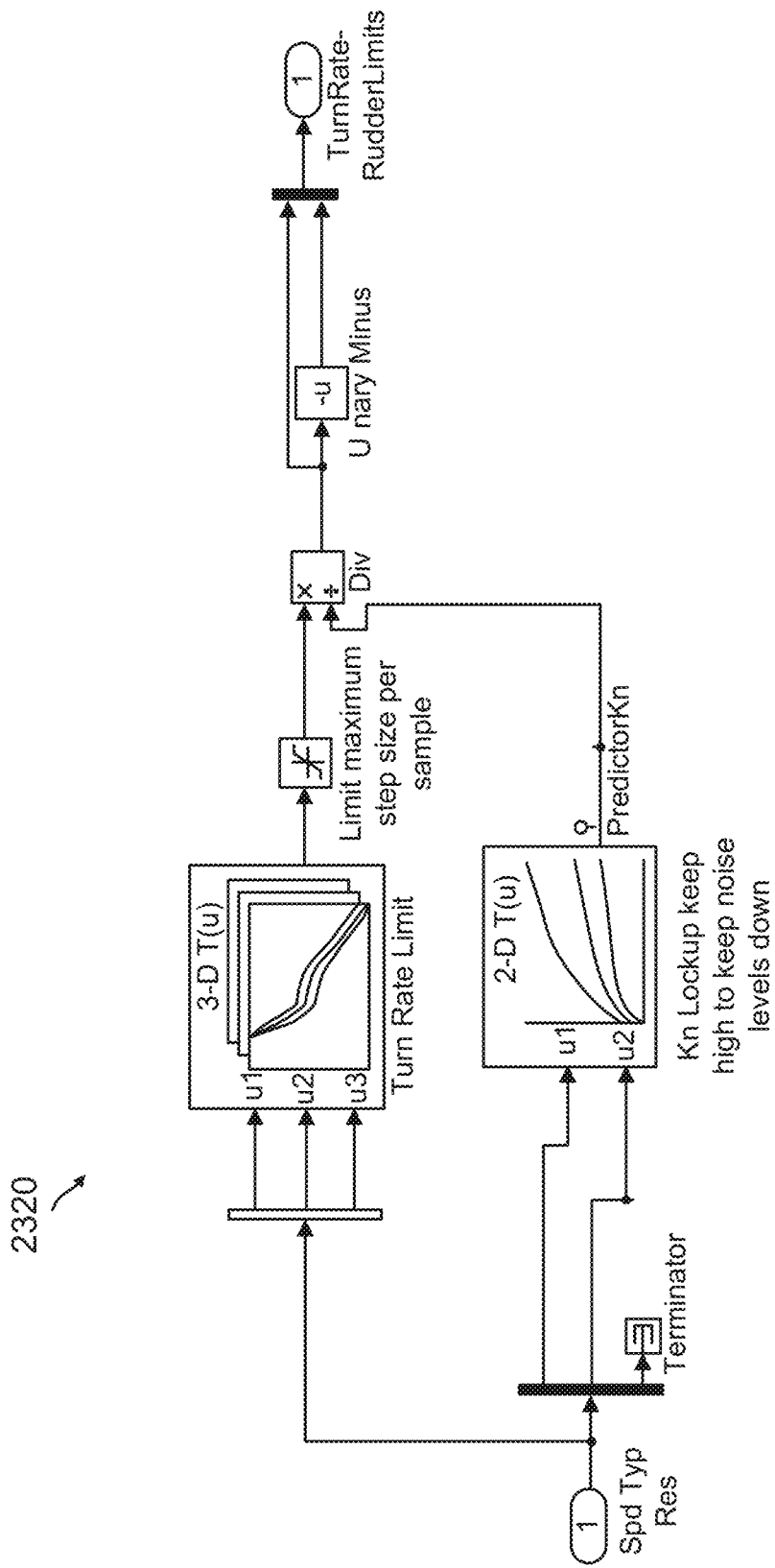

FIGS. 23A-C illustrates various diagrams corresponding to limiter block 1860, in accordance with an embodiment of the disclosure. In general, limiter block 1860 may be configured to filter, condition, and/or otherwise clamp or limit the rudder demand provided by track controller block 1830 to a range of rudder demands in order to help ensure efficient and/or relatively noiseless track keeping by system 200B for mobile structure 101. For example, as shown in FIG. 23A, limiter block 1860 may be configured to limit the rudder demand using multiple techniques, such as those implemented by rudder angle limiter block 2310 and turn rate limiter block 2320, each of which may be dependent on different sets of input signals, as shown. In some embodiments, limiting the rudder angle (e.g., which may be the nominal rudder angle, as described more fully herein) by supplying rudder demand limits, as shown, may be used to help force system 200B to pilot mobile structure according to a minimum turning angle relative to a bearing to waypoint, as described herein. In additional embodiments, limiting the turn rate by supplying rudder demand limits, as shown, may be used to conform the rudder demand to a desired responsiveness setting for system 200B.

FIG. 23B illustrates a diagram of rudder angle limiter block 2310 in accordance with an embodiment of the disclosure. As shown in FIG. 23B, rudder angle limiter block 2310 may be configured to provide different sets of rudder demand limits based on a heading for mobile structure 101 and a track leg bearing and turn direction provided by track leg bearing block 1810. For example, rudder angle limiter block 2310 may be configured to provide relatively broad rudder demand limits, regardless of turning direction, when the heading error is relatively small (e.g., less than or equal to 80, 70, or 60 degrees, and/or other heading errors less than approximately 90 degrees), and rudder angle limiter block 2310 may be configured to provide relatively narrow rudder demand limits when the heading error is relatively large (e.g., larger than the heading error value used to select the relatively broad rudder demand limits). In some embodiments, the relatively narrow rudder demand limits may be selectively differentiated and/or biased based on a turn direction provided by track leg bearing block 1810. In various embodiments, the relatively narrow rudder demand limits may be approximately half or less than half the range of the relatively broad rudder demand limits.

FIG. 23C illustrates a diagram of turn rate limiter block 2320 in accordance with an embodiment of the disclosure. As shown in FIG. 23C, turn rate limiter block 2320 may be configured to provide different sets of rudder demand limits based on a speed, type, and/or responsiveness setting for mobile structure 101 and/or system 200B. For example, turn rate limiter block 2320 may be configured to determine the rudder demand limits based on one or more look up tables configured to provide a turn rate limit and/or other parameters based on the speed, type, and/or responsiveness setting and convert the turn rate limit into a set of rudder demand limits, as shown.

In some embodiments, the present autopilot track keeping system may be combined and/or integrated with an adaptive autopilot controller, such as an adaptive autopilot controller including a nominal vehicle feedback system, for example. In various embodiments, autopilot track keeping system 200 and/or 200B may be integrated with any one or combination of systems or methods described in International Patent Application No. PCT/US2014/13441 filed Jan. 28, 2014 and entitled "STABILIZED DIRECTIONAL CONTROL SYSTEMS AND METHODS", U.S. patent application Ser. No. 14/321,646 filed Jul. 1, 2014 and entitled "STABILIZED DIRECTIONAL CONTROL SYSTEMS AND METHODS", U.S. Provisional Patent Application No. 62/099,022 filed Dec. 31, 2014 and entitled "STABILIZED DIRECTIONAL CONTROL SYSTEMS AND METHODS", and/or U.S. Provisional Patent Application No. 62/099,032 filed Dec. 31, 2014 and entitled "PROACTIVE DIRECTIONAL CONTROL SYSTEMS AND METHODS", which are hereby incorporated by reference in their entirety.

For example, in various embodiments, autopilot track keeping system 200 and/or 200B may be integrated with such systems by replacing and/or supplementing elements (e.g., a user interface, a heading sensor, a PD controller, a steering demand limiter, and/or other elements of a directional controller) determining a heading error or initial steering demand before such demand is adjusted by a nominal vehicle feedback signal (e.g., to account for a disturbance of mobile structure 101 and/or steering sensor/actuator 150). In such embodiments, mobile structure 101 may be autopiloted using a nominal vehicle feedback system based on nominal T and K constants (the time delay for rudder to act, and the turn rate per unit of rudder) as opposed to similar parameters that must be defined uniquely for a specific type of mobile structure.

Embodiments of the present disclosure provide additional benefit over conventional track keeping systems and methods in that embodiments include at least one additional phase advance (e.g., reduction in lag) by including a cross track acceleration term in the closed loop controller. As such, it is possible to steer to a waypoint directly (e.g., without substantial drift and/or oscillation along the track) using the disclosed cross track error control system (e.g., autopilot track keeping system 200) due to the tight reactive tracking.

In some embodiments, as described in reference to block 320, 1820, and/or other blocks described above in FIGS. 2-21, attitude data may be used to enhance GPS signal quality. For example, the measured or determined yaw rate for mobile structure 101 may be used to generate XTA, which in turn generates XTV, and then XTE, where the chain of generated signals starts with a GPS signal based track leg bearing and where the generated XTV and XTE are referenced or biased towards XTVgps and/or XTEnav.

In the context of sailing, embodiments of the present disclosure may be used to provide safety warnings generated while preparing for a turn. For example, due to the tight reactive tracking, autopilot based turns to port or starboard (e.g., along a series of waypoints) are more likely to result in changed headings to port or starboard, whereas less capable autopilots may wander so far off track that a routed turn may develop into a critical piloting error, particularly if the turn involves a possible jibe. Embodiments of the present disclosure may be configured to detect a wind direction relative to a desired track and issue a visible or audible alert if a turn, considering the cross track error, velocity, and acceleration, might result in a jibe.

As noted above, the delays and loss of precision which arise though some NavAid (e.g., user interfaces configured to receive GPS data and plot courses, waypoints, and/or tracks on a chart for display to a user) processing can be significant. Embodiments of the present disclosure may be configured to provide much improved bandwidth and precision by processing data directly from a GPS source (e.g., rather than drawing it from user interface 120, for example). For example, XTV can be computed by taking the component of the rate of change of position, as provided by GPS 146, that lies perpendicular to a track line, which can be well defined by enclosing waypoint GPS positions.

Embodiments of the present disclosure can thus provide reliable and accurate directional control for mobile structures. Such embodiments may be used to assist in navigation of a mobile structure and/or in the operation of other systems, devices, and/or sensors coupled to or associated with the mobile structure. For example, embodiments of the present disclosure may be used to provide directional control for actuators used to aim an actuated device (e.g., a visible and/or infrared spectrum camera, a spotlight, other directional illumination and/or sensor systems) according to a desired direction (e.g., corresponding to a track and/or contour). In such embodiments, the steering angle corresponds to the aiming angle (e.g., roll, pitch, and/or yaw) for the actuated device and the steering rate corresponds to the rate of change in the orientation of the actuated device in the direction actuated by the steering angle.

Embodiments of the present disclosure may also be used to provide accurate and reliable contour following, where an autopilot is configured to follow the contour of a particular depth or range of depths, which may be delineated by one or more waypoints. In such embodiments, the contour may effectively define a surface track, and the autopilot may be configured to follow the contour based track using similar systems and methods to those described above. However, there are additional concerns with respect to contour following, particularly with respect to safely transiting a contour along a shelf or ridge with potentially a very large slope.

For applications such as avoiding snagging the bottom while fishing, an autopilot may be configured to steer such that the depth of water under a boat remains constant. Embodiments of the present disclosure enable stable and responsive contour following without the need for user setup or gain adjustment.

For an autopilot to hold a constant depth, the direction and required rate of course adjustment depend not just on the depth error (e.g., the difference between target depth and measured depth), but also on how steeply and in which direction the bottom is shelving, and how fast the boat is travelling. If the autopilot makes adjustments too aggressively, then depending on the time constant of the vessel's steering response, oscillation or instability may result. If the autopilot makes adjustments too cautiously, then control will be soft, and tracking may be insufficiently tight, which can lead to fishing line snagging or other problems.

General track keeping can be subject to instability and other complaints typical of autopilots, but contour following is particularly difficult because the control gain can be so dramatically affected by the bottom profile. For example, a steeply shelving bottom needs a very different control action as compared to a gently shelving bottom. Reliance on charts can be burdensome or impossible under many circumstances.

One method for robust contour following is for the charting engine to produce a cross track error signal which is the perpendicular distance from a target contour line to the vessel position. An autopilot can then use this as an error signal, analogous to the track keeping XTE signal described herein. This approach requires the charting engine to provide such functionality, and furthermore for good performance the direction of the contour line is also needed because the closing velocity to track is a crucial input for stabilizing track control.

Figure 25:
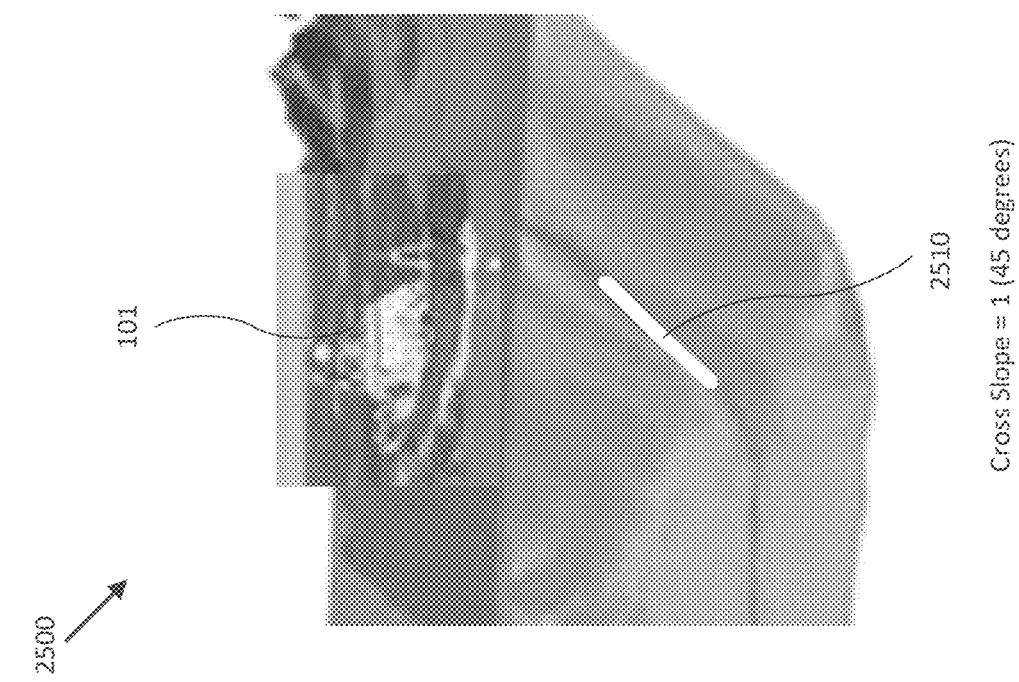
FIG. 25 illustrates a diagram of a cross slope beneath a mobile structure in accordance with an embodiment of the disclosure.

Embodiments of the present disclosure use the current depth error (target depth—measured depth beneath mobile structure 101), and divide by the cross slope to determine an effective cross track error, which can be used by a track keeping algorithm, such as those described herein. In such embodiments, the cross track velocity and acceleration may be determined similarly. Moreover, a corresponding cross track velocity reference may be determined through one or more methods described herein, using a contour bearing in place of a track bearing. In such embodiments, the contour bearing may be derived, at least in part, from the cross slope. The cross slope is the slope of the seabed measured perpendicular to the vessel's course, as shown in the diagrams 2400 and 2500 of FIGS. 24 and 25, and can be approximately the width of mobile structure 101 or wider. In FIG. 25, where the seabed cross slope 2510 is 1 (45°), the track-keeping algorithm is configured to treat vertical depth errors as if they were horizontal cross track errors, and the provided gains give robust and stable control.

Figure 24:
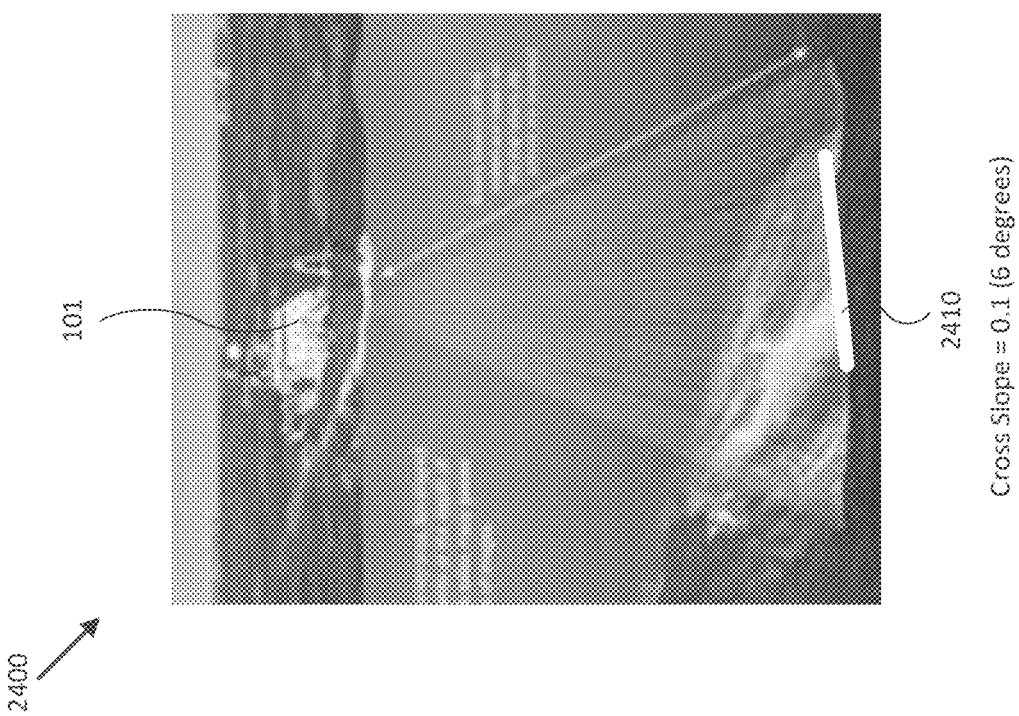
FIG. 24 illustrates a diagram of a cross slope beneath a mobile structure in accordance with an embodiment of the disclosure.

In the example of FIG. 24, however, where the seabed is almost flat with a 0.1 (6°) cross slope 2410, a small depth error corresponds to a much larger cross track error, and this is addressed by transferring to the track keeping algorithm the depth divided by the cross slope of 0.1 The cross slope can be measured from an attitude stabilized side scan sounder, for example, or a multichannel transducer sonar system providing three dimensional representations of the sea floor, or the slope can be obtained from a chart plotter database by looking at depth differences between the current position and secondary positions to port and to starboard. To avoid introducing noise, it is important to obtain a cross slope over a broad section of the seabed.

The effective cross track error signal produced by this methodology may under some circumstances be noisy, but the methods described herein to provide robust track keeping, which are designed to eliminate noise and improve responsiveness, can be applied.

Figure 26:
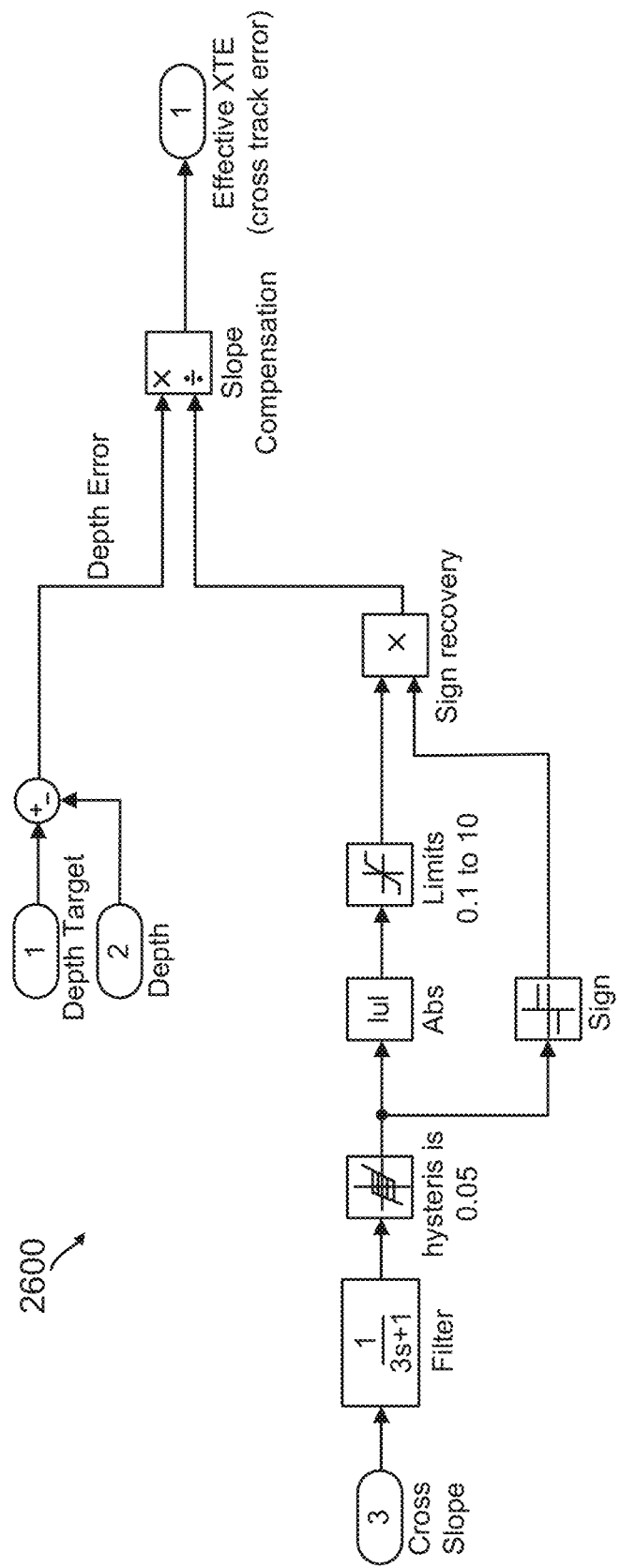
FIG. 26 illustrates a diagram of an effective cross track error associated with contour following in accordance with an embodiment of the disclosure.

Contour following can in some embodiments be indeterminate, such as when mobile structure 101 approaches a substantially flat sea floor. One approach, shown in in the diagram 2600 of FIG. 26, is to limit the cross slope to be above a minimum (e.g., ~0.1) and apply hysteresis and filtering, so that the tendency to hunt left/right is limited if required to contour follow along a periodically flat or nearly flat bottom.

Figure 27:
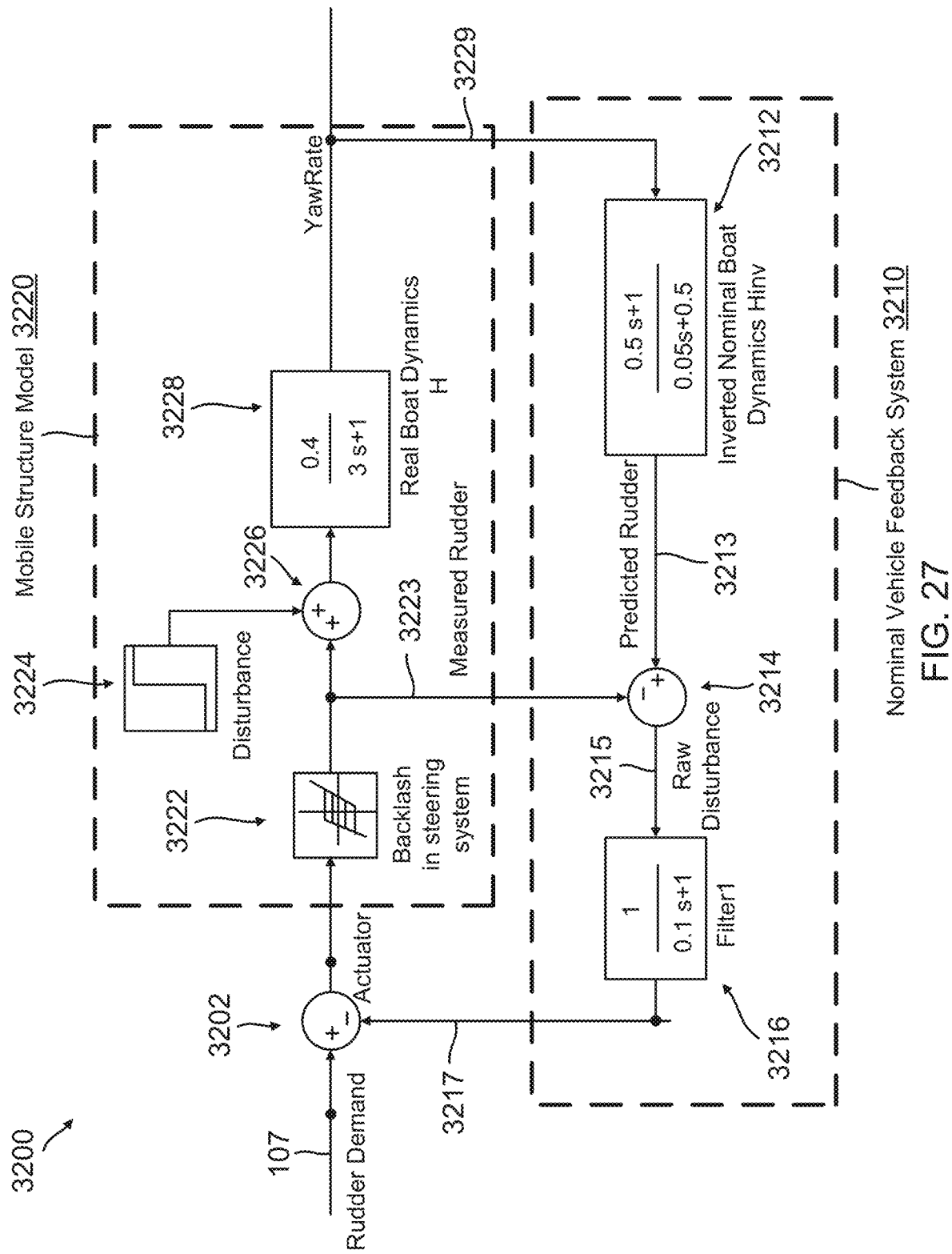
FIG. 27 illustrates a flow diagram of a control loop to provide stabilized directional control in accordance with an embodiment of the disclosure.

FIG. 27 illustrates a flow diagram of a control loop 3200 to provide stabilized directional control for mobile structure 101 in accordance with an embodiment of the disclosure. In some embodiments, the operations of FIG. 27 may be performed by controller 130 processing and/or operating on signals received from one or more of sensors 140-146, steering sensor/actuator 150, propulsion system 170, user interface 120, and/or other modules 180. For example, in various embodiments, control loop 3200 (and/or control loops 3300 and 3600 of FIGS. 28 and 31) may be implemented and/or operated according to any one or combination of the systems and methods described in International Patent Application No. PCT/US2014/13441 filed Jan. 28, 2014 and entitled "STABILIZED DIRECTIONAL CONTROL SYSTEMS AND METHODS", and/or U.S. patent application Ser. No. 14/321,646 filed Jul. 1, 2014 and entitled "STABILIZED DIRECTIONAL CONTROL SYSTEMS AND METHODS", each of which are hereby incorporated by reference in their entirety.

In accordance with an embodiment, each block may be implemented entirely as instructions executed by controller 130, for example, or may be implemented in a combination of executable instructions and hardware, such as one or more inductors, capacitors, resistors, digital signal processors, and other analog and/or digital electronic devices. It should be appreciated that any step, sub-step, sub-process, or block of control loop 3200 may be performed in an order or arrangement different from the embodiment illustrated by FIG. 27. For example, although control loop 3200 includes block 3228, in other embodiments, block 3228 may not be present, for example, and/or may be replaced with one or more sensors providing corresponding measured data.

As shown in FIG. 27, block 3228 of control loop 3200 includes a vehicle dynamics module that may be implemented as a transfer function (e.g., in the S-plane) in the form of a ratio of a steering rate gain term "K" (e.g., a forward gain of a mobile structure, set to "0.4" in FIG. 27) to a steering rate lag term "1+T*s" (e.g., set to "3 s+1" in FIG. 27). For example, the steering rate gain term "K" may be equal to the ratio (steering rate)/(steering angle), which models the amount of steering rate (e.g., yaw rate) achieved for a particular mobile structure for each degree of steering angle (e.g., rudder angle). The steering rate gain term "K" can be corrected by the steering rate lag term "1+T*s", which models the time (e.g., in T seconds) for the steering rate to develop after application of the steering angle. In some embodiments, control loop parameters K and T are unique for different mobile structures, and K and/or T may be dependent on a speed of the mobile structure in a medium, such as air or water. In other embodiments, the transfer function may be implemented as a different function according to a particular type of mobile structure being modeled, a type of steering mechanism being used, and/or a type of control loop being implemented.

In various embodiments, the vehicle dynamics module may be used to model a variety of different actual mobile structures (e.g., planes, automobiles, watercraft) and adaptively train the remainder of control loop 3200 to a particular mobile structure (e.g., mobile structure 101) or group of mobile structures, through iteration. In the embodiment shown in FIG. 27, block 3228 provides a modeled yaw rate (e.g., corresponding to a measured steering rate of mobile structure 101) as output, which can be integrated to provide a modeled heading (e.g., corresponding to a measured heading of mobile structure 101). The modeled heading may then be compared to/subtracted from a target heading (e.g., to a waypoint for example) to generate steering demand 107 (e.g., corresponding to the inverse of angle 107 in FIG. 1A in embodiments where direction 106 corresponds to the target heading). Outputs of various blocks (e.g., blocks 3214, 3216, 3224, and/or block 3228) may be set as initial conditions prior to controller 130 executing block 3202. Moreover, controller 130 may be configured to store the output of any block before proceeding to other blocks in control loop 3200.

In some embodiments, controller 130 may be configured to determine steering demand 107 based on a measured or modeled heading and a target heading, where steering demand 107 corresponds to the error between the target heading and the measured or modeled heading (e.g., the steering demand needed to orient mobile structure 101 with the target heading). In embodiments utilizing a modeled heading, steering rate 3229 provided by block 3228, described below, may be integrated to provide the modeled heading. In some embodiments, the heading error may be processed by a proportional-derivative controller module, a limiter, and/or other filters or processing blocks, as described herein, before being provided as steering demand 107.

In block 3202, controller 130 receives a steering demand 107 (e.g., a rudder demand) and a filtered nominal vehicle feedback signal 3217 from block 3216 of nominal vehicle feedback system 3210 and combines them to produce an adjusted steering demand (e.g., an adjusted rudder demand) that is then provided to block 3222. In some embodiments, the adjusted steering demand may represent a difference between the steering demand and the filtered nominal vehicle feedback signal. In further embodiments, the filtered nominal vehicle feedback signal from block 3216 may be an initial condition set for block 3216.

In block 3222, controller 130 receives an adjusted steering demand from block 3202 and generates a modeled steering angle 3223 (e.g., corresponding to a measured steering angle of rudder 152 sensed by steering sensor/actuator 150 of mobile structure 101) that is then provided to blocks 3226 and 3214. In some embodiments, modeled steering angle 3223 may be configured to model or correspond to one or more actual steering actuator responses to an adjusted steering demand provided by block 3202, including responses characterized by particular steering actuator angle limits (e.g., angle β in FIG. 1C), steering actuator rate limits, steering actuator resolutions, backlashes, lags, and/or other mechanical and/or contextual characteristics of a steering sensor/actuator. Such modeled steering responses may be used to generate modeled steering angle 3223.

In block 3224, controller 130 generates a modeled steering disturbance that is then provided to block 3226. In some embodiments, the modeled steering disturbance may correspond to a momentary force or disruption experienced by steering sensor/actuator 150, such as a user momentarily forcing rudder 152 in a particular direction, rudder 152 colliding with an underwater object, a lateral air and/or water current component interacting with rudder 152, and/or other disruptions. In other embodiments, the modeled steering disturbance may correspond to a longer lived and/or permanent disruption of steering sensor/actuator 150, such as damage to rudder 152 due to collision with an underwater object. In various embodiments, controller 130 may be configured to execute block 3224 to generate a variety of different modeled steering disturbances over time, including little or no steering disturbance, to help adaptively train the remainder of control loop 3200 to accommodate a wide selection of environmental and/or operational conditions of mobile structure 101.

In block 3226, controller 130 combines the modeled steering angle 3223 generated in block 3222 and the modeled steering disturbance from block 3224 to produce a disturbed steering angle that is then provided to block 3228. In some embodiments, the disturbed steering angle may represent a sum of modeled steering angle 3223 and the modeled steering disturbance.

As noted above, block 3228 includes a vehicle dynamics module that may be implemented as a transfer function in the S-plane (e.g., a Laplace domain transfer function) that can be adapted to model behavior of mobile structure 101 and/or any number of other mobile structures according to various steering rate gain terms, steering rate lag terms, and/or various transfer functions. For example controller 130 may be adapted to use and/or execute a vehicle dynamics module to receive the modeled and/or disturbed steering angle provided by block 3226 and provide a modeled steering rate 3229 (e.g., a modeled yaw rate) to block 3212 of nominal vehicle feedback system 3210. In some embodiments, block 3228 may be used (e.g., along with other elements of mobile structure model 3220) to implement an adaptive algorithm for training various control loop parameters of control loop 3200 without necessitating a real-time trial run of mobile structure 101.

In block 3212, controller 130 uses and/or executes a nominal vehicle predictor to receive, process, and/or operate on a steering/yaw rate of a mobile structure (e.g., modeled steering rate 3229 from block 3228) and provide a nominal vehicle steering angle 3213 (e.g., a steering angle for a nominal steering actuator coupled to a nominal vehicle experiencing the input steering/yaw rate and no disturbances, in some embodiments) to block 3214. In similar fashion to the vehicle dynamics module of block 3228, the nominal vehicle predictor may be implemented as a transfer function (e.g., in the S-plane) adapted to model dynamics of a nominal vehicle derived, at least in part, from a selection of mobile structures, as described herein. In one embodiment, the transfer function may be implemented in the form of a ratio of a nominal vehicle steering rate lag term "1+Tn*s" (e.g., set to "0.5 s+1" in FIG. 27) to a nominal vehicle steering rate gain term "Kn", which can be expanded to "Fn*s+Kn" (e.g., set to "0.05 s+0.5" in FIG. 27) to facilitate implementation of the predictor 3212 as shown. In some embodiments, nominal vehicle predictor 3212 can be recognized as an inverse form of the transfer functions described with reference to block 3228.

For example, the nominal vehicle steering rate gain term "Fn*s+1" may be equal to the ratio (steering rate)/(steering angle), which models the amount of steering rate achieved for a nominal vehicle for each degree of steering angle. The nominal vehicle steering rate gain term can be corrected by the nominal vehicle steering rate lag term "1+Tn*s", which models the time (e.g., in Tn seconds) for the steering rate to develop after application of the steering angle, or, put differently, the time evolution of the steering angle needed to produce a steering rate. In some embodiments, Fn and/or Tn may be dependent on a speed of the nominal vehicle in a medium, such as air or water. In such embodiments, the speed of the controlled mobile structure may be used as the speed of the nominal vehicle. In other embodiments, the transfer function may be implemented as a different function according to a particular type of nominal vehicle being modeled, a type of steering mechanism being controlled, and/or a type of control loop being implemented.

In some embodiments, various control loop parameters (e.g., Fn and Tn) may be set to respective mean values for a population of mobile structures to be controlled, for example, as a function of speed. In other embodiments, Fn may be set to exceed a majority of and/or all F values of a population of mobile structures to be controlled, as a function of speed, to reduce a risk of excessive steering actuator activity. In further embodiments, Tn may be set to exceed a majority of and/or all T values of a population of mobile structures to be controlled, as a function of speed, and/or above 1 second to reduce a risk of excessive steering actuator activity and/or to reduce a need for a high clocking rate of controller 130 (e.g., above 100 Hz). In some embodiments, the population of mobile structures to be controlled may correspond to a type of mobile structure, such as a type of plane, automobile, or watercraft (e.g., sailboat, powerboat, ship, submarine, and/or other vessel capable of operating in or on water). In various embodiments, values of F and T for a population of mobile structures may be determined and/or approximated through performance of real-time trials, control loop modeling (e.g., using one or more of the control loops described herein), and/or estimation.

Advantageously, nominal vehicle predictor 3212 may be implemented as a transfer function acting on only one of the two state variables (e.g., heading and steering rate/yaw) of the control loop, which makes implementation easier due to, at least in part, a reduced need for computing resources. Moreover, use of nominal vehicle predictor 3212 in inverse form within nominal vehicle feedback system 3210 provides additional benefit over nominal vehicle predictors used in forward form in that embodiments of nominal vehicle feedback system 3210 are less complex, use less processing resources (e.g., exhibit higher performance), and exhibit lower overall noise levels both in the output of nominal vehicle feedback system 3210 and in the steering demand signal provided to steering sensor/actuator 150.

In block 3214, controller 130 receives modeled steering angle 3223 from block 3222 and nominal vehicle steering angle 3213 from block 3212 and combines them to produce a nominal vehicle feedback signal 3215 that is then provided to block 3216. In some embodiments, nominal vehicle feedback signal 3215 may represent a difference between modeled steering angle 3223 and nominal vehicle steering angle 3213. In various embodiments, nominal vehicle feedback signal 3215 may correspond to the modeled steering disturbance provided by block 3224, and so proper steering demand for mobile structure 101 may be achieved by subtracting the derived disturbance signal (e.g., nominal vehicle feedback signal 3215) from the rudder demand at block 3202, as shown in FIG. 27.

In block 3216, controller 130 filters nominal vehicle feedback signal 3215 output by block 3214 and provides a filtered nominal vehicle feedback signal 3217 to block 3202, where it can be combined with an updated steering demand 107 to iterate control loop 3200. In some embodiments, block 3216 may be implemented as a low pass filter to limit noise in the signal eventually provided to the steering actuator. In further embodiments, block 3216 may be implemented with a selectable bandwidth that can be modified based on a user-selectable responsiveness setting. In other embodiments, the filter bandwidth is a control loop parameter that may be modified based on a received user input and/or adaptive training implemented with control loop 3200. For example, the filter bandwidth may be modified based on a target acceptable output noise level in the adjusted steering demand provided by block 3202. In various embodiments, block 3216 may be implemented as a multi-band filter, such as the embodiment of multi-band filter 3216 provided in FIG. 30.

In additional embodiments, a sub-control loop including blocks 3202, 3222, 3226, 3228, 3212, 3214, and/or 3216 may be iterated multiple times for each update of, steering demand 107. In such embodiments, an input of block 3202 corresponding to steering demand 107 may be set to a prior-used value for a number of iterations of the sub-control loop. In some embodiments, such a sub-control loop may be implemented as a device and/or instructions separate from a device and/or instructions providing steering demand 107. For instance, devices generating steering demand 107, in whole or in part, may be implemented as an electronic device separate from controller 130 in FIG. 1. As noted above, in some embodiments, such device may be configured to integrate and/or otherwise process steering rate 3229 to provide a modeled heading, which may be combined with a target heading (e.g., subtracted from a target heading) and/or provided to a proportional-derivative controller module, for example, to generate steering demand 107.

In embodiments where control loop 3200 is implemented with a proportional-differential controller module and a nominal vehicle predictor (e.g., block 3212), embodiments of control loop 3200 may be implemented as a critically damped control loop with a higher bandwidth (e.g., responsiveness) than if the nominal vehicle predictor were acting alone to stabilize directional control of, for example, mobile structure 101. For example, a controller implementing control loop 3200 may include a proportional-derivative controller allowing freedom to design a critically damped controller with higher bandwidth than if a nominal vehicle predictor were acting alone to stabilize yaw (e.g., in some embodiments, the nominal vehicle predictor feedback may pass through a filter with relatively low bandwidth because a high gain in the nominal vehicle predictor can introduce noise). Further examples are provided below in relation to FIG. 31.

Figure 28:
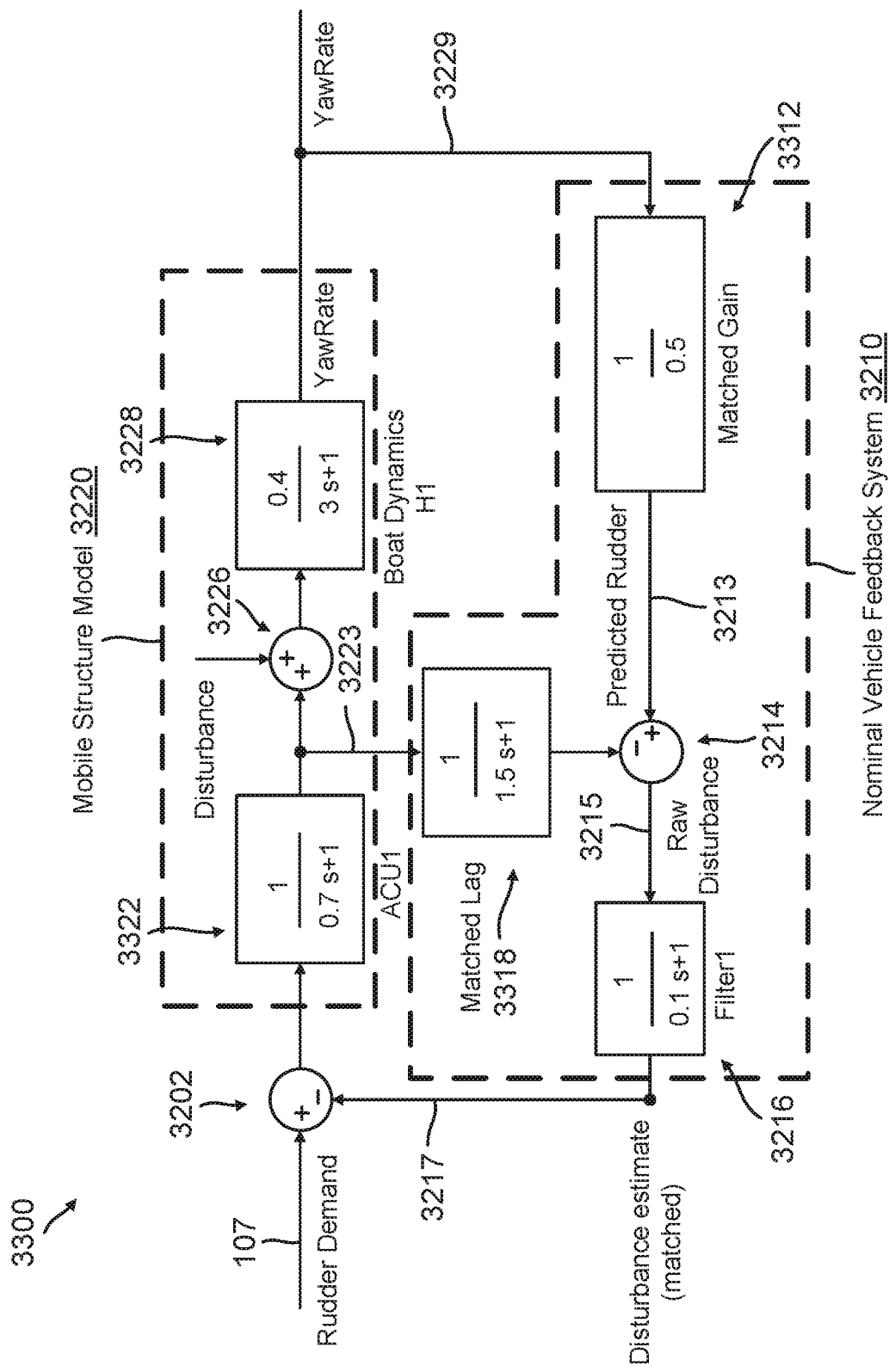
FIG. 28 illustrates a flow diagram of a control loop to provide stabilized directional control in accordance with an embodiment of the disclosure.

FIG. 28 illustrates a flow diagram of a control loop 3300 to provide stabilized directional control for mobile structure 101 in accordance with an embodiment of the disclosure. In some embodiments, the operations of FIG. 28 may be performed by controller 130 processing and/or operating on signals received from one or more of sensors 140-146, steering sensor/actuator 150, propulsion system 170, user interface 120, and/or other modules 180. In accordance with an embodiment, each block may be implemented entirely as instructions executed by controller 130, for example, or may be implemented in a combination of executable instructions and hardware, such as one or more inductors, capacitors, resistors, digital signal processors, and other analog and/or digital electronic devices. It should be appreciated that any step, sub-step, sub-process, or block of control loop 3200 may be performed in an order or arrangement different from the embodiment illustrated by FIG. 28.

As shown in FIG. 28, control loop 3300 is similar to control loop 3200 of FIG. 27, but control loop includes block 3318 acting on modeled steering angle 3223 prior to proving it to block 3214, and block 3312, which is adjusted to operate with block 3318, corresponding to block 3212 in FIG. 27. Block 3322 includes a different method to generate modeled steering angle 3223 (e.g., using a transfer function as shown), as compared to block 3222 in FIG. 27. Blocks 3312 and 3318 act together to reduce the complexity of control loop 3300, as compared to control loop 3200, yet retain most of the flexibility and robustness exhibited by embodiments of control loop 3200.

In block 3322, controller 130 receives an adjusted steering demand from block 3202 and generates modeled steering angle 3223 that is then provided to blocks 3226 and/or 3318. In some embodiments, block 3322 may be implemented as a transfer function (e.g., in the S-plane) adapted to model backlash in a steering actuator as a type of delay, for example, including a steering rate lag term "1+Ln*s" (e.g., set to "0.7 s+1" in FIG. 28) to provide modeled steering angle 3223 from the adjusted steering demand provided by block 3202. In various embodiments, block 3322, like block 3222 of FIG. 27, may be configured to model or correspond to one or more actual steering actuator responses, including responses characterized by particular steering actuator angle limits (e.g., angle β in FIG. 1C), steering actuator rate limits, steering actuator resolutions, backlashes, lags, and/or other mechanical and/or contextual characteristics of a steering sensor/actuator.

As noted above, blocks 3312 and 3318 act together to simplify control loop 3300. In particular, block 3312 implements a simplified nominal vehicle predictor that assumes the nominal vehicle response time to steering input is zero (e.g., Tn=zero), and block 3318 delays the modeled steering angle input 3223 by the nominal vehicle response time, for example, or filters the modeled steering angle input 3223 to provide a similar result. Corresponding implementations of nominal vehicle feedback system 3210, as shown in FIG. 28, may utilize one less differentiation as compared to embodiments of control loop 3200, and the expansion of Kn in block 3212 may be omitted in block 3312.

For example, in block 3312, controller 130 uses and/or executes a nominal vehicle predictor to receive, process, and/or operate on a steering/yaw rate of a mobile structure (e.g., modeled steering rate 3229 from block 3228) and provide nominal vehicle steering angle 3213 to block 3214, similar to block 3212 in FIG. 27. In various embodiments, the nominal vehicle predictor may be implemented as a transfer function (e.g., in the S-plane) adapted to model dynamics of a nominal vehicle derived, at least in part, from a selection of mobile structures, as described herein. In one embodiment, the transfer function may be implemented in the form of a simplified ratio of a nominal vehicle steering rate lag term "1+Tn*s" (e.g., set to "1" in FIG. 28 to indicate zero lag) to a nominal vehicle steering rate gain term "Kn" (e.g., set to "0.5" in FIG. 28). In some embodiments, nominal vehicle predictor 3312 can be recognized as an inverse form of the transfer functions described with reference to block 3228, but with zero nominal vehicle steering rate lag. Such lag is instead compensated for in block 3318, which may be referred to as providing a delay "matched" to the gain provided in block 3312.

In block 3318, controller 130 receives modeled steering angle 3223 from block 3322 and then delays modeled steering angle 3223 by a nominal vehicle steering rate lag and/or a modeled steering rate lag before providing a delayed modeled steering angle to block 3214 for combination with nominal vehicle steering angle 3213 from block 3312. In some embodiments, block 3318 may be implemented as a transfer function (e.g., in the S-plane) including a steering angle lag term "1+Dn*s" (e.g., set to "1.5 s+1" in FIG. 28).

It can be seen by inspection that the two embodiments (e.g., control loops 3200 and 3300) for nominal vehicle feedback system 3210 can provide substantially the same result under appropriate filter conditions. In some embodiments, the embodiment shown in FIG. 27 may provide arbitrarily good disturbance detection/rejection through reduction of the filter time constant for filter 3216.

Figure 29:
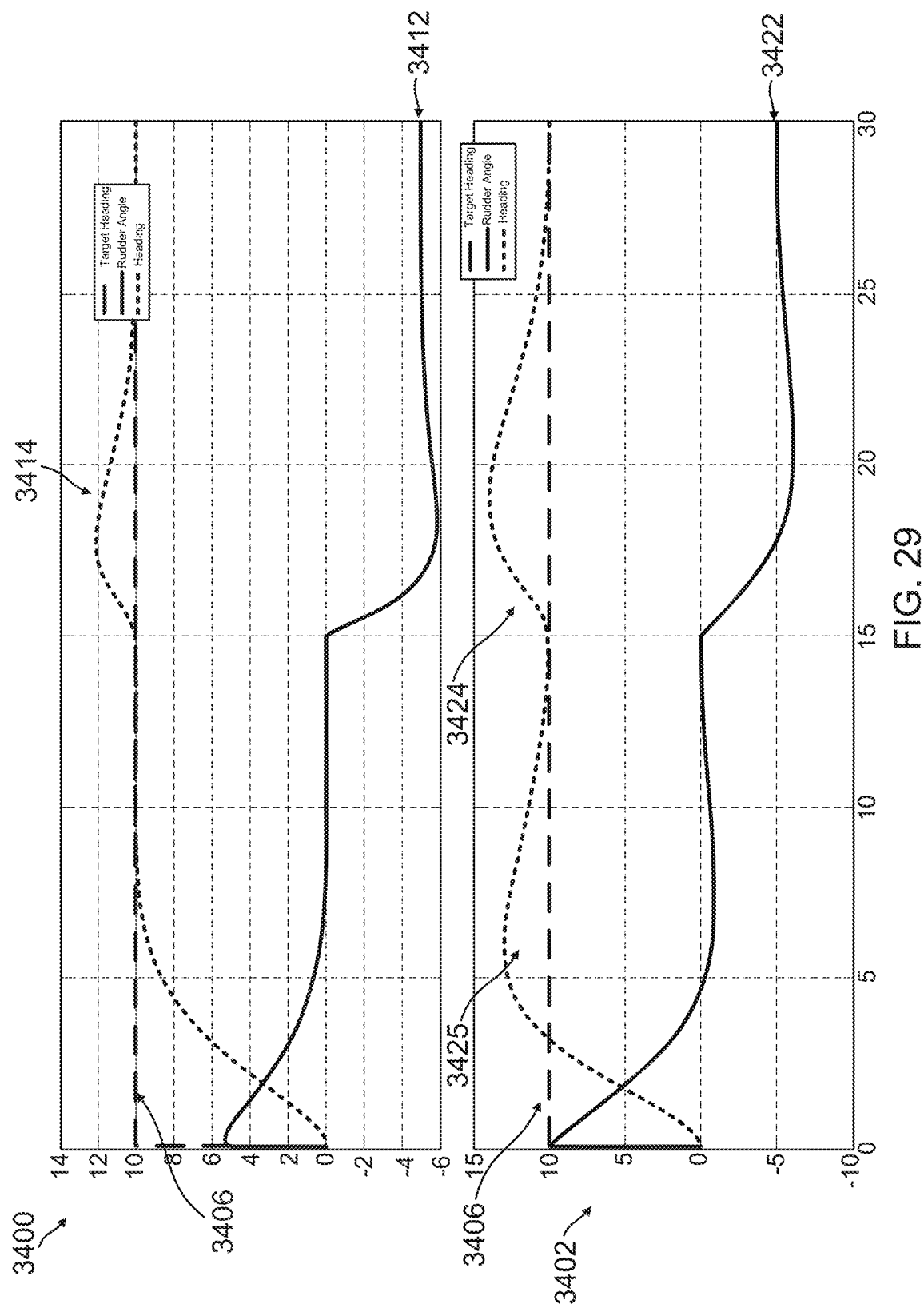
FIG. 29 includes two graphs illustrating directional control by a nominal vehicle feedback system, in accordance with embodiments of the disclosure, compared to that of a conventional directional controller.

FIG. 29 includes two graphs illustrating directional control by a nominal vehicle feedback system (e.g., graph 3400), in accordance with embodiments of the disclosure, compared to that of a conventional directional controller (e.g., graph 3402). As shown in FIG. 29, in both graphs a mobile structure is initially (at time=zero) at a heading of zero (e.g., see heading plots 3414 and 3424) and is provided with a new target heading of ten (e.g., see target heading plots 3406), which stays the same throughout the rest of the graph. At time fifteen, a disturbance is introduced (e.g., by block 3224 of FIG. 27) that causes a change in the heading and a corresponding change in the applied/measured steering angle (e.g., see steering angle plots 3412 and 3422).

By comparing graph 3400 to graph 3402, it can be seen that directional controllers including a nominal vehicle feedback system, as described herein (e.g., corresponding to graph 3400), are less prone to over-compensation and are able to conform to a target heading quicker and for longer periods of travel time than conventional directional controllers. For example, heading plot 3424 of graph 3402 includes deviation 3425 where the corresponding mobile structure was controlled to overshoot target heading 3406 and required almost a full fifteen seconds to conform to target heading 3406, whereas the mobile structure corresponding to heading plot 3414 conformed to target heading 3406 within approximately 8 seconds and without overshooting. Furthermore, graph 3400 shows the steering angle used by embodiments of the present disclosure to reach target heading 3406 is approximately half that used by conventional systems, which indicates a potentially more pleasing or at least less jarring directional control that conforms to typical autopilot steering using waypoints.

For some systems it may be desirable to limit the magnitude of nominal vehicle feedback signal 3215. For example, the steady state rudder offset on a yacht is not likely to exceed 20 degrees. When performing such limiting, it is important to clamp the output of filter 3216 and not the filter's input because the filter input is linked to the output of the system's predictor (e.g., predictor 3212 or 3312), which tends to be noisy. Clipping peaks in the input noise would generate a non-linear response and skew the filtered output.

In addition, filtering generally introduces delay, and in cases where a disturbance comes then goes (e.g., such as a wave hitting the back quarter of a boat in a quartering sea), the filter can build up a mean value which takes time to unwind once the disturbance goes away (e.g., the wave passes). Where the actuator rate is limited (e.g., on a boat actuator rates are typically less than 7 degrees/second) the problem can be further compounded. For example, with a filter time constant of 2 s and a 20 degree filter output, it would take 2+20/7=5 seconds to unwind the standing helm once the wave passes. This delay can cause overshoot in the opposite direction to the disturbance (e.g., a sailboat could then dive dangerously downwind).

One solution to this is to phase advance via feed-forward control action, as described in U.S. Provisional Patent Application No. 62/099,032 filed Dec. 31, 2014 and entitled "PROACTIVE DIRECTIONAL CONTROL SYSTEMS AND METHODS", which is hereby incorporated by reference in its entirety. Another complimentary solution is to limit nominal vehicle feedback signal 3215 to a lower value before it is fed back into the steering demand. One way to calculate the optimum lower limit value is to multiply the actuator rate by the acceptable time delay. For example, a boat with a 6 degrees/second rudder rate, where the acceptable time delay is "1 s" of unwinding time, would require a filter clamp limit of 6 degrees. Given the possibility that there may also be a non-zero neutral rudder angle (e.g., because the installer has misaligned the rudder reference transducer by 3 degrees) it is then desirable to close out the long term offset with a slower predictor filter which operates in parallel. A corresponding multi-band embodiment for filter 3216 is shown in FIG. 5.

Figure 30:
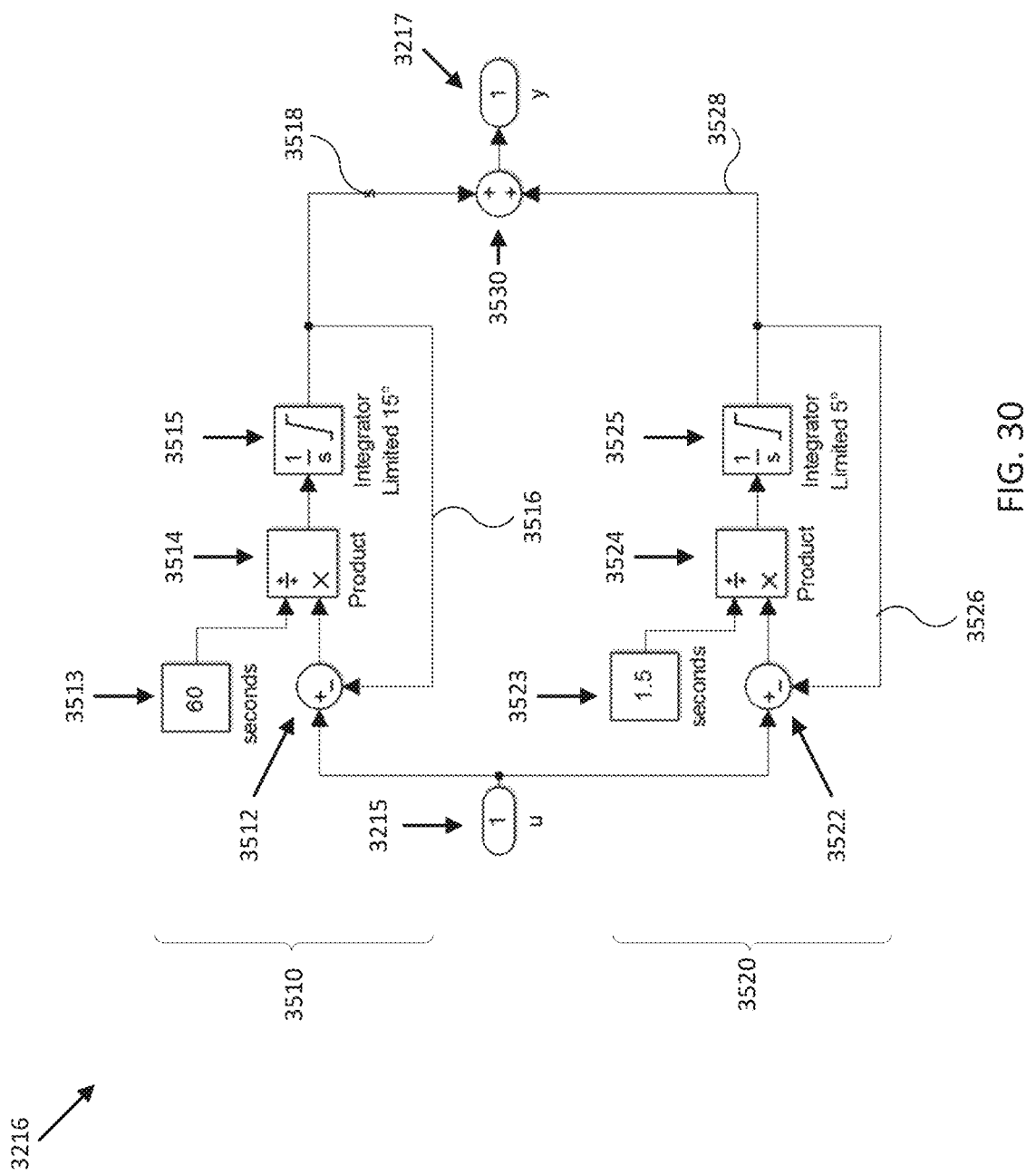
FIG. 30 illustrates a flow diagram of a filter for use in a control loop to provide stabilized directional control in accordance with an embodiment of the disclosure.

FIG. 30 illustrates a flow diagram of a filter for use in a control loop to provide stabilized directional control in accordance with an embodiment of the disclosure. For example, In some embodiments, the operations of FIG. 30 may be performed by controller 130 processing and/or operating on signals received from one or more of sensors 140-146, steering sensor/actuator 150, propulsion system 170, user interface 120, and/or other modules 180. In accordance with an embodiment, each block may be implemented entirely as instructions executed by controller 130, for example, or may be implemented in a combination of executable instructions and hardware, such as one or more inductors, capacitors, resistors, digital signal processors, and other analog and/or digital electronic devices. It should be appreciated that any step, sub-step, sub-process, or block of control loop 3200 may be performed in an order or arrangement different from the embodiment illustrated by FIG. 30.

As noted herein, filter 3216 in FIGS. 27 and 28 may in some embodiments be implemented as a multi-band filter including multiple selectable filter bands for use in a nominal vehicle feedback system. For example, as shown in FIG. 30, filter 3216 may be configured to receive nominal vehicle feedback signal 3215, to filter nominal vehicle feedback signal 3215 using one or more parallel filter control loops (e.g., filter control loops 3510 and 3520), combine the filter control loop outputs, and provide a filtered nominal feedback signal 3217 that is the combination of the filter control loop outputs.

In FIG. 30, nominal vehicle feedback signal 3215 is provided to block 3512 and block 3522 of respective filter control loops 3510 and 3520. As shown in FIG. 30, in some embodiments, filter control loop 3510 may be characterized with a first set of parameters (e.g., 60 seconds and 15 degrees corresponding respectively to a time constant and a clamp limit parameter for filter control loop 3510) and filter control loop 3520 may be characterized with a second set of parameters (e.g., 1.5 seconds and 5 degrees) different from the first set to provide multi-band filtering as described herein.

Looking at filter control loop 3510, block 3512 combines nominal vehicle feedback signal 3215 with a filter control loop feedback 3516 and then provides the combined signal to block 3514, which divides the combined signal by the parameter provided in block 3513. Block 3514 then provides the processed combined signal to block 3515, which integrates the processed combined signal to produce an output in a limited range of steering angles (e.g., shown in FIG. 31 as +/−15 degrees for block 3515) and provides the integrated signal as filter control loop output 3518 to block 630 and as filter control loop feedback 3516 back to block 3512 (e.g., an input block for filter control loop 3510). Filter control loop 3520 may be configured to perform the same operations (e.g., using blocks 3524 and 3525, and filter control loop feedback 3526) but with different parameters (e.g., 1.5 seconds in block 3523, and +/−five degrees in block 3525) to produce filter control loop output 3528 that is provided to block 3530. Block 3530 may be configured to combine filter control loop output 3518 and filter control loop output 3528 to produce filtered nominal feedback signal 3217 that is the multi-band filtered output of filter 3216. In various embodiments, other parameters, other filter control loop implementations, and/or additional filter control loops may be used to implement filter 3216.

Figure 31:
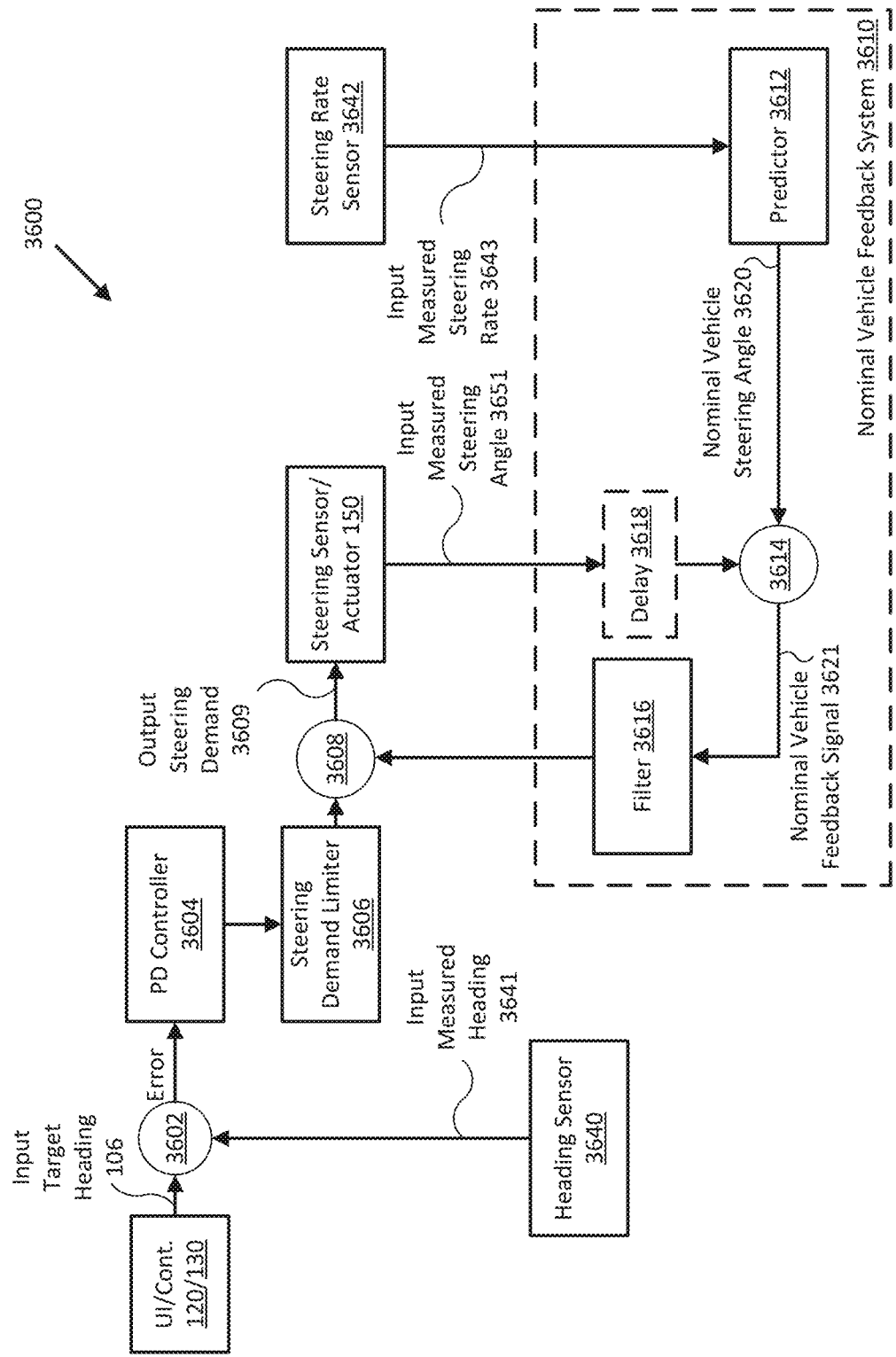
FIG. 31 illustrates a flow diagram of a control loop to provide stabilized directional control in accordance with an embodiment of the disclosure.

FIG. 31 illustrates a flow diagram of a control loop to provide stabilized directional control in accordance with an embodiment of the disclosure. In some embodiments, the operations of FIG. 28 may be performed by controller 130 processing and/or operating on signals received from one or more of sensors 140-146, steering sensor/actuator 150, propulsion system 170, user interface 120, and/or other modules 180. Each block may be implemented entirely as instructions executed by controller 130, for example, or may be implemented in a combination of executable instructions and hardware. It should be appreciated that any step, sub-step, sub-process, or block of control loop 3600 may be performed in an order or arrangement different from the embodiment illustrated by FIG. 31. For example, although control loop 3600 includes block 3606, in other embodiments, block 3606 may not be present. Outputs of various blocks in control loop 3600 may be set as initial conditions prior to controller 130 executing block 3602. Moreover, controller 130 may be configured to store the output of any block before proceeding to other blocks in control loop 3600.

In various embodiments, control loop 3600 may include various aspects of control loop 3200 of FIG. 27, control loop 3300 of FIG. 28, and/or filter 3216 of FIG. 30. For example, as shown in FIG. 31, control loop 3600 includes nominal vehicle feedback system 3610 corresponding to aspects of control loop 3200 and/or 3300. Additionally, blocks and/or modules providing modeled data in control loops 3200 and/or 3300 may be absent in control loop 3600 and replaced with one or more sensors providing measured data in place of the modeled data.

In block 3602, controller 130 receives target heading 106 and a measured heading 3641 from heading sensor 3640 and combines them to produce an error output that is then provided to block 3604. For example, controller 130 may be adapted to receive target heading 106 as user input from user interface/controller 120/130 and measured heading 3641 as a sensor signal provided by, for example, orientation sensor 140. In other embodiments, heading sensor 3640 may be implemented as one or more of sensors 140-146 and/or other modules 180. In some embodiments, the error output may represent a difference between target heading 106 and measured heading 3641.

In block 3604, controller 130 uses and/or executes, for example, a proportional-derivative controller module to receive the error output of block 3602 and provide a steering demand to block 3606. Various parameters of block 3604 may be used to determine the steering demand output by block 3604. In some embodiments, block 3604 may be implemented as a proportional-derivative-integral controller with one or more of the corresponding gain terms (e.g., proportional, derivative, and/or integral) set to zero. In one embodiment, parameters of the proportional-derivative controller module may be managed to produce a critically damped response with a time constant of 6*Tn and with a damping ratio of 1.25, for example, to sufficiently tune the proportional-derivative controller module for relatively high mobile structure speeds.

In other embodiments, controller 130 may be configured to modify one or more of the parameters, gain terms, a deadband, and/or a limit on the output of the proportional-derivative or proportional-derivative-integral controller module based on a responsiveness setting received from user interface 120 (e.g., before, after, or at approximately the same time target heading 106 is received). For example, a responsiveness setting (e.g., Performance, Cruising, Economy) may allow a user to choose between a sharper response or reduced steering mechanism (e.g., rudder 152) activity, as described herein. In further embodiments, controller 130 may be configured to modify one or more of the gain terms and/or other parameters of block 3604 based on adaptive training of control loop 3600, as described herein.

In block 3606, controller 130 uses and/or executes a steering demand limiter to receive the steering demand output of block 3604 and provide a limited steering demand (e.g., a limited rudder demand) to block 3608. In some embodiments, the steering demand limiter may be adapted to limit the steering demand to produce a steering actuator rate demand less than a steering actuator rate limit and/or a steering demand less than a steering actuator angle limit. For example, steering sensor/actuator 150 may be implemented to have a steering actuator rate limit "R". A steering actuator rate demand may be directly proportional to a steering demand multiplied by a proportional gain term "Kg" of block 3604 and a steering rate gain term "K", as defined herein, for mobile structure 101. To ensure the steering actuator rate is less than the steering actuator rate limit "R", it is sufficient to limit the steering demand provided by block 3604 according to the steering actuator rate limit equation:

$$\text{steering demand} < R/(K*Kg);$$

where K is the forward gain of the mobile structure, as defined herein, and Kg represents the degree of steering demand (e.g., rudder demand) for each degree of error (e.g., degree of heading error) output by block 3602.

In some embodiments, Kg may be an overall gain provided by an embodiment of block 3604 including a proportional-derivative controller or a proportional-derivative-integral controller. In further embodiments, where K for mobile structure 101 is unknown, K can be determined by an autolearn procedure in an initial directional control trial, for example, or may be brought to a nominal or target value through use of an adaptive algorithm utilizing an appropriate control loop including a nominal vehicle predictor, such as control loop 3200 in FIG. 27. In still further embodiments, the steering actuator rate limit equation may be modified to replace "K" with a term including corrections for lag and other second order effects, as described herein.

In some embodiments, one or more of blocks 3602, 3604, 3606, and/or 3608, in combination with steering sensor actuator 650 and/or other elements of system 100 and/or control loop 3600 may be implemented and/or operated to control steering sensor/actuator according to any one or combination of the systems and methods described in U.S. Provisional Patent Application No. 61/934,678 filed Jan. 31, 2014 and entitled "HYDRAULIC SLIP COMPENSATION SYSTEMS AND METHODS", which is hereby incorporated by reference in its entirety.

In block 3608, controller 130 receives a limited steering demand from block 3606 and a filtered nominal vehicle feedback signal from block 3616 and combines them to produce an adjusted steering demand 3609 that is then provided (e.g., as a controller signal) to steering sensor/actuator 150. In some embodiments, adjusted steering demand 3609 may represent a difference between the limited steering demand and the filtered nominal vehicle feedback signal. In further embodiments, the filtered nominal vehicle feedback signal from block 3616 may be an initial condition set for block 3616. In still further embodiments, the filtered nominal vehicle feedback signal from block 3616 may be determined by nominal vehicle feedback system 3610 using measured inputs as shown.

In block 3612, controller 130 uses and/or executes a nominal vehicle predictor to receive, process, and/or operate on an measured steering rate 3643 (e.g., as a sensor signal) from steering rate sensor 3642 and provide a nominal vehicle steering angle 3620 to block 3614. In various embodiments, steering rate sensor 3642 may be implemented as one or more of orientation sensor 120, gyroscope and/or accelerometer 122, speed sensor 124, GPS 126, steering sensor/actuator 150, and/or other modules 150. For example, controller 130 may be adapted to determine a measured steering rate from sensor signals received from one or more of sensors 120-126, gyro/accelerometer 130, and/or other modules 150. In some embodiments, controller 130, heading sensor 3640, steering rate sensor 3642, and/or other elements of system 100 and/or control loop 3600 may be implemented and/or operated to determine a measured steering rate according to any one or combination of the systems and methods described in U.S. Provisional Patent Application No. 61/942,517 filed Feb. 20, 2014 and entitled "ACCELERATION CORRECTED ATTITUDE ESTIMATION SYSTEMS AND METHODS", which is hereby incorporated by reference in its entirety.

In some embodiments, the nominal vehicle predictor may be implemented as a transfer function (e.g., in the S-plane) adapted to model dynamics of a nominal vehicle derived, at least in part, from a selection of mobile structures, as described herein. In one embodiment, the transfer function may be implemented in the form of a ratio of a nominal vehicle steering rate lag term "1+Tn*s" to a nominal vehicle steering rate gain term "Kn", which may be expanded to "Fn*s+Kn" as described similarly in connection with block 3212 of FIG. 27. In another embodiment, the transfer function may be implemented in the form of a simplified ratio of a nominal vehicle steering rate lag term with zero lag (e.g., "1") to a nominal vehicle steering rate gain term "Kn", as described similarly in connection with block 3312 of FIG. 28. In such embodiment, nominal vehicle feedback system 3610 would typically compensate for steering rate lag through use of optional block 3618 receiving an input measured steering angle 3651. In various embodiments, nominal vehicle predictor 3612 can be recognized as an inverse form of the transfer functions described with reference to block 3228 of FIGS. 27 and 28.

Advantageously, the nominal vehicle predictor may be implemented as a transfer function acting on only one (e.g., steering rate) of the two state variables (e.g., heading and steering rate) of the control loop, which makes implementation easier due to, at least in part, a reduced need for computing resources.

In optional block 3618, controller 130 receives a measured steering angle 131 (e.g., as a sensor signal) from steering sensor/actuator 150 and generates a delayed version of measured steering angle 131 to be provided to block 3614. Measured steering angle 131 may be a steering angle (e.g., rudder angle) of mobile structure 101 sensed by steering sensor/actuator 150, for example, and may depend, at least in part, on steering demand 3609 provided to steering sensor/actuator 150. For instance, in embodiments where steering sensor/actuator 150 can meet the requested steering demand 3609 within an update time of at least a portion of control loop 3600, steering angle 131 may substantially equal steering demand 3609. In other embodiments, steering angle 131 may be proportional to steering demand 3609, for example.

In some embodiments, optional block 3618 may be implemented as a transfer function (e.g., in the S-plane) including a steering angle lag term "1+Dn*s" similar to that shown in FIG. 28. In other embodiments, block 3618 may be implemented as a filter and/or other type of process to delay and/or simulate delay of measured steering angle 131 by a nominal vehicle steering rate lag and/or a modeled steering rate lag before providing a delayed steering angle to block 3614 for combination with nominal vehicle steering angle 3620 from block 3612.

In block 3614, controller 130 receives an actual or, optionally, a delayed/filtered measured steering angle 131 (e.g., as a sensor signal) from steering sensor/actuator 150 and nominal vehicle steering angle 3620 from block 3612 and combines them to produce a nominal vehicle feedback signal 3621 that may then be provided to block 3616. In some embodiments, nominal vehicle feedback signal 3621 may represent a difference between measured steering angle 131 and nominal vehicle steering angle 3620. In various embodiments, nominal vehicle feedback signal 3621 may correspond to a disturbance experienced by mobile structure 101.

In block 3616, controller 130 filters nominal vehicle feedback signal 3621 output by block 3614 and provides a filtered nominal vehicle feedback signal to block 3608. In some embodiments, block 3616 may be implemented as a low pass filter. In further embodiments, block 3616 may be implemented with a selectable bandwidth that can be modified based on a user-selectable responsiveness setting. In other embodiments, the filter bandwidth is a control loop parameter that may be modified based on a received user input and/or adaptive training implemented with control loop 3600. For example, the filter bandwidth may be modified based on a target acceptable output noise level in adjusted steering demand 3609. In various embodiments, filter 3616 may be implemented as a multi-band filter, such as multi-band filter 3216 described with reference to FIG. 30.

In additional embodiments, a sub-control loop including blocks 3608, 3612, 3614, 3616, and/or 3618 may be iterated multiple times for each update of, for example, blocks 3604 and/or 3606. In such embodiments, an input of block 3608 corresponding to an output of block 3606 may be set to a prior-used value for a number of iterations of the sub-control loop. In some embodiments, such a sub-control loop may be implemented as a device and/or instructions separate from a device and/or instructions implementing one or more of the remaining blocks of control loop 3600, for example. For instance, blocks 3602 and/or 3604 may be implemented as an electronic device separate from controller 130 in FIG. 1.

In one embodiment, nominal vehicle feedback system 3610 may be implemented as an electronic device adapted to be installed on a mobile structures with an existing directional control system including a proportional-derivative and/or similar controller module and one or more components similar to sensors 140-146, steering sensor/actuator 150, and/or other modules 180 of FIG. 1.

Because control loop 3600 includes a proportional-differential controller module (e.g., block 3604) and a nominal vehicle predictor (e.g., block 3612), embodiments of control loop 3600 may be implemented as a critically damped control loop with a higher bandwidth (e.g., responsiveness) than if the nominal vehicle predictor were acting alone to stabilize directional control of, for example, mobile structure 101. Because control loop 3600 also includes a steering demand limiter (e.g., block 3606), embodiments of control loop 3600 may be implemented to avoid non-linear control loop responses corresponding to steering demands producing a steering actuator rate demand exceeding a steering actuator rate limit and/or a steering demand exceeding a steering actuator angle limit.

In accordance with various embodiments of the present disclosure, various control loop parameters, user inputs, sensor signals, controller signals, and other data, parameters, and/or signals described in connection with system 100 and/or control loops 3200, 3300, or 3600 may be stored at various points in the control loops, including within and/or during execution of any one of the blocks of a particular control loop.

In various embodiments, the disclosed methods may be performed in combination with and/or separate from the systems described herein. For example, although certain methods are discussed in relation to particular systems (e.g., logic devices), such methods may be performed without requiring particular hardware or software systems.

Embodiments of the present disclosure can thus provide reliable and accurate directional control for mobile structures. Such embodiments may be used to assist in navigation of a mobile structure and/or in the operation of other systems, devices, and/or sensors coupled to or associated with the mobile structure. For example, embodiments of the present disclosure may be used to provide directional control for actuators used to aim an actuated device (e.g., a visible and/or infrared spectrum camera, a spotlight, other directional illumination and/or sensor systems) according to a desired direction. In such embodiments, the steering angle corresponds to the aiming angle (e.g., roll, pitch, and/or yaw) for the actuated device and the steering rate corresponds to the rate of change in the orientation of the actuated device in the direction actuated by the steering angle.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A system comprising:
   a logic device configured to receive one or more sensor signals and generate one or more control signals to provide directional control for a mobile structure along a reference path, wherein the logic device is configured to perform a method comprising:
   receiving a yaw rate, position, and velocity of the mobile structure;
   determining a cross track error relative to the reference path for the mobile structure based, at least in part, on the yaw rate, position, and velocity;
   determining a steering demand for the mobile structure based, at least in part, on the cross track error;
   receiving a steering angle and a steering rate of the mobile structure, wherein the steering angle is based, at least in part, on the steering demand;
   determining a nominal steering angle based, at least in part, on the steering rate;
   determining a nominal feedback signal based, at least in part, on a difference between the nominal steering angle and the steering angle; and
   adjusting the steering demand by the nominal feedback signal.

2. The system of claim 1, wherein the determining the cross track error comprises at least one of:
   determining a cross track acceleration for the mobile structure based, at least in part, on the yaw rate;
   integrating a cross track acceleration for the mobile structure to determine a cross track velocity for the mobile structure, the cross track acceleration based, at least in part, on the yaw rate; or
   integrating a cross track velocity for the mobile structure to determine the cross track error for the mobile structure.

3. The system of claim 2, wherein the determining the steering demand comprises multiplying the cross track acceleration, cross track velocity, and/or cross track error by one or more associated gains.

4. The system of claim 2, wherein the integrating the cross track acceleration uses a position-based cross track velocity derived, at least in part, from measured positions of the mobile structure.

5. The system of claim 1, wherein the method further comprises:
   determining a bearing associated with the reference path; and
   determining a cross track velocity reference using the bearing, wherein the cross track error is based, at least in part, on the cross track velocity reference.

6. The system of claim 1, further comprising the mobile structure, wherein:
   the mobile structure is a watercraft comprising a steering actuator and a rudder;
   the steering angle comprises a rudder angle;
   the steering rate comprises a yaw rate;
   the nominal steering angle comprises a nominal rudder angle; and
   the steering actuator is configured to receive the steering demand and actuate the rudder to maintain the watercraft along the reference path.

7. The system of claim 1, wherein the method further comprises limiting the steering demand according to a maximum acquisition angle associated with the mobile structure, wherein the limiting is performed in response to a user selected responsiveness setting.

8. The system of claim 1, further comprising a user interface configured to display the steering demand and/or an angle associated with the steering demand to a user.

9. The system of claim 1, wherein the reference path is a specified track between at least two waypoints.

10. The system of claim 1, wherein the reference path is a specified contour associated with a sea bed depth, wherein the cross track error is an effective cross track error based on a depth error divided by a cross slope associated with the specified contour.

11. The system of claim 10, wherein:
the system further comprises a sonar system;
the method further comprises:
controlling the sonar system to determine the depth and the cross slope;
determining the depth error by subtracting a target depth of the specified contour from the depth; and
determining the effective cross track error by dividing the depth error by the cross slope.

12. The system of claim 1, wherein the method further comprises determining a nominal steering rate, wherein the determining the nominal steering rate comprises:
processing the steering rate with a nominal predictor;
receiving the nominal steering angle from the nominal predictor, wherein the nominal predictor comprises a transfer function configured to model dynamics of a nominal mobile structure derived, at least in part, from a selection of mobile structures; and
wherein the transfer function comprises a ratio of a nominal steering rate lag term to a nominal steering rate gain term.

13. The system of claim 12, wherein:
the nominal steering rate lag is set to zero within the nominal predictor; and
the determining the nominal feedback signal comprises determining a delayed steering angle based, at least in part, on the steering angle, and determining a difference between the nominal steering angle and the delayed steering angle.

14. The system of claim 1, wherein the method further comprises:
limiting the steering demand to produce a steering actuator rate demand less than a steering actuator rate limit and/or a steering demand less than a steering actuator angle limit;
receiving a user-selectable responsiveness setting; and
modifying, based on the responsiveness setting, one or more gains, a deadband, and/or a limit used to determine the steering demand.

15. The system of claim 1, wherein the method further comprises:
providing the adjusted steering demand to a steering actuator.

16. The system of claim 1, wherein the method further comprises:
providing the nominal feedback signal to a single-band or multi-band bandwidth-selectable filter to produce a filtered nominal feedback signal;
adjusting the steering demand using the filtered nominal feedback signal; and
modifying at least one bandwidth of the bandwidth-selectable filter based on a user-selectable responsiveness setting.

17. The system of claim 1, wherein:
the yaw rate is determined after a pitch, pitch rate, roll, and/or roll rate of the mobile structure are determined to reduce a pitch-induced noise in the yaw rate.

18. The system of claim 1, wherein the mobile structure is a watercraft comprising:
a rudder;
a steering actuator configured to receive the steering demand provided as one of the control signals and configured to actuate the rudder;
a steering sensor fixed relative to the watercraft and configured to provide the steering angle as at least a first one of the sensor signals; and
a steering rate sensor fixed relative to the watercraft and configured to provide the steering rate as at least a second one of the sensor signals.

19. A system comprising:
a logic device configured to receive one or more sensor signals and generate one or more control signals to provide directional control for a mobile structure along a reference path, wherein the logic device is configured to perform a method comprising:
receiving a yaw rate, position, and velocity of the mobile structure;
determining a cross track error relative to the reference path for the mobile structure based, at least in part, on the yaw rate, position, and velocity;
determining a steering demand for the mobile structure based, at least in part, on the cross track error;
receiving a steering angle and a steering rate of the mobile structure, wherein the steering angle is based, at least in part, on the steering demand;
determining a nominal steering angle based, at least in part, on the steering rate; and
determining a nominal steering rate, wherein the determining the nominal steering rate comprises:
processing the steering rate with a nominal predictor;
receiving the nominal steering angle from the nominal predictor, wherein the nominal predictor comprises a transfer function configured to model dynamics of a nominal mobile structure derived, at least in part, from a selection of mobile structures; and
wherein the transfer function comprises a ratio of a nominal steering rate lag term to a nominal steering rate gain term.

20. A system comprising:
a logic device configured to receive one or more sensor signals and generate one or more control signals to provide directional control for a mobile structure along a reference path, wherein the logic device is configured to perform a method comprising:
receiving a yaw rate, position, and velocity of the mobile structure;
determining a cross track error relative to the reference path for the mobile structure based, at least in part, on the yaw rate, position, and velocity;
determining a steering demand for the mobile structure based, at least in part, on the cross track error;
receiving a steering angle and a steering rate of the mobile structure, wherein the steering angle is based, at least in part, on the steering demand;
determining a nominal steering angle based, at least in part, on the steering rate;
determining a nominal feedback signal based, at least in part, on a combination of the steering angle and the nominal steering angle;

providing the nominal feedback signal to a single-band or multi-band bandwidth-selectable filter to produce a filtered nominal feedback signal;

adjusting the steering demand using the filtered nominal feedback signal; and modifying at least one bandwidth of the bandwidth-selectable filter based on a user-selectable responsiveness setting.

\* \* \* \* \*

UNITED STATES PATENT AND TRADEMARK OFFICE
CERTIFICATE OF CORRECTION

PATENT NO. : 10,747,226 B2  Page 1 of 1
APPLICATION NO. : 15/620675
DATED : August 18, 2020
INVENTOR(S) : Mark Johnson et al.

It is certified that error appears in the above-identified patent and that said Letters Patent is hereby corrected as shown below:

In the Specification

In the Cross-References to Related Applications:

In Column 1, Line 39 and 40, change "patent application Ser. No." to --Patent Application No.--.

In Column 2, Line 28, change "patent application Ser. No." to --Patent Application No.--.

In Column 2, Line 50, change "patent application Ser. No." to --Patent Application No.--.

In Column 2, Line 61, change "patent application Ser. No." to --Patent Application No.--.

In Column 3, Line 6, change "patent application Ser. No." to --Patent Application No.--.

In the Detailed Description:

In Column 20, Line 54, change "patent application Ser. No." to --Patent Application No.--.

In Column 22, Line 23 and 24, change "TrackLegBng = BTW_deg + a sin(XTE_m/DTW_m) (Equation 1)" to --TrackLegBng = BTW_deg + asin(XTE_m/DTW_m) (Equation 1)--.

In Column 34, Line 37, change "patent application Ser. No." to --Patent Application No.--.

In Column 37, Line 26 and 27, change "patent application Ser. No." to --Patent Application No.--.

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*